United States Patent
Coward et al.

(12)

(10) Patent No.: US 10,602,153 B2
(45) Date of Patent: Mar. 24, 2020

(54) ULTRA-HIGH VIDEO COMPRESSION

(71) Applicant: Facebook, Inc., Menlo Park, CA (US)

(72) Inventors: Michael Hamilton Coward, Solano Beach, CA (US); Amit Puntambekar, Fremont, CA (US); Wurzel David Parsons-Keir, Woodinville, WA (US)

(73) Assignee: Facebook, Inc., Menlo Park, CA (US)

( * ) Notice: Subject to any disclaimer, the term of this patent is extended or adjusted under 35 U.S.C. 154(b) by 333 days.

(21) Appl. No.: 14/852,472

(22) Filed: Sep. 11, 2015

(65) Prior Publication Data

US 2017/0078686 A1  Mar. 16, 2017

(51) Int. Cl.
| | | |
|---|---|---|
| H04N 7/12 | (2006.01) | |
| H04N 11/02 | (2006.01) | |
| H04N 11/04 | (2006.01) | |
| H04N 19/146 | (2014.01) | |
| H04N 19/436 | (2014.01) | |
| H04N 19/30 | (2014.01) | |
| H04N 19/90 | (2014.01) | |

(52) U.S. Cl.
CPC ......... *H04N 19/146* (2014.11); *H04N 19/395* (2014.11); *H04N 19/436* (2014.11); *H04N 19/90* (2014.11)

(58) Field of Classification Search
None
See application file for complete search history.

(56) References Cited

U.S. PATENT DOCUMENTS

| | | | |
|---|---|---|---|
| 5,768,609 A | 6/1998 | Gove et al. | |
| 5,805,225 A | 9/1998 | Tahara et al. | |
| 5,917,962 A | 6/1999 | Chen et al. | |
| 6,038,256 A * | 3/2000 | Linzer | H04H 20/30 348/385.1 |
| 6,064,748 A | 5/2000 | Hogan et al. | |
| 6,115,131 A | 9/2000 | Payne | |
| 6,285,661 B1 | 9/2001 | Zhu et al. | |
| 6,507,617 B1 | 1/2003 | Oktem et al. | |
| 6,536,043 B1 * | 3/2003 | Guedalia | H04N 7/147 348/E7.071 |
| 7,161,983 B2 | 1/2007 | Lainema et al. | |
| 8,135,061 B1 | 3/2012 | Ganesan et al. | |
| 8,649,426 B2 | 2/2014 | Hosseini et al. | |

(Continued)

OTHER PUBLICATIONS

Advisory Action dated Sep. 18, 2017 for U.S. Appl. No. 14/852,449 by Puntabekar, A., et al., filed Sep. 11, 2015.

(Continued)

*Primary Examiner* — Chikaodili E Anyikire
(74) *Attorney, Agent, or Firm* — Sheppard Mullin Richter & Hampton LLP

(57) ABSTRACT

Various of the disclosed embodiments relate to multiple video encoders that are used to simultaneously encode a video using encoders configured using different encoding parameters. A segment selector selects an encoded version of the encoded video segment using operational criteria such as video quality and bandwidth. A configuration determination module may analyze the video segment to make a decision about which encoding parameter configurations may be suitable for encoding the video segment. The configuration determination module may be trainable, based on past encoding results.

20 Claims, 38 Drawing Sheets

(56) References Cited

U.S. PATENT DOCUMENTS

| | | | |
|---|---|---|---|
| 8,659,679 B2 | 2/2014 | Zhou et al. | |
| 8,786,716 B2 | 7/2014 | Zhou et al. | |
| 9,374,532 B2 | 6/2016 | Grundmann et al. | |
| 9,484,954 B1 | 11/2016 | Satpathy et al. | |
| 9,635,334 B2 | 4/2017 | Schoner et al. | |
| 9,756,351 B2 | 9/2017 | Mody | |
| 2002/0131084 A1 | 9/2002 | Andrew et al. | |
| 2002/0181588 A1 | 12/2002 | Okada | |
| 2003/0091311 A1 | 5/2003 | Lam et al. | |
| 2003/0177503 A1 | 9/2003 | Sull et al. | |
| 2004/0146109 A1 | 7/2004 | Kondo et al. | |
| 2004/0190615 A1 | 9/2004 | Abe et al. | |
| 2004/0196905 A1 | 10/2004 | Yamane et al. | |
| 2004/0202248 A1 | 10/2004 | Boroczky et al. | |
| 2005/0207442 A1* | 9/2005 | Zoest | G11B 20/00086 370/465 |
| 2005/0243922 A1 | 11/2005 | Magee | |
| 2006/0017814 A1 | 1/2006 | Pinto et al. | |
| 2006/0050971 A1 | 3/2006 | Page et al. | |
| 2006/0114985 A1 | 6/2006 | Linzer et al. | |
| 2006/0233237 A1 | 10/2006 | Lu et al. | |
| 2006/0291807 A1 | 12/2006 | Ryu et al. | |
| 2007/0002946 A1* | 1/2007 | Bouton | H04N 19/15 375/240.01 |
| 2007/0110161 A1 | 5/2007 | Saigo et al. | |
| 2007/0201388 A1* | 8/2007 | Shah | H04L 5/0046 370/300 |
| 2007/0248023 A1* | 10/2007 | Chui | H04L 47/10 370/252 |
| 2007/0274340 A1 | 11/2007 | Raveendran et al. | |
| 2008/0137736 A1 | 6/2008 | Richardson | |
| 2008/0170795 A1 | 7/2008 | Akenine-Moller et al. | |
| 2008/0219349 A1 | 9/2008 | Huang et al. | |
| 2008/0232687 A1 | 9/2008 | Petersohn et al. | |
| 2008/0292197 A1* | 11/2008 | Nakagawa | H04N 19/105 382/238 |
| 2009/0219415 A1 | 9/2009 | Matsunaga et al. | |
| 2009/0323824 A1 | 12/2009 | Pandit et al. | |
| 2010/0104017 A1* | 4/2010 | Faerber | H04N 7/52 375/240.16 |
| 2010/0146363 A1 | 6/2010 | Birru et al. | |
| 2010/0322310 A1 | 12/2010 | Deng et al. | |
| 2011/0222604 A1* | 9/2011 | Yang | H04N 19/159 375/240.16 |
| 2011/0305273 A1 | 12/2011 | He | |
| 2012/0093221 A1 | 4/2012 | Rodriguez et al. | |
| 2012/0128061 A1 | 5/2012 | Labrozzi et al. | |
| 2012/0195370 A1* | 8/2012 | Guerrero | H04N 19/124 375/240.02 |
| 2012/0250755 A1 | 10/2012 | Ratner et al. | |
| 2012/0281748 A1 | 11/2012 | Peng et al. | |
| 2013/0054495 A1* | 2/2013 | Hawkins | G06F 9/3867 706/12 |
| 2013/0054496 A1* | 2/2013 | Marianetti, II | G06N 20/00 706/12 |
| 2013/0083843 A1 | 4/2013 | Bennett et al. | |
| 2013/0114744 A1 | 5/2013 | Mutton et al. | |
| 2013/0128066 A1 | 5/2013 | Jin et al. | |
| 2013/0136184 A1 | 5/2013 | Suzuki et al. | |
| 2013/0142425 A1 | 6/2013 | Chung et al. | |
| 2013/0188717 A1 | 7/2013 | Chen et al. | |
| 2013/0230100 A1 | 9/2013 | Sakomizu et al. | |
| 2013/0329062 A1 | 12/2013 | Zhou et al. | |
| 2013/0329066 A1 | 12/2013 | Zhou et al. | |
| 2014/0212002 A1 | 7/2014 | Curcio et al. | |
| 2014/0254952 A1* | 9/2014 | Kimiyama | G06F 3/1454 382/284 |
| 2014/0267801 A1 | 9/2014 | Grundmann et al. | |
| 2014/0359678 A1 | 12/2014 | Bramwell et al. | |
| 2014/0359679 A1 | 12/2014 | Bramwell et al. | |
| 2014/0376624 A1 | 12/2014 | Li et al. | |
| 2014/0376645 A1* | 12/2014 | Kumar | H04N 19/89 375/240.27 |
| 2015/0181218 A1 | 6/2015 | Okawa et al. | |
| 2015/0195461 A1 | 7/2015 | Kang et al. | |
| 2015/0206596 A1 | 7/2015 | Baverstock | |
| 2015/0281746 A1 | 10/2015 | Lam | |
| 2015/0363635 A1 | 12/2015 | Ivory et al. | |
| 2016/0092561 A1 | 3/2016 | Normile et al. | |
| 2016/0140695 A1 | 5/2016 | Yuan et al. | |
| 2016/0156926 A1 | 6/2016 | Hashimoto et al. | |
| 2017/0064329 A1 | 3/2017 | Lawrence et al. | |
| 2017/0078376 A1 | 3/2017 | Coward et al. | |
| 2017/0078574 A1 | 3/2017 | Coward et al. | |
| 2017/0078671 A1 | 3/2017 | Coward et al. | |
| 2017/0078676 A1 | 3/2017 | Coward et al. | |
| 2017/0078680 A1 | 3/2017 | Coward et al. | |
| 2017/0078681 A1 | 3/2017 | Coward et al. | |
| 2017/0078687 A1 | 3/2017 | Coward et al. | |
| 2017/0209112 A1 | 7/2017 | Zamyatin et al. | |

OTHER PUBLICATIONS

Final Office Action dated Nov. 16, 2017 for U.S. Appl. No. 14/852,487 by Coward, M., et al., filed Sep. 11, 2015.
Final Office Action dated Nov. 17, 2017 for U.S. Appl. No. 14/852,467 by Coward, M., et al., filed Sep. 11, 2015.
Final Office Action dated Nov. 3, 2017 for U.S. Appl. No. 14/852,456 by Coward, M., et al., filed Sep. 11, 2015.
Non-Final Office Action dated Dec. 5, 2017 for U.S. Appl. No. 14/852,449 by Puntabekar, A., et al., filed Sep. 11, 2015.
Non-Final Office Action dated Oct. 18, 2017 for U.S. Appl. No. 14/852,480 by Coward, M., et al., filed Sep. 11, 2015.
Non-Final Office Action dated Oct. 25, 2017 for U.S. Appl. No. 14/852,464 by Coward, M., et al., filed Sep. 11, 2015.
Non-Final Office Action dated Aug. 8, 2017 for U.S. Appl. No. 14/852,474 by Coward, M., et al., filed Sep. 11, 2015.
Final Office Action dated Mar. 30, 2017, for U.S. Appl. No. 14/852,449 by Puntabekar, A., et al., filed Sep. 11, 2015.
Non-Final Office Action dated May 19, 2017 for U.S. Appl. No. 14/852,467 by Coward, M., et al., filed Sep. 11, 2015.
Non-Final Office Action dated Feb. 27, 2017 for U.S. Appl. No. 14/852,456 by Coward, M., et al., filed Sep. 11, 2015.
Non-Final Office Action dated Feb. 28, 2017, for U.S. Appl. No. 14/852,487 by Coward, M., et al., filed Sep. 11, 2015.
Non-Final Office Action dated Sep. 26, 2016, for U.S. Appl. No. 14/852,449 by Puntambekar, A., et al., filed Sep. 11, 2015.
U.S. Appl. No. 14/852,449 of Puntambekar, A. et al., filed Sep. 11, 2015.
U.S. Appl. No. 14/852,456 of Coward, M. et al., filed Sep. 11, 2015.
U.S. Appl. No. 14/852,464 of Coward, M. et al., filed Sep. 11, 2015.
U.S. Appl. No. 14/852,467 of Coward, M. et al., filed Sep. 11, 2015.
U.S. Appl. No. 14/852,474 of Coward, M. et al., filed Sep. 11, 2015.
U.S. Appl. No. 14/852,480 of Coward, M. et al., filed Sep. 11, 2015.
U.S. Appl. No. 14/852,487 of Coward, M. et al., filed Sep. 11, 2015.

* cited by examiner

ULTRA-HIGH VIDEO COMPRESSION

BACKGROUND

Universal availability of digital video cameras and storage products has enabled new uses of digital video. In contrast to the traditional network delivery of video, e.g., digital satellite or cable television, more and more video is being captured by users using their cameras and smartphones and shared over the Internet with others.

While the availability of internet-connected video capturing devices has soared, the ability of these devices to encode, or compress, and upload the captured audio/video content remains limited. Further, these devices, such as internet-connected cameras, tablets and smartphones, may frequently be offline and thus rely on a service provider to make content captured from the devices available to others at the time and place others want to view the content.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

Figure 1:
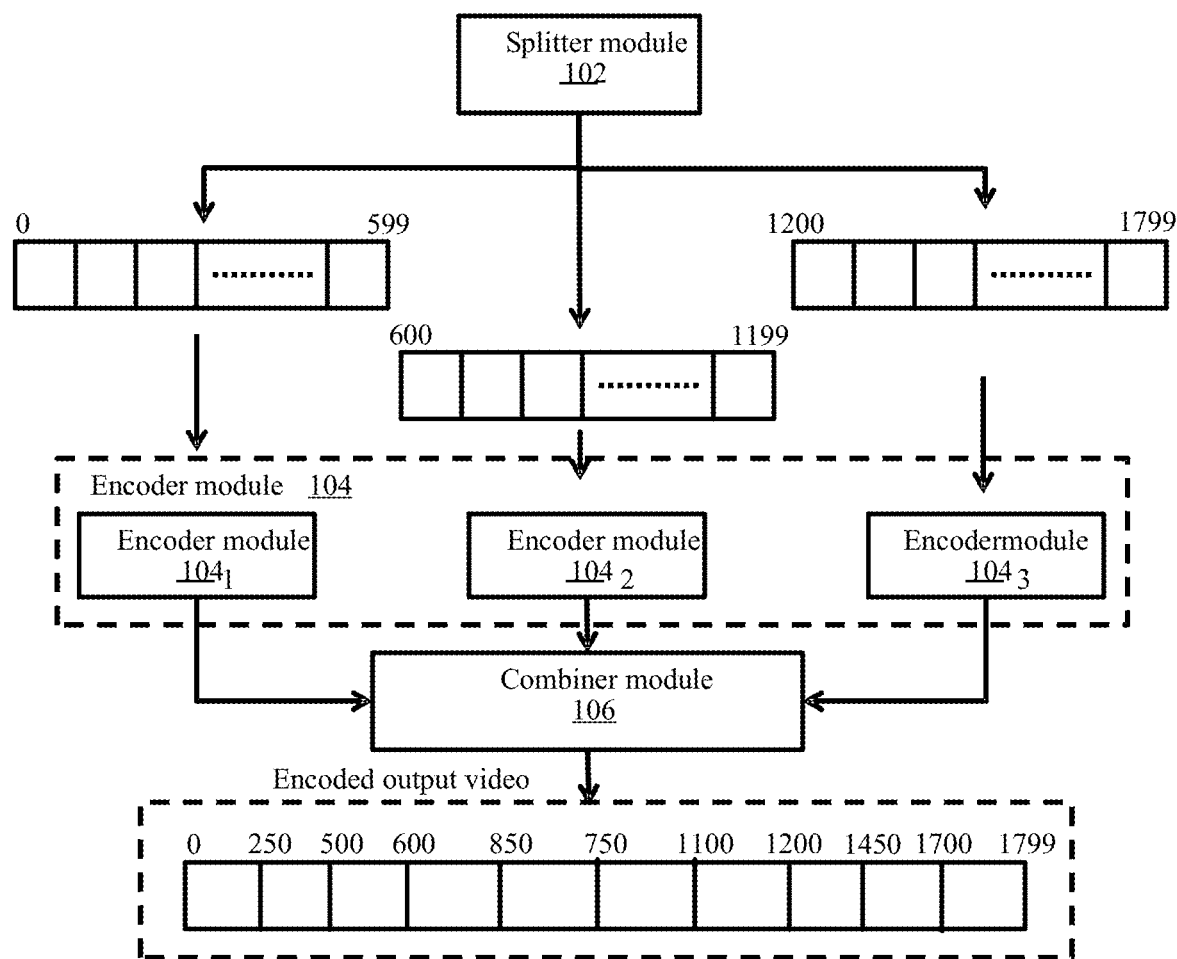
FIG. 1 illustrates a prior art video encoding system.

While the flow and sequence diagrams presented herein show an organization designed to make them more comprehensible by a human reader, those skilled in the art will appreciate that actual data structures used to store this information may differ from what is shown, in that they, for example, may be organized in a different manner; may contain more or less information than shown; may be compressed and/or encrypted; etc.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments.

Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments as defined by the appended claims.

DETAILED DESCRIPTION

Various of the disclosed embodiments disclose allocating a number of bits on a per-frame basis in a distributed video encoding using a complexity analyzer. The analyzer receives an input video for allocating bits for each segment of the input video based on the complexity of the segment and splits the input video into multiple segments. The analyzer determines the bits per frame to be allocated to the multiple segments based on the complexity measurement of the input video. In some embodiments, a single complexity analyzer can be used to determine the complexity of the plurality of segments. In another aspect, a separate complexity analyzer can be used for each segment to determine the complexity. The analyzer can allocate the number of bits to the multiple segments of the input video and combine the multiple segments to form a single output video; thereby, obtaining the encoded output video.

Various of the disclosed embodiments disclose encoding a segment of an input video with accurate placement of key frames, e.g., I-Frames, using Group of Pictures (GOPs) length required for output in a distributed video encoding system with two or more encoders. The encoder creates overlapping segments to allow precise key frame placement, uses the desired segment length and the desired key frame placement to create the overlapping segments, and can skip a number of frames at the beginning of the segment and a certain number of frames at the end of the segment, thereby achieving accurate placement of key frames.

Various of the disclosed embodiments disclose techniques in which video is transmitted from a client device to a server in the network by minimizing the amount of time it takes to upload the video from the client device to the server while being encoded from a first video encoding format in which the video is stored at the client devices to a second video encoding format specified by a user and/or by the server. Operational conditions such as fullness of a transmission buffer at the client device and the target quality of encoded video are used to control the video encoding operation.

Various of the disclosed embodiments relate to a distributed video encoding system that splits an input video into video segments. The video segments are encoded using multiple video encoding nodes. Prior to splitting the video into video segments, the video is analyzed to ensure that each video segment includes all the video frames from which other video frames within that segment have been encoded in the input video. For example, picture headers are inspected to determine the temporal distance of the farthest past and future reference frames used for encoding frames of a video segment.

Various of the disclosed embodiments describe techniques in which multiple video encoders are used to simultaneously encode a video using encoders configured using different encoding parameters. A segment selector selects an encoded version of the encoded video segment using operational criteria such as video quality and bandwidth. A configuration determination module may analyze the video segment to make a decision about which encoding parameter configurations may be suitable for encoding the video segment. The configuration determination module may be trainable, based on past encoding results.

Various of the disclosed embodiments perform stabilization of images in a video. In a distributed video encoding system, a video is encoded by splitting into video segments and encoding the segments using multiple encoders. Prior to segmenting the video for distributed video encoding, image stabilization is performed on the video. For each frame in the video, a corresponding transform operation is first computed based on an estimated camera movement. Next, the video is segmented into multiple video segments and the corresponding per-frame transform information for the multiple video segments. The video segments are then distributed to multiple processing nodes that perform the image stabilization of the corresponding video segment by applying the corresponding transform. The results from all the stabilized video segments are then stitched back together for further a video encoding operation.

Various of the disclosed embodiments relate to a distributed video encoding or transcoding system that may utilize multiple encoding nodes to encode/transcode a video by splitting the video into multiple smaller video segments. The assignment of video segments to the encoding nodes is performed to balance the use of the encoding nodes by selecting a node based on its encoding capabilities, e.g., whether the node employed a central processing unit (CPU) based encoding or graphics processor unit (GPU) based encoding.

Various of the disclosed embodiments disclose video encoding or transcoding operation in a distributed video encoding system to meet a service layer agreement such as a target time for completion of the video encoding operation. Each of multiple videos being encoded is split into smaller jobs corresponding to video segments of the videos. The jobs are processed according to a job queue. The sequence of jobs in the job queue is periodically updated such that jobs corresponding to each video are processed within the corresponding target encoding time.

In various embodiments, distributed video and image processing may be performed using computational resources that are available on hardware platforms that are communicatively coupled to each other via network connections. The network between two such computational hardware platforms may be geographically distributed, and the communication may travel over networks that may or may not be controlled by the same entity that controls the availability and use of the computational resources. For example, the computational resources may include servers available in the cloud at unspecified or unknown locations, e.g., at locations not known to the video encoders. As another example, the computational resources may be available on servers available at data centers managed by a social networking service provider.

Video is being produced and consumed more than ever, and in more formats, device types and variety of networks than ever. Transcoding, or encoding, is a process of translating or converting a video encoded from one format to another. In some embodiments, only bitrate of the video bitstream may be changed. Encoding is a computationally intensive process. Due to the proliferation of video content used, distributed computing approach has been applied to video encoding to exploit the extra computational resources available among multiple machines, multi-core CPUs, and distributed computing resources in a given facility, home or a dedicated cloud computing infrastructure, and so on. This distributed encoding approach has been helpful in reducing rendering and start-up time of a video for on demand encoding.

Encoding systems take an input video, composed of many frames (I, P, or B frame types), and create a new output video, often with a different output resolution or bit-rate and often with different frame types. In normal encoding systems, there is no relation between the placement of I-Frames in the input video and the output video; the encoding system can output frames in any order and type specified by the user. This is important because the type of frames used has a significant impact on the output bit-rate and quality, and selection is done based on output bit-rate and/or quality requirements.

Traditional video encoding systems use a single encoder to encode input video. In this implementation, it is easy to configure the system to place I-Frames accurately in the output video. As the encoder is working through the input video, it can make a decision for the frame type for each frame of the output video based on user parameters.

Distributed Encoding Systems enable multiple different computers to work together to create a single output video by encoding individual segments of the video before the encoded segments are joined together into a single output vide. The input video is broken into output segments, where the segments are divided at I-Frames. When a computer takes an input video segment and creates an output video segment, it must start the output video segment with an I-Frame. This means that there is now a relation between the placement of the I-Frames in the input video and in the output video, and it makes it difficult to guarantee accurate I-Frame placement in the output video, using known mechanisms.

Various examples of the disclosed techniques will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the techniques can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this section.

Overview—Example Network Topology

Figure 11:
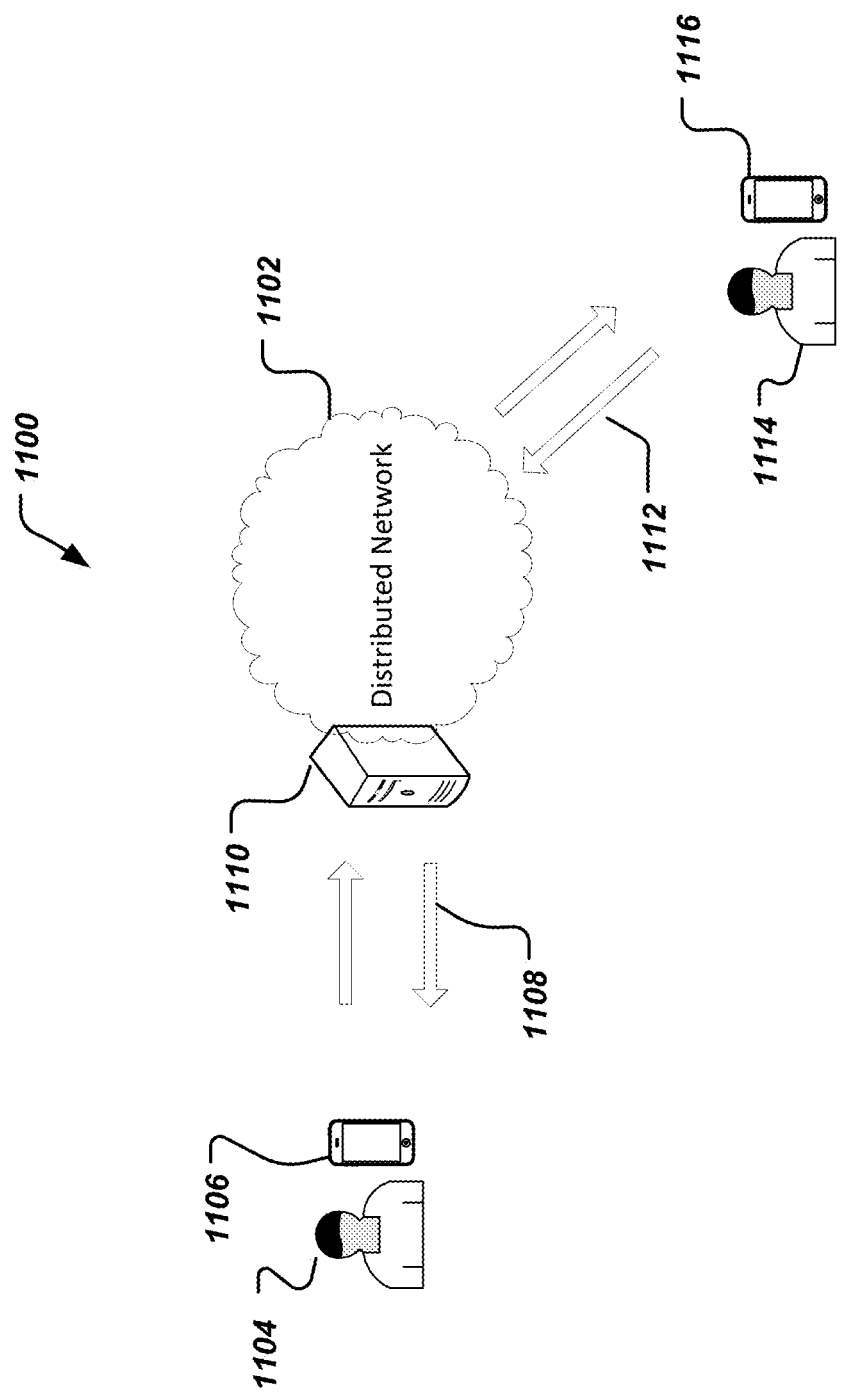
FIG. 11 illustrates an example of a communication network for video uploading and sharing.

Turning now to the figures, FIG. 11 Illustrates an example of a communication network 1100 in which a distributed network 1102 is operating to facilitate the use of digital video among multiple users—user 1104 who may be the originator of a video using his user device 1106 and users 1114 with their user devices 1116, who may download and view the video sequence that the user device 1106 uploads to a server 1110 in the distributed network 1102. The user devices 1106, 1116 may communicate with the distributed network 1102 via communication networks or channels 1108, 1112. The channels 1108, 1112 may be same or different networks, e.g., the Internet or World Wide Web, and may change from time to time based on location. For example, user devices 1106, 1116 may include multiple network modules, e.g., a Wi-Fi modem, a 3G modem, a 4G modem, a WiMax modem, etc. and may use one or more of the network connections for communication in the upstream direction (from the device to the network) or the downstream direction (from the network to the device).

In one example use case, the user 1104 may capture a video clip using a camera-enabled smartphone (user device 1106). The user 1104 may then instruct the user device 1106 to upload the video to the server 1110, which may be a server operated by a service provider, e.g., a social media website. Once the user device 1106 uploads the video to the server 1110, the service provider may operate the distributed network 1102, e.g., a geographically distributed server farm, to propagate the availability of the user's video clip to other users with whom the user 1104 wishes to share the video clip, e.g., user 1114.

In conventional video upload and sharing systems, a user typically cannot control the video upload process. For example, many users capture videos using their mobile phones, but cannot control the quality or other encoding parameters when the captured video is converted into a compressed digital video bitstream. Further, the user may be able to initiate video uploading to a social media website or to a service provider's file transfer protocol (ftp) site, but may not be able to control operational characteristics of the upload such as the upload speed or quality throttling of the uploading process in real time.

Furthermore, depending on the user's operating condition, the user's preferences for how the video should be uploaded may change. For example, when the user is on the go, the user may want uploading to happen as fast as possible, where video quality may be sacrificed to meet faster upload performance. As another example, in another operational scenario, the user may want to upload the video by encoding at the highest possible quality, e.g., when the user device is operating in a Wi-Fi broadband network. In yet another operating scenario, the user may incur byte-based uploading costs and thus may want to upload a video using the minimum file size while still meeting some low quality threshold. In some embodiments, encoded video quality may be held constant, but encoding effort may be varied based on the available bandwidth for upload.

Many service providers today operate distributed computer networks that can propagate user-uploaded files to geographically distributed file stores for access from anywhere in the world. These service providers may also interface with and rely on content delivery network (CDN) infrastructure such as CDNs operated by Akamai or Lime-Light Networks. When it comes to the distribution of user-uploaded videos though, the service providers often fail to fully utilize the available computational power in a distributed network.

In traditional distributed video encoding systems as shown in FIG. 1, the input video is split into multiple segments by a splitter module. Each video segment is then passed onto an encoder, where the encoder processes the received video segment into an output video segment (i.e., changing the video segment from the source format to other format which is compatible with any other device). The output video segments from all the video encoders are combined together as shown in the FIG. 1; thereby, achieving a single output video.

For example, if the input video has the I-Frame for every 60 frames then there will be an I-Frame at frame 0, 60, 120, 180, 240, 300, 360, etc. The distributed video encoding system will break up the input video at predetermined points, and pass each segment to the separate encoder. If the configured split size is 600 frames, each encoder will receive 600 frames to encode. If the user wants the output video to have an I-Frame every 250 frames, it is not possible for the system to follow this restriction. Each encoder will place the I-Frame at frame 0, frame 250, and frame 500. When 2 of these pieces are combined together, the output video will have frames at 0, 250, 500, 600, 850, and 1100; thus not achieving the task of placing an I-Frame every 250 frames as specified by the user Thus, it would be beneficial to accurately place I-Frames in the output video when a distributed video encoding system is used to produce the output video.

The techniques disclosed herein can be used to, among other uses, address the shortcomings of present-day video uploading and processing in a distributed network. These, and other, detail are disclosed in the present document.

In some embodiments, input video is segmented into overlapping segments that each contain the requisite data to construct an output segment that begins with a key frame (e.g., an independently decodable frame) and has a desired length. The overlapping segmentation is performed such that everywhere there is a desired output key frame, there will be enough data after that location to have a complete segment and enough data before that location to have an input key frame. To achieve this, every encoder is configured to ignore extra video frames before and/or after the desired output segments.

Figure 2:
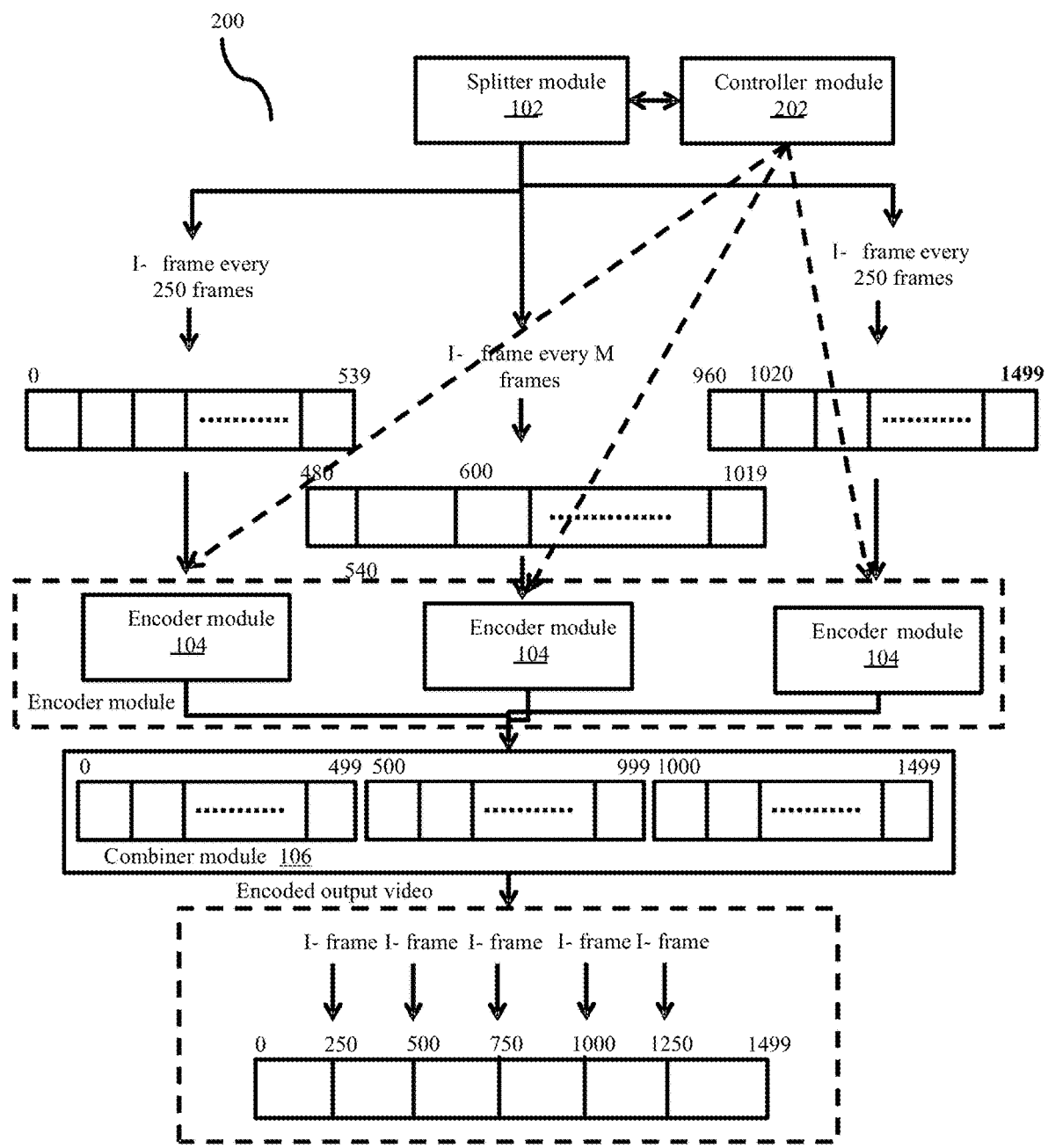
FIG. 2 illustrates an example of a distributed video encoding system.

FIG. 2 illustrates a high level overview of a distributed video encoding system 200 to accurately place I-Frames in an output video using a controller module, according to the embodiments as disclosed herein. In an embodiment, the distributed video encoding system 200 includes a splitter module 102, a controller module 202, one or more encoder modules $104_{1-N}$ (hereafter referred as encoder module(s) 104), and a combiner module 106.

The splitter module 102 can be configured to receive an input video including an I-Frame for some number of (e.g., 60) frames of the input video that is to be encoded from a source format to any other format. The splitter module 102 splits the received input video into a plurality of segments each including a specified number of frames. Here, the splitter module 102 can be configured to receive information from the controller module 202 to split the received input video into pieces of length (i.e., segment length) having 600 frames and also placement of I-Frames for every 250 frames (Output Group of Pictures (GOP) length) of the input video. For example, the splitter module 102 splits the input video into a video segment-1, a video segment-2, and a video segment-3 as shown in the FIG. 2. Here, the video segment-1 includes 0 to 539 frames of the input video. The video segment-2 includes 480 to 1019 frames of the input video. The video segment-3 includes 960 to 1500 frames of the input video. Each segment includes one or more overlapping frames at the beginning of the segment with immediately preceding segment, and one or more overlapping frames at the end of the segment with immediately following segment. Also, the two sequential segments carry the starting frame of the overlapping GOP.

The splitter module 102 determines a number of output GOPs that can fit into each segment length. Here, the splitter module 102 determines 2 output GOPs for each segment of the input video. In an embodiment, the number of frames in each segment can be based on for example, a scene changes in the input video. For example, if the video segment contains the scene change, the frames before the scene change could be drastically different than the frames after the scene change. The encoding of the segment may involve significant challenges. In this case, it would be desirable to alter the length of the segment such that it may not include the scene change for the effectively performing the encoding.

The splitter module 102 segments entire input GOPs to the segment until the segment has enough frames to create the desired number of output GOPs. The splitter module 102, for the first segment, 540 frames (i.e., start frame 0 to 539 frames) can be segmented so that the 2 output GOPs of length 250 each (i.e., 500 frames total) can be supported. The splitter module 102, for the second segment and all subsequent segments, the algorithm will repeat this process, but it will first rewind by one or more GOPs in the input. The second segment starts at frame 480 so that the segment includes frame 500, which is used for the 2nd output GOP. The third segment starts at frame 960 so that the segment includes frame 1000, which is used for the 3rd output GOP. The splitter module 102 sends the length of each segment, and the start and stop frame of each segment to the controller module 202.

Unlike conventional systems, the controller module 202 can be configured to send information to split the received input video into various pieces of length (e.g., segment length) and also placement of I-Frames in the input video. The controller module 202 can be configured to send a number of frames to skip at the beginning of each video segment, where to place each I-Frame, and a number of frames to skip at the end of each video segment to the encoder module 104.

Further, the splitter module 102 outputs the video segments (i.e., video segment-1, video segment-2, and video segment-3) to the encoder modules 104. After receiving multiple segments from the splitter module 102, the encoder module 104 can encode according to a Windows Media Video or VC-1 format, MPEG-x format (e.g., MPEG-1, MPEG-2, or MPEG-4), H.26x format (e.g., H.261, H.262, H.263, or H.264), or other format. In an embodiment, the encoder module 104 receives the number of frames to skip at the beginning of the frame and at the end of the frame from the controller module 202 as shown below:

Video Segment-1 (0 to 539 frames): Skip "0" frame at the beginning of the video segment and place the I-Frame at every 250 frames of the video segment. Skip "40" frames at the end of the video segment.

Video Segment-2 (480 to 1019 frames): Skip "20" frames at the beginning of the video segment and place the I-Frame at every 250 frames. Skip "20" frames at the end of the segment.

Video Segment-3 (960 to 1500 frames): Skip "40" frames at the beginning of the video segment and place the I-Frame at every 250 frames. Skip "0" frames at the end of the segment.

Further, the encoder module 104 then processes each video segment received from the splitter module 102 and by using the information from the controller module 202 to determine how many frames to skip and then skips the frames at the beginning of the frame and at the end of the frame for accurate placement of I-Frames. The video segments from the encoder module 104 are sent to the combiner module 106. On receiving the video segments from the encoder module 104, the combiner module 106 combines the plurality of segments to form the single encoded output video with accurate placement of I-Frames.

FIG. 2 illustrates a limited overview of a distributed video encoding system 200 but it is to be understood that another embodiment is not limited thereto. Further, the system 200 can include any number of video processing modules and techniques along with other hardware or software components communicating with each other. For example, the component can be, but not limited to, a process running in the controller or processor, an object, an executable process, a thread of execution, a program, or a computer. By way of illustration, both an application running on a device and the device itself can be a component.

Figure 3:
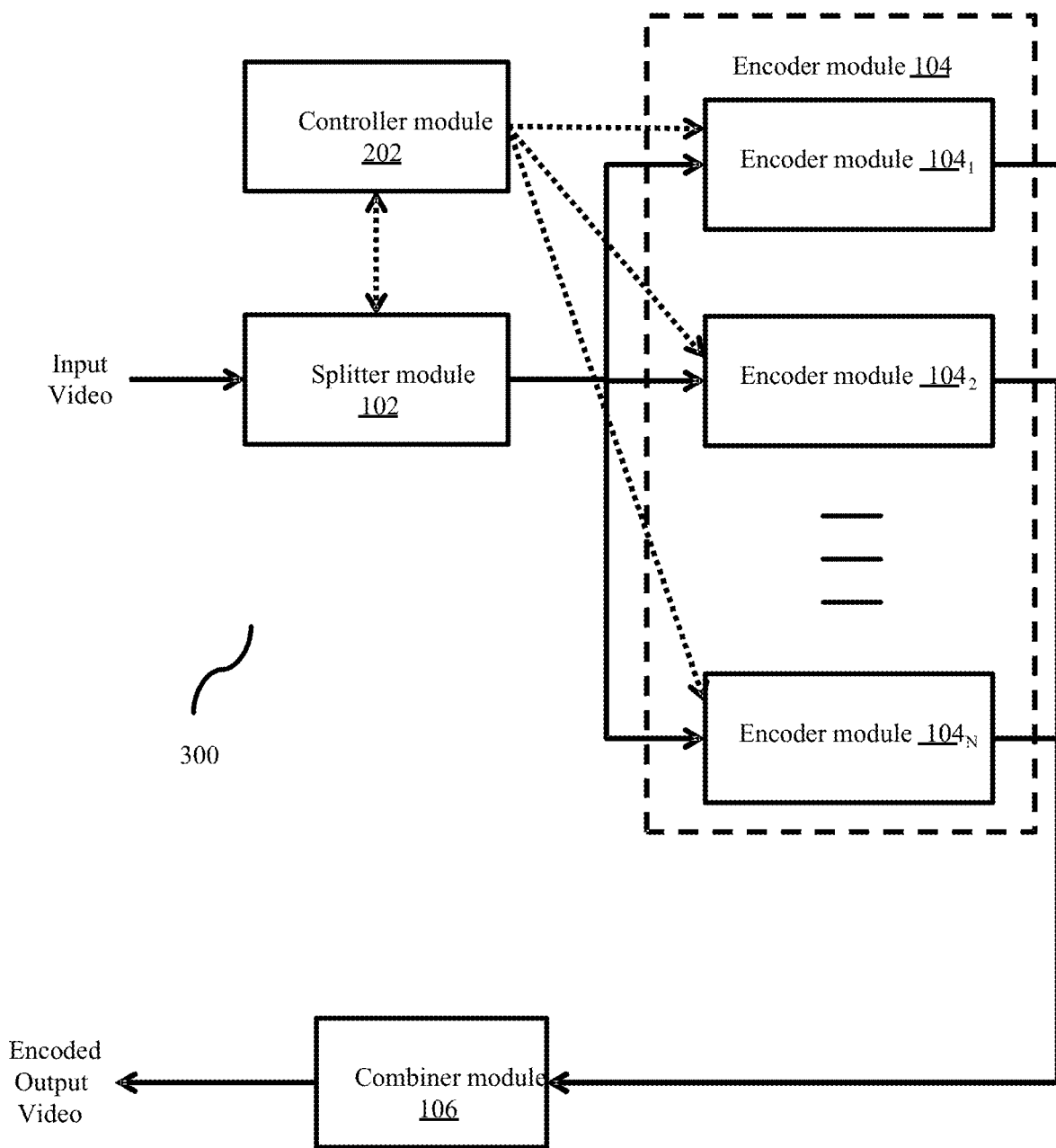
FIG. 3 illustrates another example of a distributed video encoding system.

FIG. 3 illustrates another high level overview of a distributed video encoding system 300 to accurately place I-Frames in an output video, according to embodiments as disclosed herein. In an embodiment, the distributed video encoding 300 includes a splitter module 102, a controller module 202, one or more encoder modules $104_{1-N}$ (hereafter referred as encoder module(s) 104), and a combiner module 106.

The detailed operations of each module included in the FIG. 3 are explained in conjunction with the FIG. 2. The FIG. 3 illustrates a limited overview of a distributed video encoding system 300 but it is to be understood that another embodiment is not limited thereto. Further, the system 300 can include any number of video processing modules and techniques along with other hardware or software components communicating with each other. For example, the component can be, but not limited to, a process running in the controller or processor, an object, an executable process, a thread of execution, a program, or a computer. By way of illustration, both an application running on a device and the device itself can be a component.

Figure 4:
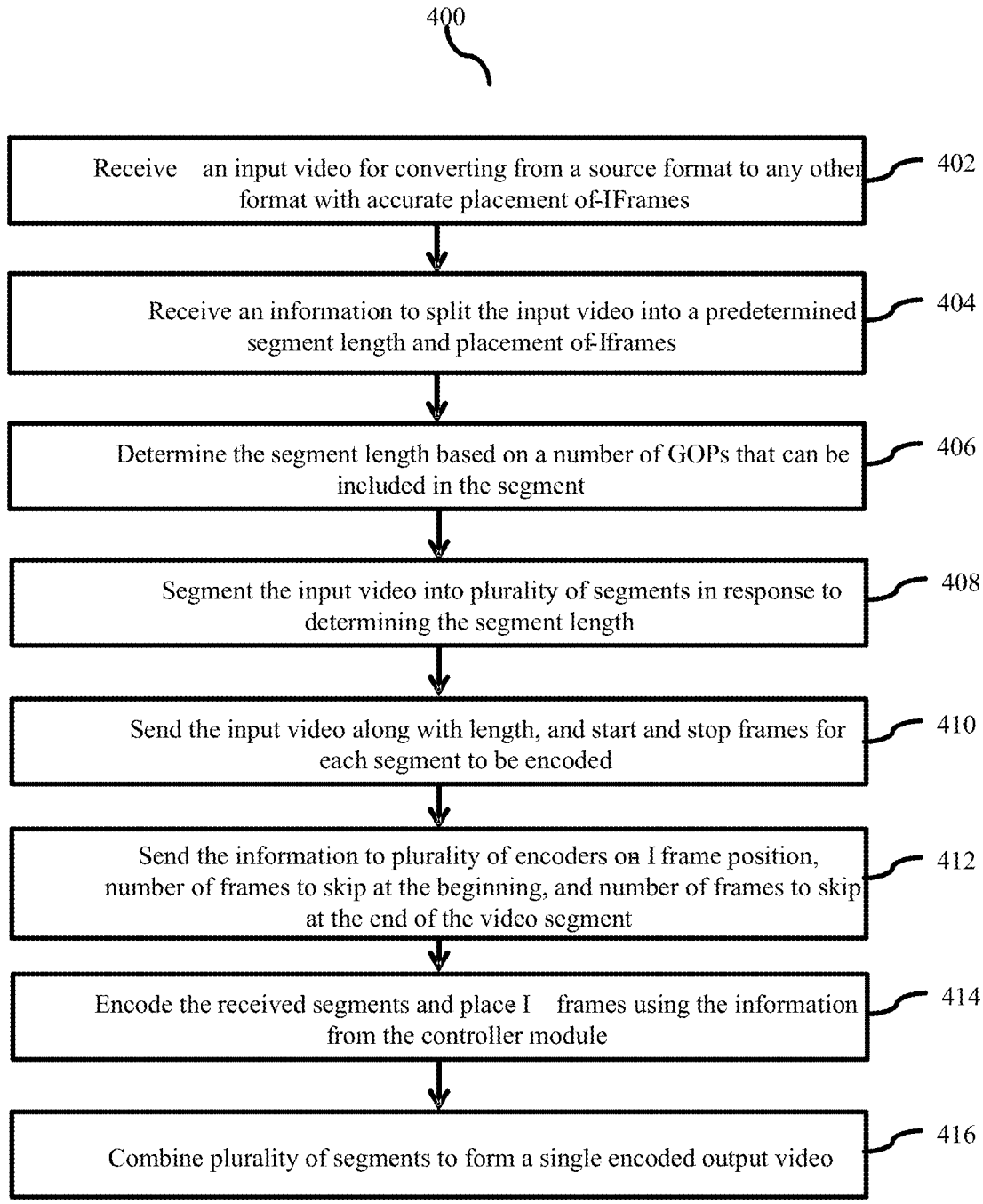
FIG. 4 illustrates an example method of placing key frames at desired locations in an output video bitstream.

FIG. 4 is a flow diagram illustrating a method to accurately place I-Frames in an output video using a controller module in a distributed video encoding system, according to embodiments as disclosed herein. At block 402, the method 400 includes receiving an input video for converting from a source format to any other format with accurate placement of I-Frames. The method 400 allows the splitter module 102 to receive the input video for converting from a source format to any other format with accurate placement of I-Frames. At block 404, the method 400 includes receiving the information to split the input video into a predetermined segment length and also placement of I-frames from the controller module 202. Unlike conventional systems, the method 400 allows the splitter module to receive the information to split the input video into a predetermined segment length and also placement of I-frames from the controller module 202. For example, the splitter module 102 receives information from the controller module 202 to split the received input video into pieces of length (i.e., segment length) 600 frames and also placement of I-Frames for every 250 frames (Output Group of Pictures (GOP) length) of the input video.

At block 406, the method 400 includes determining the segment length based on a number of GOPs that can be included in each segment. The method 400 allows the splitter module 102 to determine the segment length based on the number of GOPs that can be included in each segment of the input video. At block 408, the method 400 includes segmenting the received input video into plurality of segments after determining the segment length. The method 400 allows the splitter module 102 to determine the segment length based on the number of GOPs that can be included in each segment of the input video. In an embodiment, the splitter module 102 splits the input video into a video segment-1, a video segment-2, and a video segment-3. Here, the video segment-1 includes 0 to 539 frames of the input video. The video segment-2 includes 480 to 1019 frames of the input video. The video segment-3 includes 960 to 1500 frames of the input video. The splitter module 102 determines 2 output GOPs that can fit into each segment length.

At block 410, the method 400 includes sending the input video along with the length of the video segment, start and stop frames for each segment to be encoded. Unlike conventional systems, the method 400 allows the splitter module 102 sends the input video along with the length of the video segment, start and stop frames for each segment to be encoded to the controller module 202 to decide on the number of frames to skip at the beginning and at the end of each segment. Also, the splitter module 102 sends the plurality of segments to the encoder modules 104. At block 412, the method 400 includes sending the information to plurality of encoders on the I-Frame position, number of frames to skip at the beginning of the video segment, and number of frames to skip at the end of the video segment. The method 400 allows the encoder module 104 to receive the information to plurality of encoders on the I-Frame position, number of frames to skip at the beginning of the video segment, and number of frames to skip at the end of the video segment to accurate place I-Frames in the video segment.

In an embodiment, a separate encoder can be used to receive each segment of the video for transferring the segment from one format to another format while achieving accurate placement of the I-Frames in the input video. For example, consider an encoder-1, an encoder-2, and an encoder-3 receives an input video split into three segments namely, segment-1, segment-2, and segment-3 respectively. Also, the encoder-1 receives information to skip '0" frames at the beginning of the video segment and placing the I-Frame at every 250 frames of the video segment. Skip "40" frames at the end of the video segment. The encoder-2 receives information to skip "20" frames at the beginning of the video segment and placing the I-Frame at every 250 frames. Skip "20" frames at the end of the segment. The encoder-3 receives Skip "40" frames at the beginning of the video segment and place the I-Frame at every 250 frames. Skip "0" frames at the end of the segment. The encoder-1 Unlike conventional systems, different encoder's uses information received from the controller module 202 to accurately place I-Frames in each segment of the video such as to generate a uniform quality of video.

Further, at block 414, the method 400 includes encoding the received segments and places the I-Frames using the information from the controller module 202. The method allows the encoder module 104 to encode the received segments and places the I-Frames using the information from the controller module 202. At block 416, the method 400 includes combining the plurality of segments received from the encoder module 104 to form a single encoded output video with accurate placement of I-Frames. The method 400 allows the combiner module 106 to combine the plurality of segments to form the single output video. For example, the segment-1 from the encoder-1, the segment-2 from the encoder-2, and the segment-3 from the encoder-3 are combined to form the single output video. Unlike conventional systems, creating overlapping segments in order to allow precise I-Frame placement in the input video. The splitter uses the desired segment length and the desired I-Frame placement to create overlapping segments. The encoder skips the number of frames at the beginning and at the end of the video segment for accurate placement of I-Frames.

The various actions, acts, blocks, steps, and the like in the method 400 may be performed in the order presented, in a different order or simultaneously. Further, in some embodiments, some actions, acts, blocks, steps, and the like may be omitted, added, modified, skipped, and the like without departing from the scope of the invention.

Traditionally, a variable bit-rate (VBR) bitstream is created using a single-pass encoding or a multi-pass encoding. The single-pass encoding analyzes and encodes the data "on the fly" and it is used in a constant bit-rate (CBR) encoding. The single-pass encoding is used when the encoding speed is most important (e.g., for real-time encoding). The single-pass VBR encoding is usually controlled by the fixed quality setting or by the bit-rate range (i.e., minimum and maximum allowed bit-rate) or by the average bit-rate setting. The multi-pass encoding is used when the encoding quality is most important. The multi-pass encoding may not be used in real-time encoding and live broadcast or live streaming scenarios.

The multi-pass encoding is typically used for the VBR encoding because the CBR encoding doesn't offer any flexibility to change the bit-rate. VBR encoding allows a higher bit-rate to be allocated to the more complex segments of the input video while a lower bit-rate is allocated to the less complex segments of the input video. The average of these bit-rates can be calculated to produce the average bit-rate for the video. The most common VBR encoding is a two-pass encoding. In the first pass of the two-pass encoding, the input data is being analyzed to locate the scenes that have higher complexity (i.e., which require a larger amount of bits in order to achieve the desired quality) and the result is stored in a log file. In the second pass, the collected data from the first pass is used to allocate bits-per-frame to each frame in the video for achieving the best video encoding quality. In the video encoding process, the two-pass encoding is usually controlled by the average bit-rate setting or by the bit-rate range setting (e.g., minimal and maximal allowed bit-rate) or by the target video file size setting.

However, in the distributed video encoding process, the input video can be split into multiple segments and the multiple segments are assigned to different computers to perform the video encoding process. Here, each computer, on receiving a video segment, performs video encoding within the single segment available to it. The distributed video encoding system performing video encoding using variable number of bits per frame within the single segment may not achieve good encoding performance across multiple segments as each computer is working on a single segment and thus cannot access information about complexity in other segments to better allocate a number of bits per frame. For example, consider a scenario where the input video has a high complexity region in the middle of the video. The high complexity region of the video is allocated (in a non-distributed system) with additional bits to deliver good video quality. In a traditional distributed video encoding system where the input video is split into multiple segments, each segment encoder achieves the average bit-rate for its segment and therefore at the video level, bits are undesirably allocated to the high and low complexity segments of the video equally.

In traditional distributed video encoder systems as shown in FIG. 1, the input video is split into multiple segments by a splitter module. Each video segment is then passed onto an encoder, where the encoder processes the received video segment into an output video segment (i.e., changing the video segment from the source format to other format which is compatible with any other device). The output video segments from all the video encoders are combined together as shown in the FIG. 1; thereby, achieving a single output video.

Thus, it is beneficial to accomplish high quality encoding by allocating a variable number of bits per frame in the distributed video encoding system; thereby, maintaining uniform quality across the video.

Figure 5:
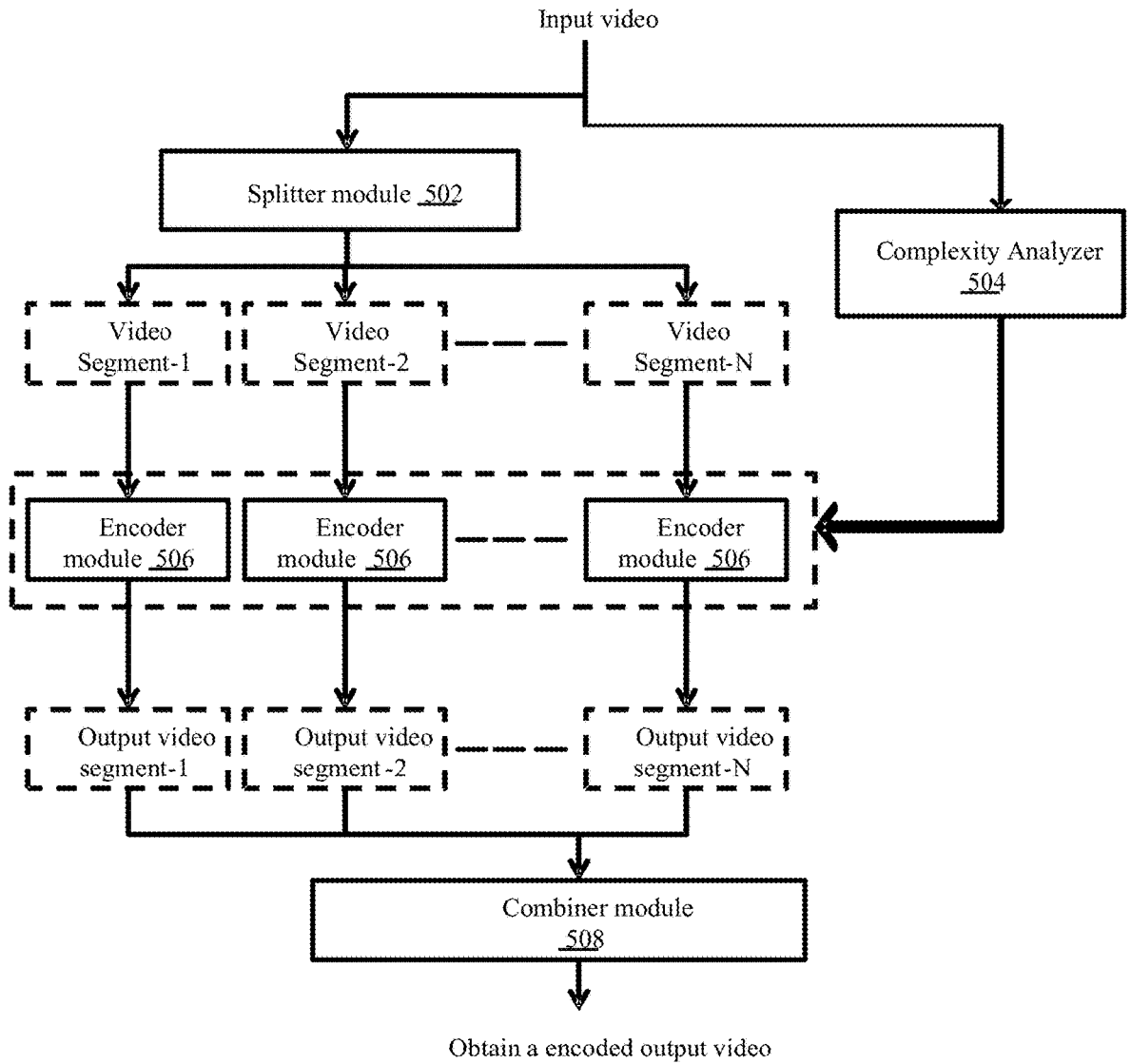
FIG. 5 illustrates an example of a distributed video encoding system for computing and allocating bits on a per frame basis using a complexity analyzer.

FIG. 5 illustrates a high level overview of a distributed video encoding 500 for allocating a variable number of bits per frame in a distributed video encoding using a complexity analyzer, according to the embodiments as disclosed herein. In an embodiment, the distributed video encoding 500 includes a splitter module 502, a complexity analyzer module 504, one or more encoder modules $506_{1-N}$ (hereafter referred as encoder module(s) 506), and a combiner module 508.

The splitter module 502 can be configured to receive an input video that is to be encoded from a source format to any other format. Here, the input video generally refers to a stream including both audio components and video components. The splitter module 502 splits the received input video into a plurality of segments each including a certain number of frames. For example, the splitter module 502 splits the input video into a video segment-1, a video segment-2, and a video segment-3. In an embodiment, each segment includes 60 frames. In another embodiment, each segment can vary across a range of values such as including between 30 frames to 90 frames. The number of frames in each segment can be based on for example, a scene changes in the input video. For example, if the video segment contains the scene change, the frames before the scene change could be drastically different than the frames after the scene change. The encoding of the segment may involve significant challenges. In this case, it would be desirable to alter the length of the segment such that it may not include the scene change for the effectively performing the encoding.

Further, the splitter module 502 can be configured to output the video segments to the encoder modules 506. After receiving multiple segments from the splitter module 502, the encoder module 506 can encode according to a Windows Media Video or VC-1 format, MPEG-x format (e.g., MPEG-1, MPEG-2, or MPEG-4), H.26x format (e.g., H.261, H.262, H.263, or H.264), or other format. The encoder module 206 can encode according to one or more audio standards such as WAV, FLAC, MP3, WMA, or some other standard. The encoder module 506 can also receive the number of bits to be allocated to each segment of the input video from the complexity analyzer module 504.

The complexity analyzer module 504 can be configured to receive the input video that is to be encoded from a source format to any other format. The complexity analyzer module 504 can be configured to process the entire video to measure the complexity of the video at every frame of the video. After determining the complexity at every frame of the video, the complexity analyzer module 504 can be configured to compute the bits-per-frame to be allocated to each segment. Thus, a given segment can be encoded at a bitrate independently from any other segment. Unlike conventional systems, the complexity analyzer module 504 can be configured to send the bits per frame allocated to each segment to the respective encoder module 506, in order to achieve a uniform video quality across segments of the video.

Further, the encoder module 506 receives the video segments from the splitter module 502 and also receives the bitrate settings to be used in each segment for generating a uniform video quality. Each segment is allocated with the bitrate settings received from the splitter module 502 based on the complexity associated thereof. The combiner module 508 receives the output video segments from the encoder modules 506 and combines the output video segments to generate the encoded video output.

FIG. 5 illustrates a limited overview of a distributed video encoding system 500 but it is to be understood that another embodiment is not limited thereto. Further, the system 500 can include any number of video processing modules and techniques along with other hardware or software components communicating with each other. For example, the component can be, but not limited to, a process running in the controller or processor, an object, an executable process, a thread of execution, a program, or a computer. By way of illustration, both an application running on a device and the device itself can be a component.

Figure 6:
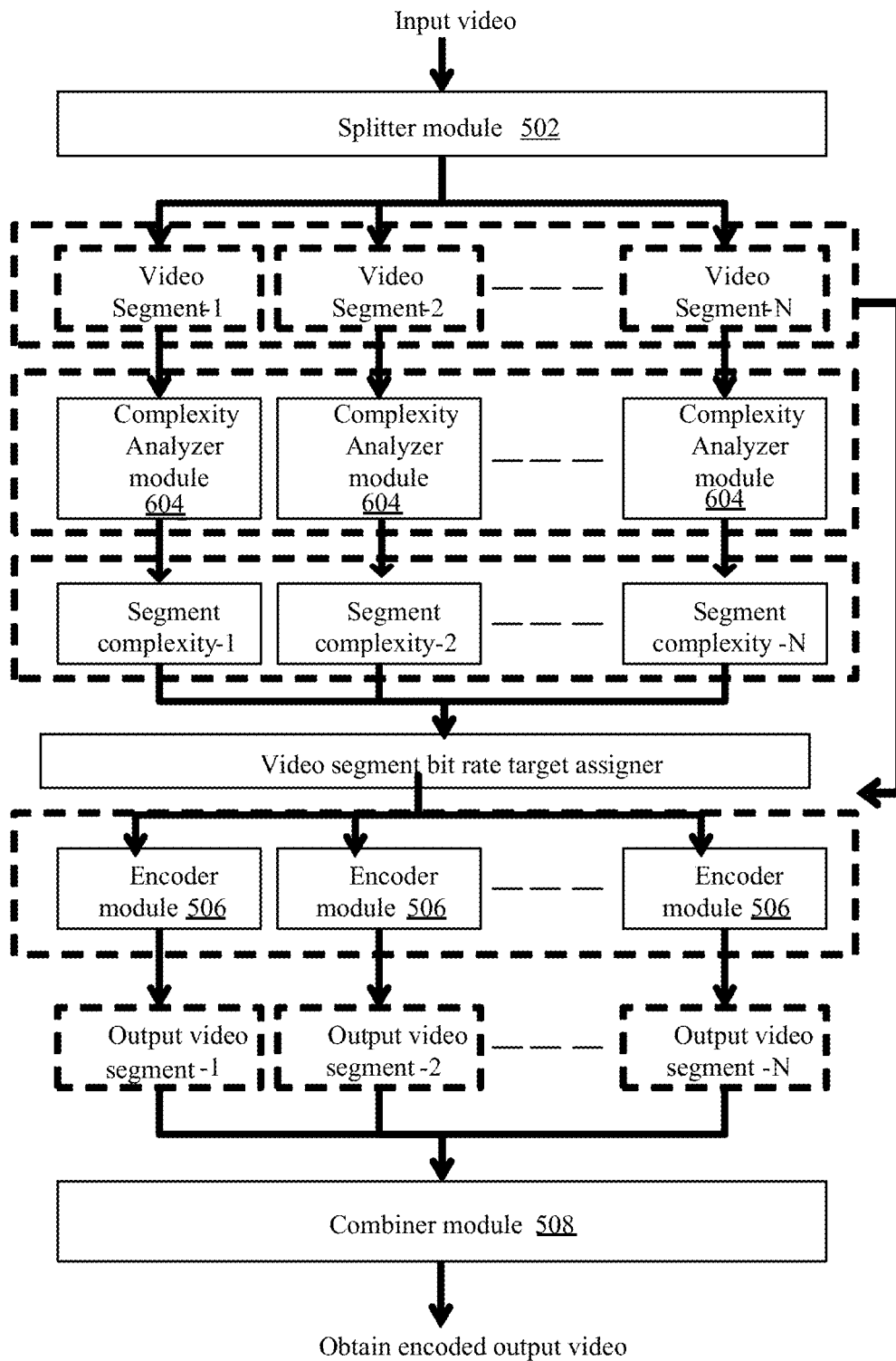
FIG. 6 illustrates another example of a distributed video encoding system for computing and allocating bits on a per frame basis using a complexity analyzer.

FIG. 6 illustrates another high level overview of a distributed video encoding system 600 for computing and allocating a variable number of bits per frame using a separate complexity analyzer for each segment of a video, according to embodiments as disclosed herein. In an embodiment, the input video is split into plurality of segments including a set of frames. Each segment of the video is passed through a separate complexity analyzer module 604, which produces an output file that describes the video complexity for each frame of the video. Once the complexity analyzer modules 604 determine the complexity of each segment, a bit-rate for each video segment is computed and is passed to the encoder module 506 to achieve a desired quality of video. Further, detailed operations by the system 600 are described in conjunction with the FIG. 9.

FIG. 6 illustrates a limited overview of the system 600 but it is to be understood that another embodiment is not limited thereto. Further, the system 600 can include any number of video processing modules and techniques along with other hardware or software components communicating with each other. For example, the component can be, but not limited to, a process running in the controller or processor, an object, an executable process, a thread of execution, a program, or a computer. By way of illustration, both an application running on a device and the device itself can be a component.

Figure 7:
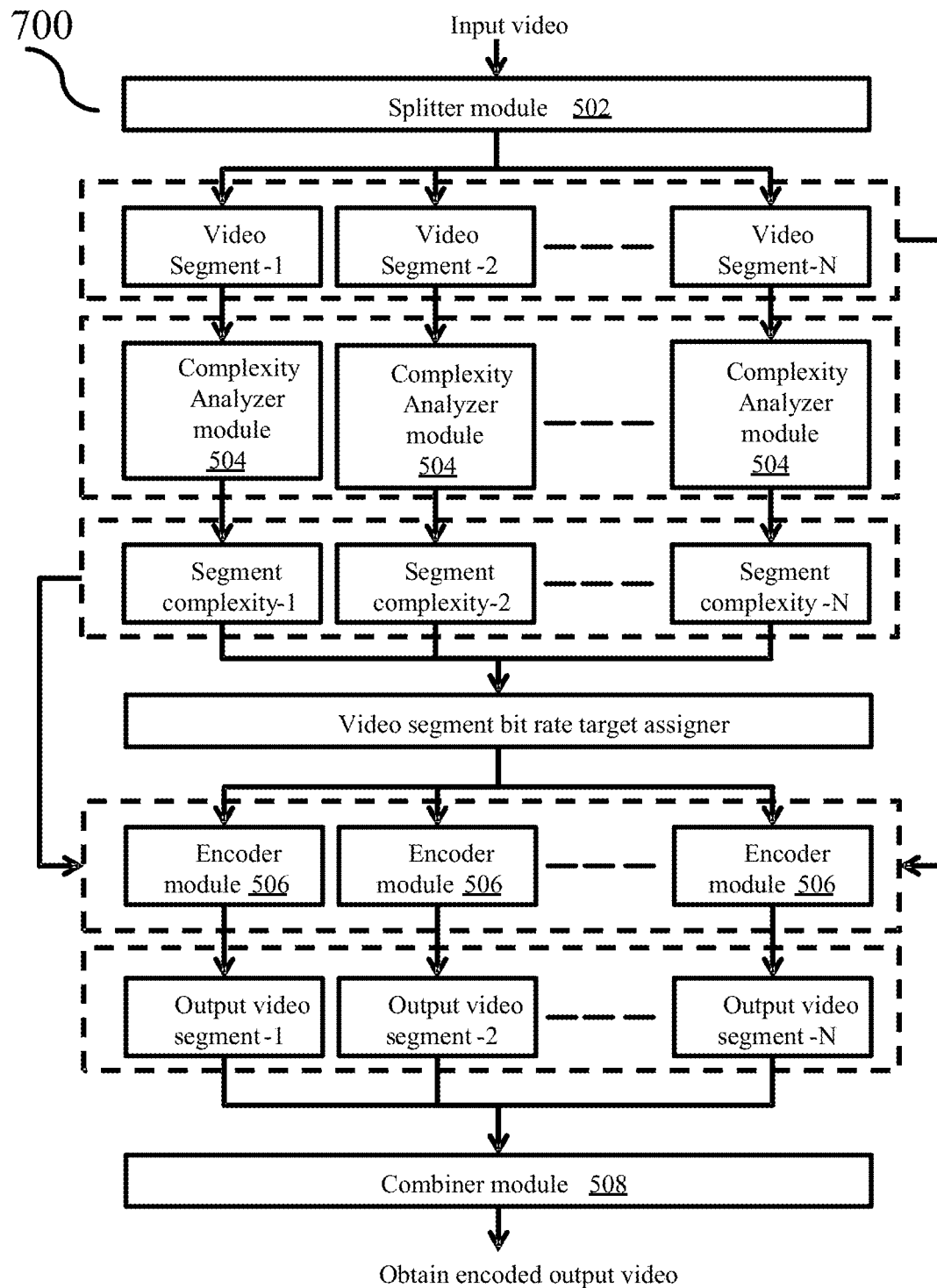
FIG. 7 another example of a distributed video encoding system for computing and allocating bits on a per frame basis using a complexity analyzer.

FIG. 7 illustrates another high level overview of a distributed video encoding system 400 for computing and allocating a variable number of bits per frame using a separate complexity analyzer for each segment of a video and adding a pathway that passes each segment complexity measurement to a corresponding encoder, according to embodiments as disclosed herein. In an embodiment, the encoder module 206 can use the segment complexity information computed earlier to make effective local decisions within the segment. Further, the various operations performed by the distributed video encoding system 700 are described in conjunction with the FIG. 10.

FIG. 7 illustrates a limited overview of the system 700 but it is to be understood that another embodiment is not limited thereto. Further, the system 700 can include any number of video processing modules and techniques along with other hardware or software components communicating with each other. For example, the component can be, but not limited to, a process running in the controller or processor, an object, an executable process, a thread of execution, a program, or a computer. By way of illustration, both an application running on a device and the device itself can be a component.

Figure 8:
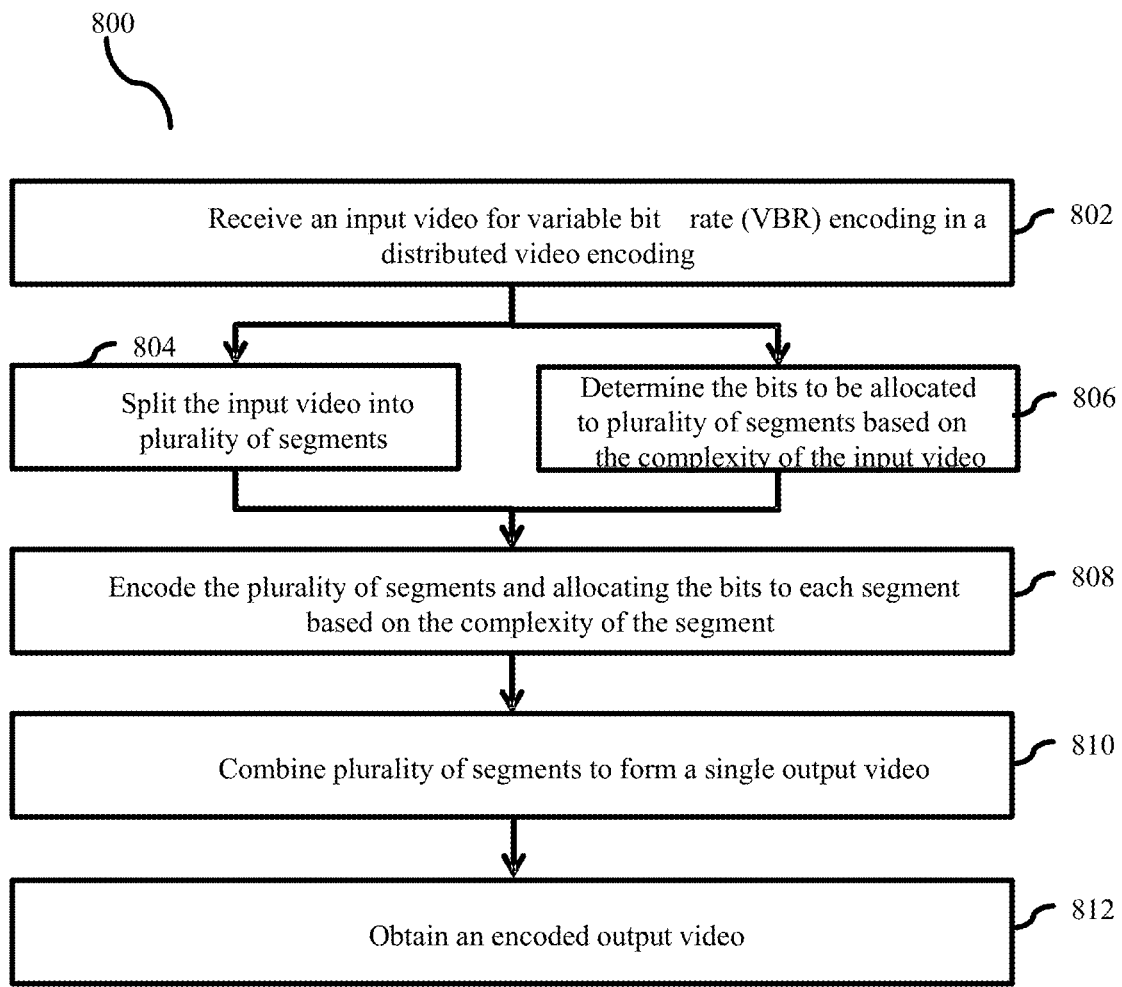
FIG. 8 illustrates an example of a method for computing and allocating bits on a per frame basis in a distributed video encoding using a complexity analyzer.

FIG. 8 is a flow diagram illustrating a method 800 for computing and allocating a variable number of bits per frame (or simply "bits") in a distributed video encoding using a complexity analyzer, according to embodiments as disclosed herein. At block 802, the method 800 includes receiving an input video for allocating bits for each segment based on the complexity of the segment. At block 804, the method 800 includes splitting the input video into a plurality of segments. The method 800 allows the splitter module 602 to split the input video into the plurality of segments including a set of frames.

At block 806, the method 800 includes determining the bits to be allocated to the plurality of segments based on the complexity of the input video. The method 800 allows the complexity analyzer module 804 to determine the bits to be allocated to the plurality of segments based on the complexity measurement of each segment of the input video. Here, the complexity analyzer module 804 measures the complexity of every frame in each segment and also complexity of the entire input video to measure overall complexity of the segment to determine the bits to be allocated to each segment of the video. For example, consider an input video is split into 3 segments i.e., Segment-1, Segment-2, and Segment-3. Unlike conventional systems, a complexity associated with each segment (the Segment-1, Segment-2, and Segment-3) is analyzed and accordingly a bit budget for each segment is computed to generate a uniform video quality.

At block 808, the method 800 includes allocating the bits to plurality of segments of the input video for encoding the plurality of segments into a different format. Based on the complexity of each segment, the method 800 allows the encoder module 506 to allocate the bits to the plurality of segments. Here, the encoder module 506 receives the plurality of segments of the input video from the splitter module 202 and also receives the bits to be allocated to the plurality of segments. The encoder module 506 accepts the information from the complexity analyzer module 604 and accordingly allocates the bits to each segment to encode the each segment into a different format. For each segment the encoder will achieve an average bit rate for the segment, and can allocate bits to the high and low complexity sections of the video. For example, a high complexity region in a segment is allocated with additional bits in order to deliver good video quality. Similarly, a low complexity region in a segment is allocated with uniform bits so as to deliver the good video quality.

In an embodiment, a separate encoder can be used to receive each segment of the video for transferring the segment from one format to another format while achieving a desired video quality. For example, consider an encoder-1, an encoder-2, and an encoder-3 receives an input video split into three segments namely, segment-1, segment-2, and segment-3 respectively. The encoder-1 allocates the bits to the Segment-1 based on the complexity of the segment-1. Similarly, the encoder-2 allocates the bits to the Segment-1 based on the complexity of the segment-2. Similarly, the encoder-3 allocates the bits to the Segment-1 based on the complexity of the segment-3. Unlike conventional systems, different encoder's uses variable bit rates encoding each segment of the video such as to generate a uniform quality of video. Each bit rate for the segment is computed based on the complexity analysis of the segment.

Further, at block 810, the method 800 includes combining the plurality of segments to form a single output video. The method 800 allows the combiner module 208 to combine the plurality of segments to form the single output video. For example, the segment-1 from the encoder-1, the segment-2 from the encoder-2, and the segment-3 from the encoder-3 are combined to form the single output video. The combining may be performed by concatenating the segments in the same temporal order as in the received video.

At block 812, the method 800 includes obtaining a encoded output video from the combiner module 508. Unlike conventional systems, distributed video encoding system obtains the encoded output video while maintaining a desired quality by using variable bit rates for each segment instead of a globally optimized bit rate. The complexity of the input video in the distributed video encoding is measured and the bit budget on a per-frame basis is determined for each segment of the input video. The information about the per frame bit allocation is passed onto the encoder for allocating bits to each segment thereby obtaining good average video quality.

Figure 9:
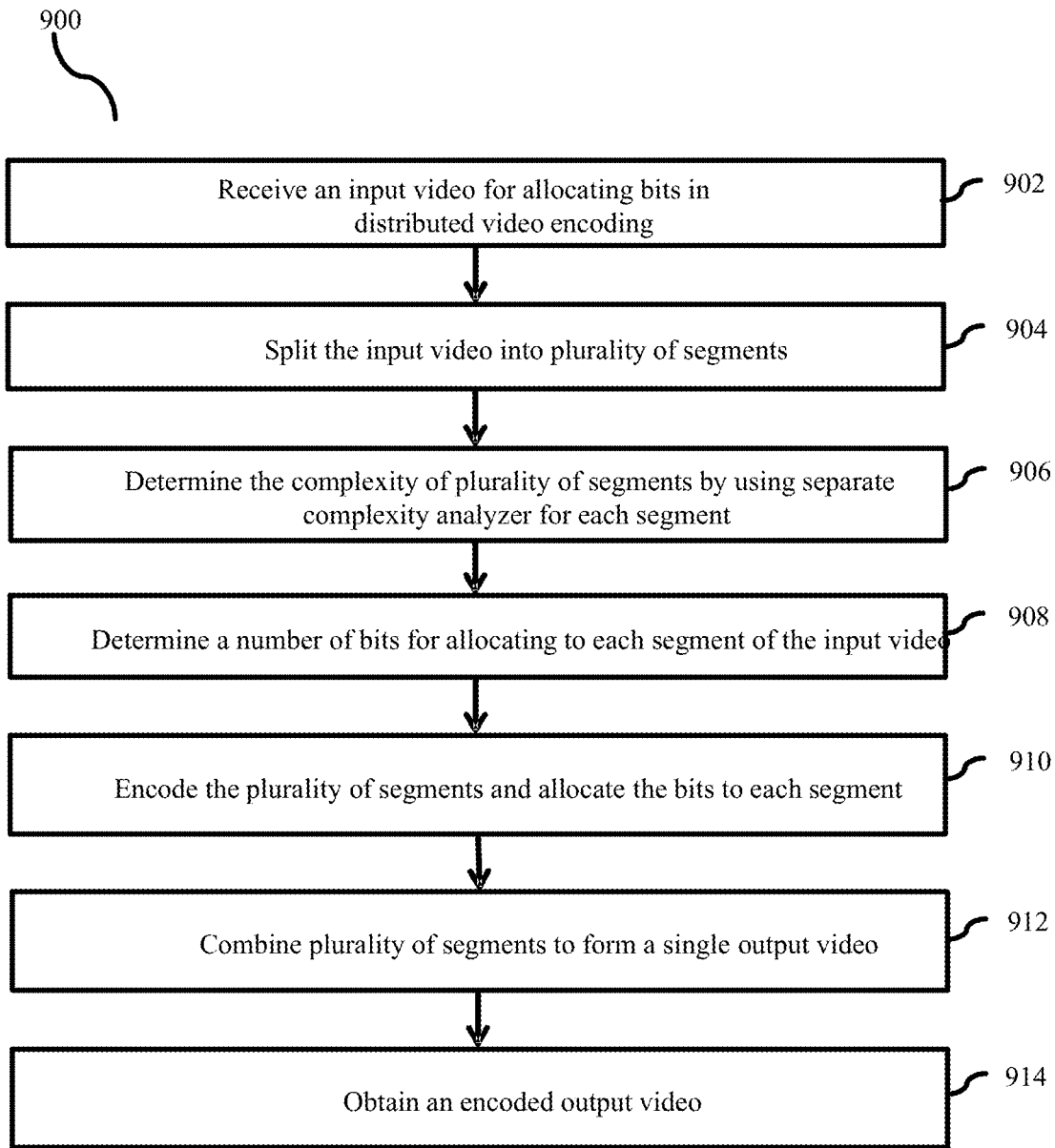
FIG. 9 illustrates an example of a method for computing and allocating bits per frame in a distributed video encoding using a separate complexity analyzer for each segment of a video.

FIG. 9 is a flow diagram illustrating a method 900 for allocating encoding bits in a distributed video encoding system using a separate complexity analyzer for each segment of a video, according to the embodiments as disclosed herein. At block 902, the method 900 includes receiving an input video for allocating bits for each segment based on the complexity of the segment. At block 904, the method 900 includes splitting the input video into a plurality of segments. The method 900 allows the splitter module 502 to split the input video into the plurality of segments including a set of frames.

At block 906, the method 900 includes determining the complexity of the plurality of segments by using separate complexity analyzer for each segment of the input video. The method 900 allows the complexity analyzer module 604 including the plurality of complexity analyzers to determine the complexity of the plurality of segments by using separate complexity analyzer for each segment. Here, each complexity analyzer measures the complexity of every frame in each segment; thereby, determining the complexity of the segment. For example, consider an input video is split into 3 segments i.e., Segment-1, Segment-2, and Segment-3. Unlike conventional systems, a complexity associated with each segment (the Segment-1, Segment-2, and Segment-3) is analyzed and accordingly bits for each segment are computed to generate a uniform video quality. Here, the complexity analyzer module includes plurality of complexity analyzers i.e. complexity analyzer-1, complexity analyzer-2, and complexity analyzer-3. The complexity analyzer-1 determines the complexity of the segment-1 of the input video. The complexity analyzer-2 determines the complexity of the segment-2 of the input video. The complexity analyzer-3 determines the complexity of the segment-3 of the input video.

At block 908, the method 900 includes determining the number of bits for allocating to each segment of the input video. The method 900 allows the complexity analyzer module 604 to determine the bits for allocating to each segment of the input video. At 910, the method 900 includes encoding the plurality of segments and allocates the bits to each segment based on the complexity of the segment by comparing with the plurality of segments. Based on the complexity of each segment, the method 900 allows the encoder module 506 to allocate bits to each segment by comparing with the plurality of segments received from the splitter module 502. Here, the encoder module 506 will use the segment information to make good local decisions within the segment. The encoder module 506 accepts the information from the complexity analyzer module 504 and accordingly allocates bits to each segment to encode the each segment into a different format. For each segment the encoder will achieve an average bit rate for the segment, and can allocate bits to the high and low complexity sections of the video.

In some embodiments, a separate encoder can be used to receive each segment of the video from the complexity analyzer for transferring the segment from one format to another format while achieving a desired video quality. For example, consider the encoder module 506 consists an encoder-1, an encoder-2, an encoder-3 receives three segments namely, segment-1, segment-2, and segment-3 respectively from the complexity analyzers. The encoder-1 allocates bits determined by the complexity analyzer module 604 to the segment-1 by taking the inputs from the segment-1. The encoder-2 allocates bits determined by the complexity analyzer module 604 to the segment-2 by taking the inputs from the complexity analyzer-2 and the segment-2. The encoder-3 allocates bits determined by the complexity analyzer module 604 to the segment-3 by taking the inputs from the complexity analyzer-2 and the segment-3. Unlike conventional systems, different encoder's uses variable bit rates encoding each segment of the video such as to generate a uniform quality of video. Each bit rate for the segment is computed based on the complexity analysis of the segment.

Further, at 912, the method 900 includes combining the plurality of segments to form a single output video. The method 900 allows combiner module 508 to combine the plurality of segments to form the single output video. For example, the segment-1 from the encoder-1, the segment-2 from the encoder-2, and the segment-3 from the encoder-3 are combined to form the single output. At 912, the method 900 includes obtaining an encoded output video from the combiner module 208. Unlike conventional systems, distributed video encoding system obtains the encoded output video while maintaining a desired quality by using variable bit rates for each segment instead of a globally optimized bit rate. Each segment is sent to a separate complexity analyzer, which produces the output file that describes the video complexity for each frame. As the separate complexity analyzer is placed for each segment, the performance of the system is improved and the bits can be allocated to the segments more accurately and quickly. Further, the complexity of the input video in the distributed video encoding is measured and bits per frame to be allocated are determined for each segment of the input video. The information about the per-frame bit allocation is passed onto the encoder for allocating bits to each segment; thereby, obtaining good average video quality.

Figure 10:
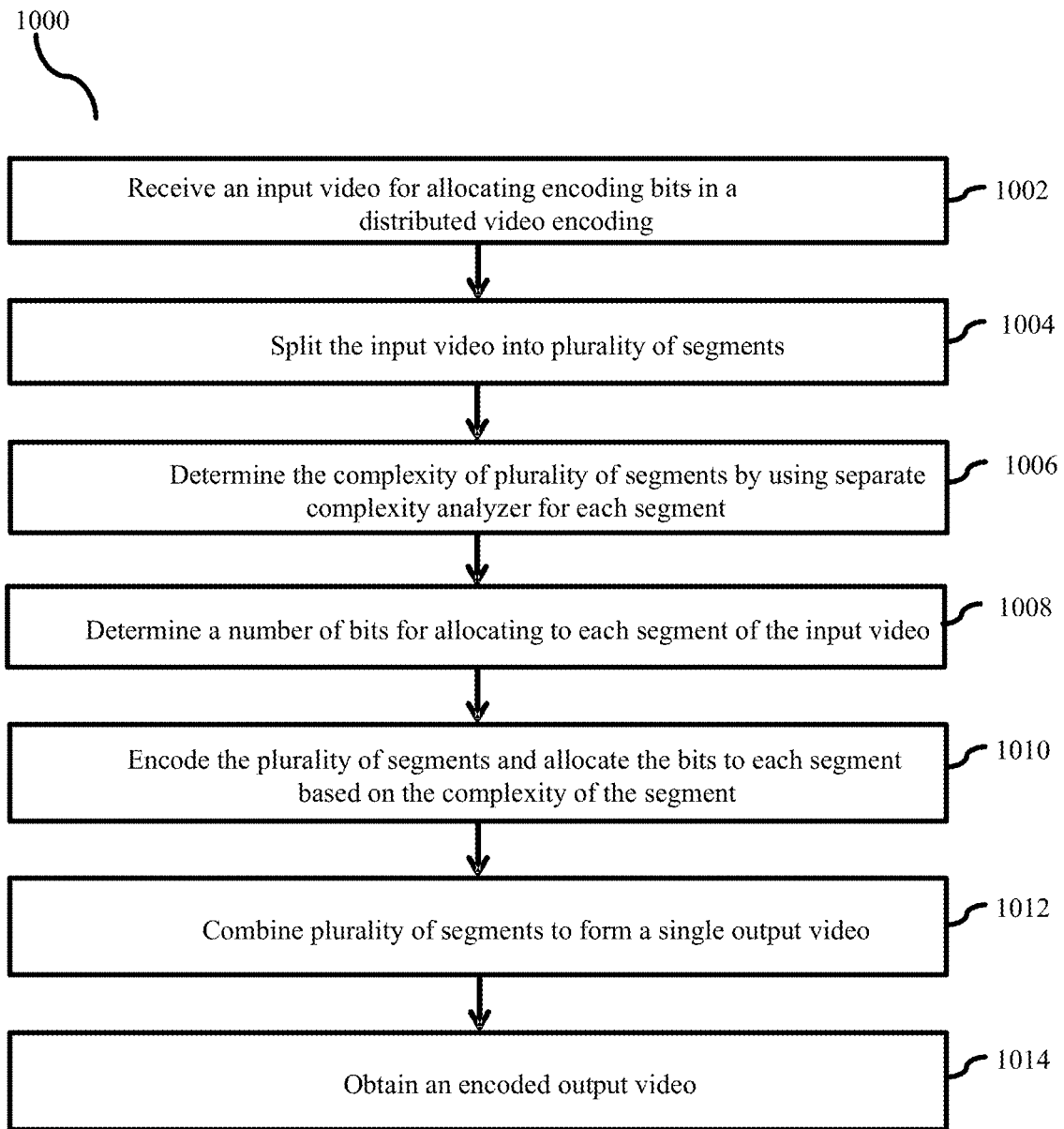
FIG. 10 illustrates an example of a method for computing and allocating bits per frame in a distributed video encoding by using a separate complexity analyzer for each segment of a video and adding a pathway that passes each segment complexity measurement to a corresponding encoder.

FIG. 10 is a flow diagram illustrating a method 1000 for allocating bits in a distributed video encoding using a separate complexity analyzer for each segment of a video and adding a pathway that passes each segment complexity measurement to an encoder, according to the embodiments as disclosed herein. At block 1002, the method 1000 includes receiving an input video for allocating bits for each segment based on the complexity of the segment. At block 1004, the method 1000 includes splitting the input video into the plurality of segments. The method 1000 allows the splitter module 202 to split the input video into the plurality of segments including a set of frames.

At block 1006, the method 1000 includes determining the complexity of the plurality of segments by using separate complexity analyzer for each segment of the input video. The method 1000 allows the complexity analyzer module 604 including the plurality of complexity analyzers to determine the complexity of the plurality of segments by using separate complexity analyzer for each segment. Here, each complexity analyzer measures the complexity of every frame in each segment, and thereby determining the complexity of the segment. For example, the input video is split into 3 segments i.e. Segment-1, Segment-2, and Segment-3.

In another example, the input video can be split into N segments (i.e. Segment-1 to Segment-N). Unlike conventional systems, a complexity analyzer module includes the plurality of complexity associated with each segment (the segment-1, segment-2, and segment-3) is analyzed and accordingly a per frame bit allocation for each segment is computed to generate a uniform video quality. Here, the complexity analyzer module includes plurality of complexity analyzers i.e. complexity analyzer-1, complexity analyzer-2, and complexity analyzer-3. The complexity analyzer-1 determines the complexity of the segment-1 of the input video. The complexity analyzer-2 determines the complexity of the segment-2 of the input video. The Complexity analyzer-3 determines the complexity of the segment-3 of the input video.

At block 1008, the method 1000 includes determining the per frame bit budget for allocating to each segment of the input video. The method 1000 allows the complexity analyzer module 604 to determine bits for allocating to each segment of the input video. At block 1010, the method 1000 includes encoding the plurality of segments and allocates bits to each segment based on the complexity of the segment. Based on the complexity of each segment, the method 500 allows the encoder module 506 to encode the plurality of segments and allocates bits to each segment. Here, the encoder module 506 will use the segment information and also segment complexity information computed earlier to make good local decisions within the segment. The encoder module 506 accepts the information from the complexity analyzer module 604 and accordingly allocates bits to each segment to encode the each segment into a different format. For each segment the encoder will achieve an average bit rate for the segment, and can allocate bits to the high and low complexity sections of the video.

In an embodiment, a separate encoder can be used to receive each segment of the video from the complexity analyzer for transferring the segment from one format to another format while achieving a desired video quality. For example, consider the encoder module 506 includes an encoder-1, encoder-2, and encoder-3 receives three segments namely, segment-1, segment-2, and segment-3 respectively from the complexity analyzers. The encoder-1 allocates the bits per frame budget determined by the complexity analyzer module 604 to the segment-1 by taking the inputs from the complexity analyzer-1 (i.e. complexity information of the segment-1) and segment-1. The encoder-2 allocates the bits per frame budget determined by the complexity analyzer module 604 to the segment-2 by taking the inputs from the complexity analyzer-2 (i.e. complexity information of the segment-2) and segment-2. The encoder-3 allocates the bits per frame budget determined by the complexity analyzer module 604 to the segment-3 by taking the inputs from the complexity analyzer-3 (i.e., complexity information of the segment-3) and segment-3. Unlike conventional systems, different encoder's uses variable bit rates encoding each segment of the video such as to generate a uniform quality of video. Each bit rate for the segment is computed based on the complexity analysis of the segment.

Further, at block 1012, the method 1000 includes combining the plurality of segments to form a single output video. The method 1000 allows combiner module 508 to combine the plurality of segments to form the single output video. For example, the segment-1 from the encoder-1, the segment-2 from the encoder-2, and the segment-3 from the encoder-3 are combined to form the single output. At block 1014, the method 1000 includes obtaining a encoded output video from the combiner module 208. Unlike conventional systems or other embodiments of the present system, each encoder uses the segment complexity information computed earlier to make good local decisions within the segment and works faster, more accurately for allocating bits to the segments of the video; thereby, obtaining best overall video quality. The encoder assigns bit rates across all the segments (which may or may not be the same for each segment) of the video to obtain uniform quality.

As discussed with respect to FIG. 11, video is often uploaded to a video sharing site like YouTube, Vimeo, or Facebook by a user with a network-connected user device such as a wireless phone or a desktop computer. The user may be an amateur user, wishing to share video with friends and family, or may be a professional videographer or a studio or a news-gathering and distribution service.

User devices are typically equipped with video encoders to reduce the size of captured video. The encoding may be performed by running a process on a central processor (CPU) with or without assistance from specialized hardware circuitry.

Video quality, video bitrate, and CPU encoding time are all related. For a given video encoder, typically for a constant video quality, a lower video bitrate can be achieved by increasing the CPU encoding time, e.g., by using higher complexity encoding settings. If the CPU encoding time budget per frame is held constant, then increasing video quality requires a higher video bitrate.

Some video encoders, generally called software encoders, e.g., video encoder programs that run on a CPU, have settings that adjust how much time the CPU spends on each frame.

Some video encoders, generally called hardware encoders, also have settings that control how fast the video encoding runs and how well the compression occurs. Examples of hardware encoders include GPU based encoders or encoders that use an application-specific integrated circuit (ASIC), e.g., in a mobile phone or a camera.

Video cameras (phones, DSLRs, video cameras, GoPro™) normally capture video at a very high quality and high resolution. In order to maximize quality and reduce the processing load on the consumer device, the devices usually perform only a light encode, which means that the high video quality and resolution requires a very high bitrate. Such devices therefore generate a lot of bits for captured video.

Video sharing sites (e.g., YouTube or Vimeo or Facebook, etc.) often limit their bitrate on videos that are displayed. In order to limit this bitrate, these sites lower the video resolution and lower the quality so that the video fits within the bitrate. This video quality is normally much lower than what was originally captured by the camera.

Many video sharing sites will lower the video quality before displaying the video to users. It may thus be wasteful to send the high quality video up to the video sharing site because higher quality videos typically require more bandwidth and may require a longer upload time. In one advantageous aspect, the disclosed embodiments can encode videos at the client side to match the video quality that the video sharing site will use.

Since video quality, video bitrate, and CPU cycles are often related and controlled by the encoding settings, the encoding at the user device can be controlled to match available upload resources, e.g., bandwidth, CPU power and battery life. Every client device will have a different amount of upload bandwidth available (e.g., depending on the network, such as Wi-Fi, cell, fixed) and will have a different amount of CPU power available (high end servers, low end desktops, laptops, tablets or phones).

Figure 12:
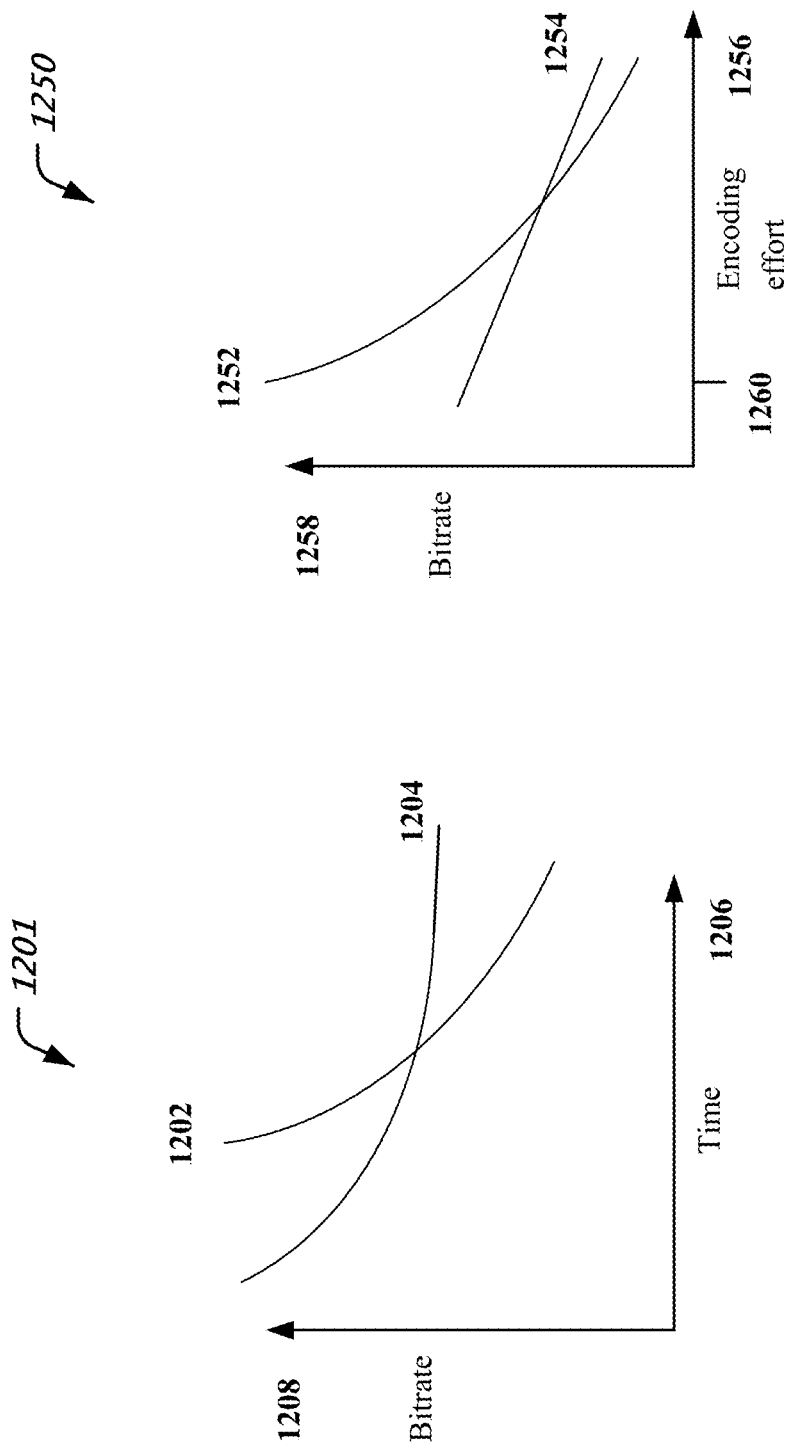
FIG. 12 illustrates example graphs illustrating relationships between encoding time and quality and video bitrate and encoding effort.

FIG. 12 illustrates an example graph 1201 of trade-offs possible in encoding digital video for a given output bitrate of an encoder. The curve 1202 may represent the operation of a software-based video encoding algorithm, e.g., implemented mainly using a CPU of a user device, with or without hardware assistance for various processing such as transform computation and run-length or arithmetic encoding. The curve 1204 may represent the operation of a graphics-processor (GPU) based video encoding algorithm, e.g., implemented mainly using the parallelized pipeline of encoding, as is found in prevalent GPUs, The curves 1202, 1204 are plotted with the horizontal axis 1206 representing a measure of complexity of encoding, e.g., based on the amount of time taken for per-frame encoding and the vertical axis 1208 representing the resulting video bitrate of the resulting video.

As can be seen from curves 1202, 1204, in general for a given encoding implementation, e.g., GPU-based or CPU-based, the more time an encoder spends on the encoding, the better the quality of the resulting encoded video tends to be. As the amount of time spent per frame increases, however, benefit of encoded video size reduction may taper off for GPU based encoding.

In some disclosed embodiments, the target output video quality is set to a fixed level, and then encoding settings are continuously adjusted such that upload bandwidth is maximally consumed and available CPU or GPU capacity is maximally consumed. This ensures that the upload occurs as quickly as possible. On a device with low-powered CPU or GPU and a high bandwidth connection, an embodiment may only lightly encode the uploaded video because if video is encoded more diligently, then it would take too long for the CPU or GPU to encode the video and the upload bandwidth would not be fully used, and the upload would take longer.

On a powerful device with a low bandwidth Internet connection, an embodiment may apply strong encoding to use as much CPU power as possible and compress the video as much as possible to fit through the limited upload bandwidth.

In both these cases, the video quality may be set to a constant value to match the optimal or desired settings of the video sharing site.

In FIG. 12, graph 1250 illustrates the difference between video bitrate, shown by curve 1254 and the encoding bitrate, represented by curve 1252. In the graph 1250, the horizontal axis 1256 represents the encoding effort or processor resources spent and the vertical axis 1258 shows the resulting bitrate. Operational point 1260 represents a case where video encoding may be performed, e.g., at ten times the real time rate (e.g., 300 frames encoded in one second for a 30 frames per second playback rate) as shown by the fact that the encoding bitrate curve 1252 is much higher at operational point 1260 than the video bitrate curve 1254. The video bitrate of an encoder may represent the number of encoding bits per second used for encoding the video. For example, when the video bitrate of an encoded video is 1 Mbps, then approximately 1 million bits from the encoded video may be used by a decoder every second during decoding and playback of the video. By contrast, if an encoder is operating at 10× speed, then the encoder generates the 1 Mbps video at an encoder rate of 10 Mbps. During operation of a video encoder, the encoder bitrate and the video bitrate may be related by the equation: encoder bitrate=video bitrate×encoding speed. Thus, when the encoder is operating at 10× real-time speed, then the encoder bitrate is ten times more than the video bitrate. The encoder bitrate may non-linearly change as a function of the CPU time setting during operation, e.g., based on how much time is spent in CPU processing for encoding each frame. The intersection between the two curves 1252, 1254 may represent the operational point when video encoding is being performed in real time such that the encoding rate and the video bitrate are equal. The graph 1250 illustrates a difference between video bitrate, e.g., the size (in bits) of a video, divided by the playback duration of the video, and encoder bitrate, which is, e.g., the rate at which an encoder is outputting encoded bitstream.

Example Single Stream Mode Embodiments:

In Single Stream mode, the input video is run through a single video encoder. The output of the video encoder is buffered, and this buffer is uploaded to the Internet (uploader process). A rate control module monitors the size of the outbound buffer—how much has been encoded but not uploaded yet—and uses this size to control the strength of the encoding. The system may set a high mark and a low mark for this buffer. When the buffer hits the high mark, it means that the buffer is filling up: this means that the encoder is running faster than the upload process because there is not enough upload bandwidth, so the encoding settings are increased to tell the encoder to spend more time on each frame to make the frame smaller. When the low mark of the buffer is hit, this means that the encoder is running slower than the upload process—there is extra upload bandwidth available. In this case, the encoding settings are lowered to tell the encoder to spend less time on each frame.

Example Multi-Stream Mode Embodiments:

In this mode, the input video is segmented and run through multiple video encoders. The output of each video encoder is connected to an uploader process that pushes the content up to the video sharing site. Using multiple streams has two main benefits: 1. by using multiple parallel connections, higher upload throughput can often be achieved, and 2. some hardware and software encoders have higher throughput when multiple streams run through them. The algorithm for adjusting the encoding settings is similar to the above approach: the buffer size is calculated using the sum of all of the output buffers, and a high and low mark is established in the same way as above.

Figure 13:
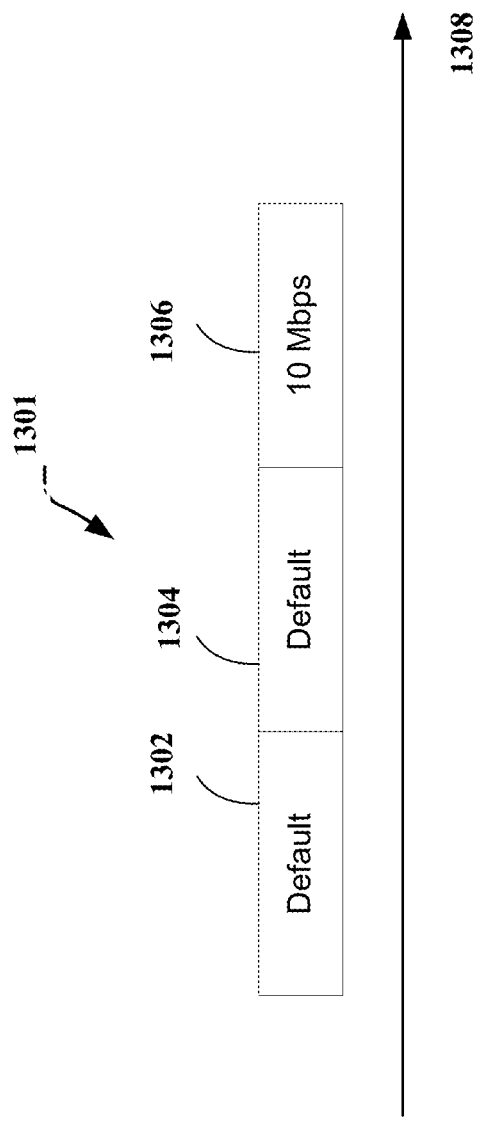
FIG. 13 illustrates an example time line of video uploading.

FIG. 13 is an example timing diagram 1301 of a video encoding process during uploading of video from a user device (e.g., 1106) to a server 1110. As depicted along the time line 1308, a first number of video segments that make up the entire video to be uploaded may be encoded using a default encoding setting (e.g., time per frame). In the depicted example, two video segments 1302 and 1304 are initially encoded and uploaded to the server 1110 using a default encoding setting, which may result in, e.g., 1 Mbit/s video bitrate.

After the first number of segments are encoded and transferred at the default time per frame setting, a rate control module, which may be implemented at the server 1110 and/or on the user device 1106, makes a determination about the encoding setting (e.g., time per frame) that is to be used for encoding the next video segment. For example, with the default encoding settings, the video bitrate may be 1 Mbps. With these encoding settings, however, the encoder may be running at 10× real-time (e.g., at operational point 1260), such that the encoder is generating data at an output rate of 10 Mbps. After the first two segments, which may be 6 seconds long each, are encoded, the rate control module may observe that the encoder data rate was 10 Mbps and the uploaded data rate was 5 Mbps. The outbound video buffer on the user device in which the encoded video is stored thus may be increasing in occupancy during the encoding and uploading of the first two segments due to the mismatch between the encoder rate and the available upload bandwidth.

The rate control module may then perform an encoding rate correction. Noting that buffer occupancy is increasing and the actual encoding is occurring faster than target encoding rate, the rate control module might instruct the encoding process to spend more CPU or GPU time on each frame and therefore reduce the rate at which encoded frames are generated. The change in encoding rate may be reflected in the subsequent video segments being uploaded, e.g., segment 1306.

The rate control module may similarly control monitoring of the outbound video buffer to perform periodic correction to the encoded video bitrate by controlling various encoding parameters, e.g., the motion search window, the target bitrate, the number of encoding options considered for encoding each macroblock of video, etc. The use, or lack of use, of these encoding parameters may cause the encoding speed to go up or down. For example, when using a CPU-based encoder, using a larger motion search window may slow down encoding process because more computations have to be performed per macroblock, where a macroblock represents a pre-defined pixel array, e.g., 16×16 pixels or video frames.

By monitoring operational parameters of the uploading process, the rate control module can thus control the rate at which the encoder generates the encoded video bitstream such that the outbound buffer occupancy stays within an upper or a lower margin. Further, by ensuring that the outbound buffer is never empty, the rate control module may thus facilitate the uploading of video at maximum possible rate at all times.

The above-outlined uploading process may be modified in various embodiments using features such as user control or service provider control of the quality of uploading, the use of different operational parameters, e.g., battery power left in a battery-operated device, the tariff a user may incur for bytes being uploaded, and so on.

Figure 14:
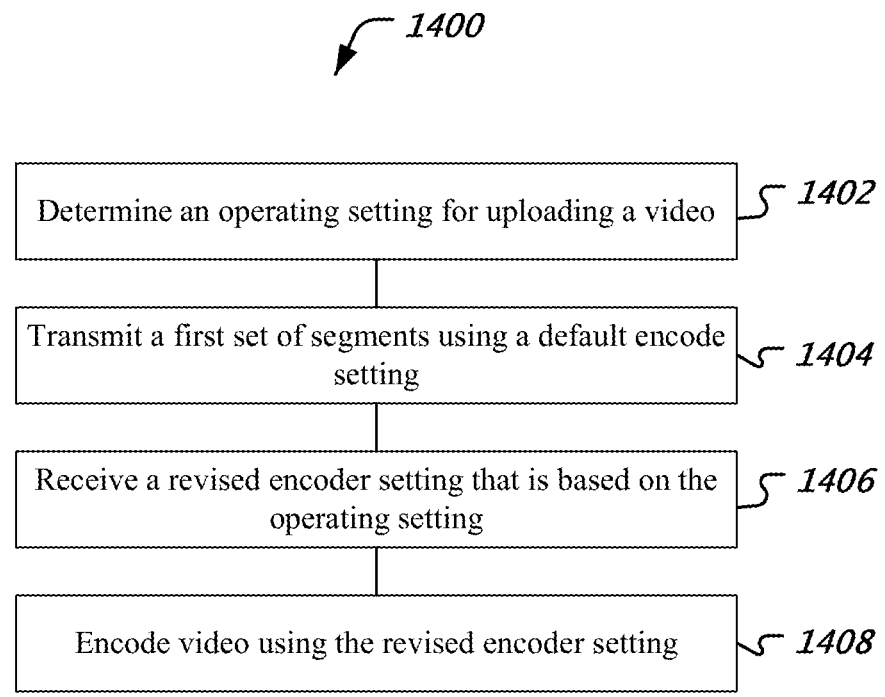
FIG. 14 illustrates an example method for uploading digital video from a user device to a network server.

FIG. 14 is flow diagram illustrating a method 1400 for uploading encoded or compressed digital video bitstream from a user device to a network server.

The method 1400 includes, at block 1402, determining an operating setting for uploading a video. The determination of operating settings may be made at a user device based on operating systems received from a server in the network. For example, a service provider operating the server to which the video is being uploaded may provide a minimum and/or a maximum acceptable quality for the video being uploaded. Alternatively or in addition, the operating settings may be determined by presenting, on a user interface, a menu of operating setting selection and by receiving a selection of the operating setting from the user interface. In some embodiments, the menu of operating setting selection includes an encoded video quality selection menu.

In some embodiments, the user device may derive the default encoding setting from the operating setting. The encoding settings may include, e.g., an output video bitrate for encoding the video, number of B or P frames (Bidirectional or Predictive frames), and so on. In some embodiments, the default encoding settings may be selected as the encoding settings that were used when the last segment of a previously uploaded video was encoded. In some embodiments, the default encoding settings may be based on the current network connectivity of the user device. For example, a higher bitrate, e.g., 5 Mbps, may be used for encoding when the user device is connected to broadband internet and a lower bitrate, e.g., 1 Mbps, may be used when the device is connected with the server using a wide area network connection such as a 3G or a 4G connection.

The method 1400 includes, at block 1404, transmitting a first set of segments using a default encode setting. For example, as described in this document, in some embodiments, the first set of segments may include first two GOPs of a video.

As described in this document, after the first few segments are transmitted by the user device and received by the server, the server may be able to determine whether the user device is encoding video at a faster-than-transmission rate or a slower-than-transmission rate. For example, the knowledge of the occupancy of outbound buffer may be taken into consideration. The rate control module described herein may thus determine revised encoding settings.

The method 1400 includes, at block 1406, receiving a revised encoder setting that is based on an optimal uploading setting. For example, the revised encoder setting may be lower limited by a minimum time spent per frame and upper limited by a maximum time spent per frame.

The method 1400 includes, at block 1408, encoding video using the revised encoder setting. The encoding may use CPU and/or GPU for encoding, as controlled by the encoding setting. In some embodiments, to continually ensure that the encoded video bytes are available for transfer over the network interface, the CPU (or GPU) of the user device may be used to its maximum possible availability during the time video encoding and uploading is being performed. As described herein, other optimal setting criteria, e.g., maximum battery saving etc. may be used for encoding also.

Example Uploading Quality Setting

In some embodiments, the network server to which the client device wants to upload the video may specify quality of video that is acceptable for upload. The network server may specify an upper limit on the quality of video, e.g., based on a service layer agreement (SLA). Additionally or alternatively, the network server may specify an acceptable lower threshold for quality below which video will not be accepted by the server. The quality setting may take place every time a user wants to upload a video. Alternatively or additionally, the network server may specify quality setting on a periodic basis, depending on the user's use of her storage space at the network server. Alternatively or additionally, the network server may specify a different quality setting every time there is a change in the network over which the user device is accessing the network server. For example, the network server may specify the use of one quality setting when the user device is operating with a broadband Internet (Wi-Fi) connection and another quality setting when the user device is operating in a 3G or 4G network.

Alternatively or additionally, a user may be able to specify or request a quality setting prior to uploading a video. For example, a user interface may be presented to the user at the beginning of the uploading, requesting which one of a number of quality settings (e.g., low, medium or high) does the user want to use for the uploading of the video.

Example Optimal Criterion for Uploading

Users (and service providers) may want to use different optimal criteria to control the uploading process. The criteria may include, e.g., upload time, total number of bits uploaded, upload quality, and so on.

In some embodiments, the above techniques may be implemented in a user device that includes at least one processor, at least one memory comprising instructions configured to cause the at least one processor to perform the method 1400 described herein.

During the encoding, an encoded bitstream may have to be generated to ensure that a key frame occurs every given number of seconds. For example, in some implementations that use hypertext transfer protocol based live streaming (HLS), a key frame may be expected by a video player at some frequency, for example, at least once every 10 seconds. However, the original video available from the user device may not follow this periodicity of key frames. For example, video captured from a user device may use a 6-second GOP, while the video sharing service provider may want to store and distribute video sequences at a different GOP length, e.g. 10 seconds apart.

Figure 15:
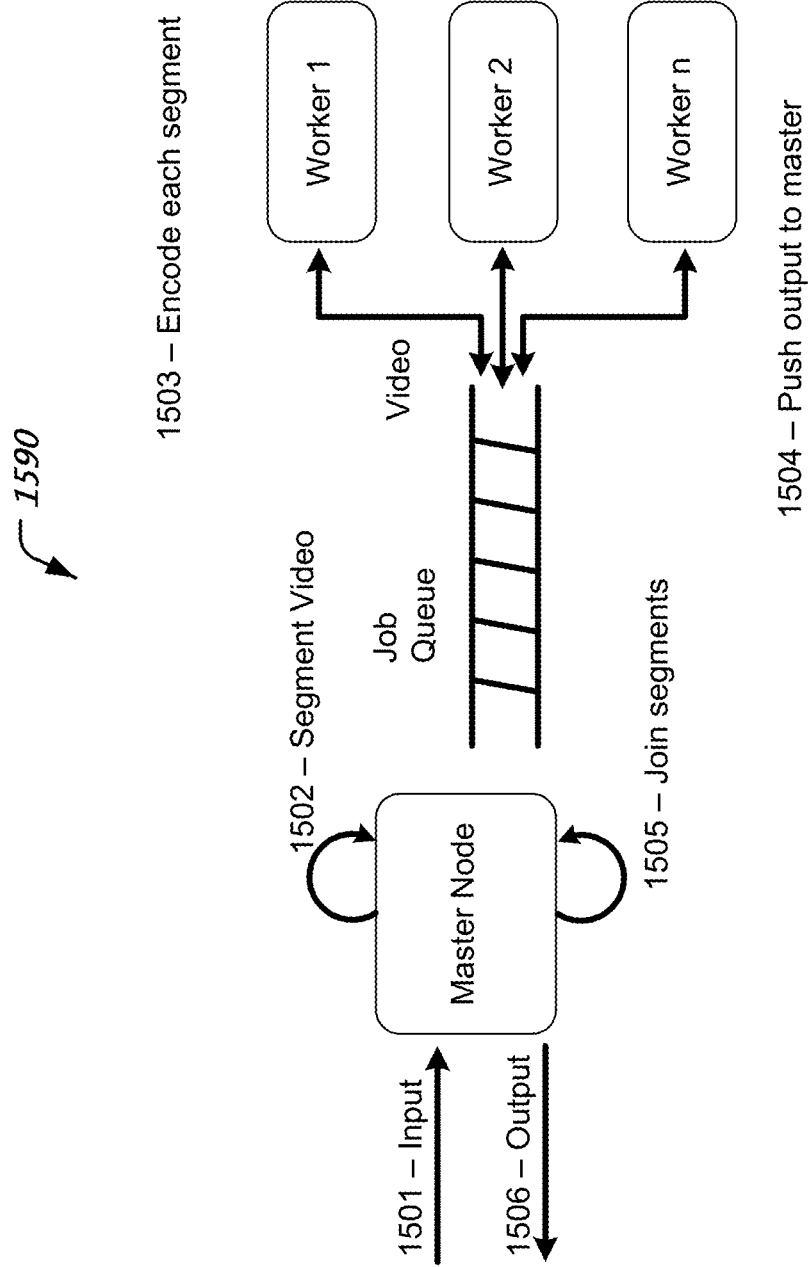
FIG. 15 illustrates an example of a distributed video encoding workflow.

FIG. 15 depicts an example workflow in a distributed video encoding system 1500. The system 1590 may be operated by a video uploading and sharing service provider. Distributed video encoding involves splitting the input videos into segments and passing the segments to a cluster of worker nodes. The worker nodes independently encode the videos and ship the output segments back to the master node. The master node then stitches all the segments together to create a final output.

At block 1501, an input video sequence is received by a master node from a user device 1106, 1116. The input video sequence may be a compressed video sequence or an uncompressed video sequence. At block 1502, the master node may split the video into multiple segments. The master node may then assign segments to different worker nodes for performing video encoding or encoding. At 1503, each worker node encodes the segment received. At 1504, each worker node sends back the resulting encoded bitstream to the master node. At 1505, the master node combined the segments back to generated encoded bitstream for the video. A similar workflow of splitting, encoding, and combining is also described with respect to FIG. 3, FIG. 5 and FIG. 6.

This technique may be sufficient when the video has intermittent IDR (Instantaneous Decoder Refresh) frames, which are key frames (Intra encoded, or I, frames is another example of key frames), since the splitter can look for IDR frames to segment the input video file. This is called a "closed GOP" type bitstream, where the frames inside a GOP refer to other frames in the same GOP. Since an IDR is an anchor frame any future frames cannot refer to a frame earlier than the anchor frame. Hence, the sanctity of each video segment is preserved. Thereby the encoder (worker) nodes can independently process each chunk.

Figure 16:
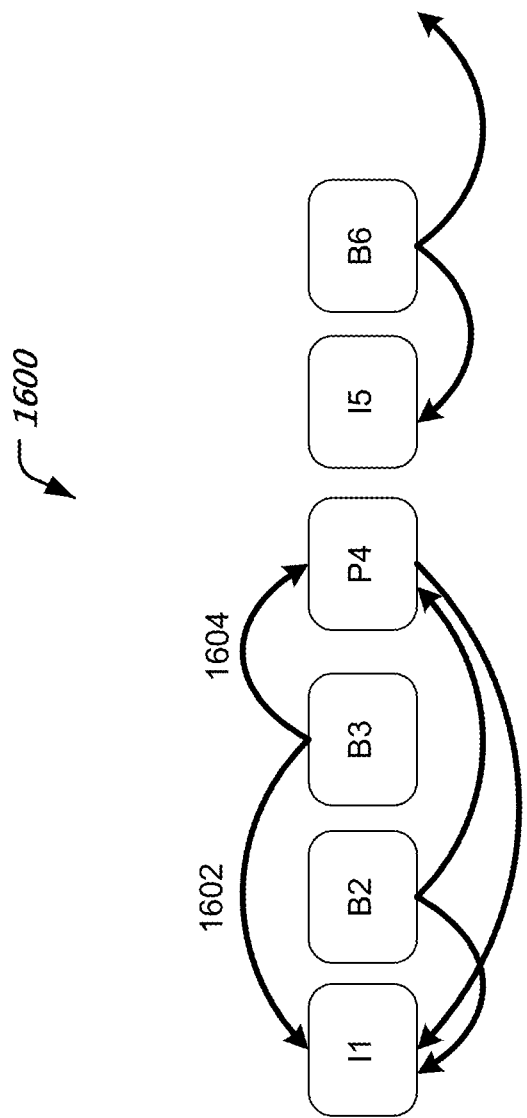
FIG. 16 illustrates an example of a video frame encoding sequence.

FIG. 16 illustrates an example of a video 1600 when the input video is a closed GOP sequence.

As depicted in FIG. 16, all the references, indicated by connectors 1602, 1604, are within the GOP structure. So in this case, the video segmenter creates segments or chunks at the end of frame P4 and creates segments as I1B2B3P4 and I5B6B7P8 and so on. Each of these segments is independently processed by the worker nodes because there is no cross GOP referencing.

Figure 17:
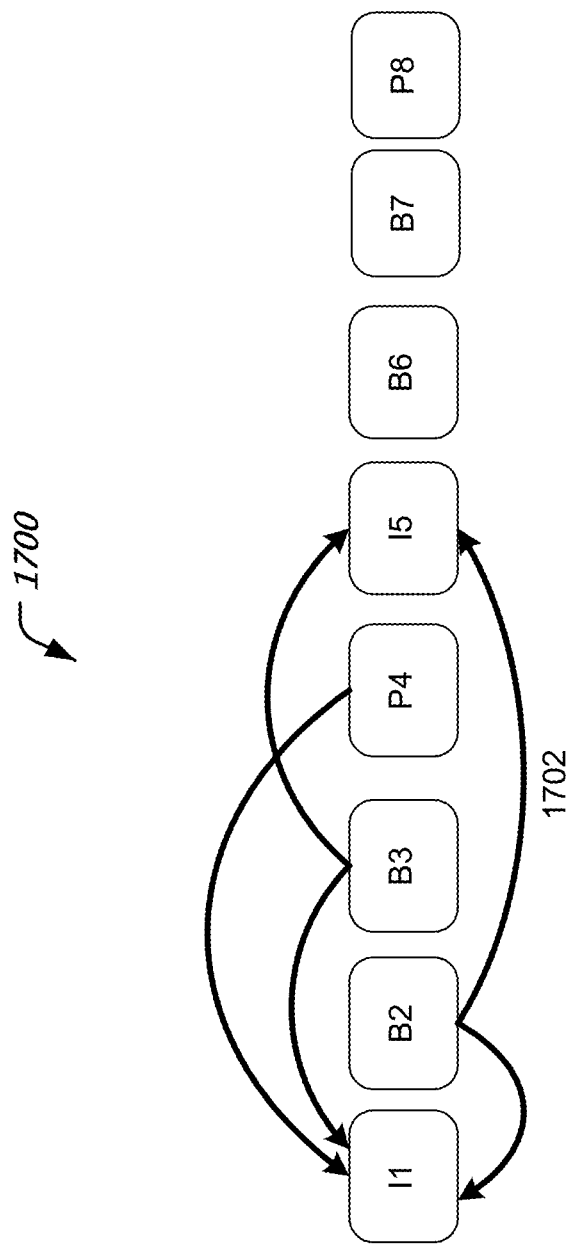
FIG. 17 illustrates another example of a video frame encoding sequence.

FIG. 17 depicts an example of an open GOP video 1700. The illustrated example shows that the frame P4 is predicted from the frame I1, the frame B2 is bi-directionally predicted using references from I1 and I5 and the frame B3 is bi-directionally predicted from the reference frames I1 and I5.

When encoding an open GOP video, the above described chunking strategy does not work where there are references outside of GOP boundaries. In this case, just segmenting at an I-frame boundary would cause the resulting segments to fail during encoding, because the dependencies are not met, resulting in bad video quality.

As seen from FIG. 17, if the segmenter cuts at I-frame boundaries, the worker nodes would fail encoding because B2 has dependency on I5 (depicted by connector 1702), which falls in a different segment than B2.

In one aspect, an intelligent segmenter described herein preserves segment level sanctity of open GOP video frames. In case of an open GOP video, the segmenter includes a few extra frames at the GOP boundary to account for cross GOP referencing. If a previous IDR frame, I frame or a key frame, exists then the segmenter can choose to include all the previous GOPs until that key frame. Alternatively, the segmenter could just include the maximum reference length of frames for that video codec. Every codec has a maximum length beyond which it generally cannot refer a frame for motion estimation/compensation. This leads to multiple segments with over lapping frames. In order for these segments to be encoded on the worker nodes, additional header information is required, which is copied over from the previous key frame.

In order to not duplicate the overlapping frames while encoding, metadata can be sent along with the file name to the worker nodes. The metadata contains the number of initial frames to be skipped before the encoder starts encoding. At the end of encoding the worker node submits the encoded segments back to master, which then merges them to create a final output.

In some embodiments, each encoder in a distributed encoding system may be provided with contiguous video frames in excess of the frames that make up a video segment that the encoder is asked to encode. For example, a first encoder may be given frames 1 to 12 of a video, but will be asked to encode frames 1 to 10. This way, regardless of the GOP dependency, the worker node is assured that all possible video frames from which motion vectors are derived in the input video are available to the worked node for encoding. At the same time, because a sufficient number of video frames are available and are of duration longer that the desired key-frame insertion period (e.g., 10 frames), the worker node can perform encoding to precisely insert a key frame where desired.

Figure 18:
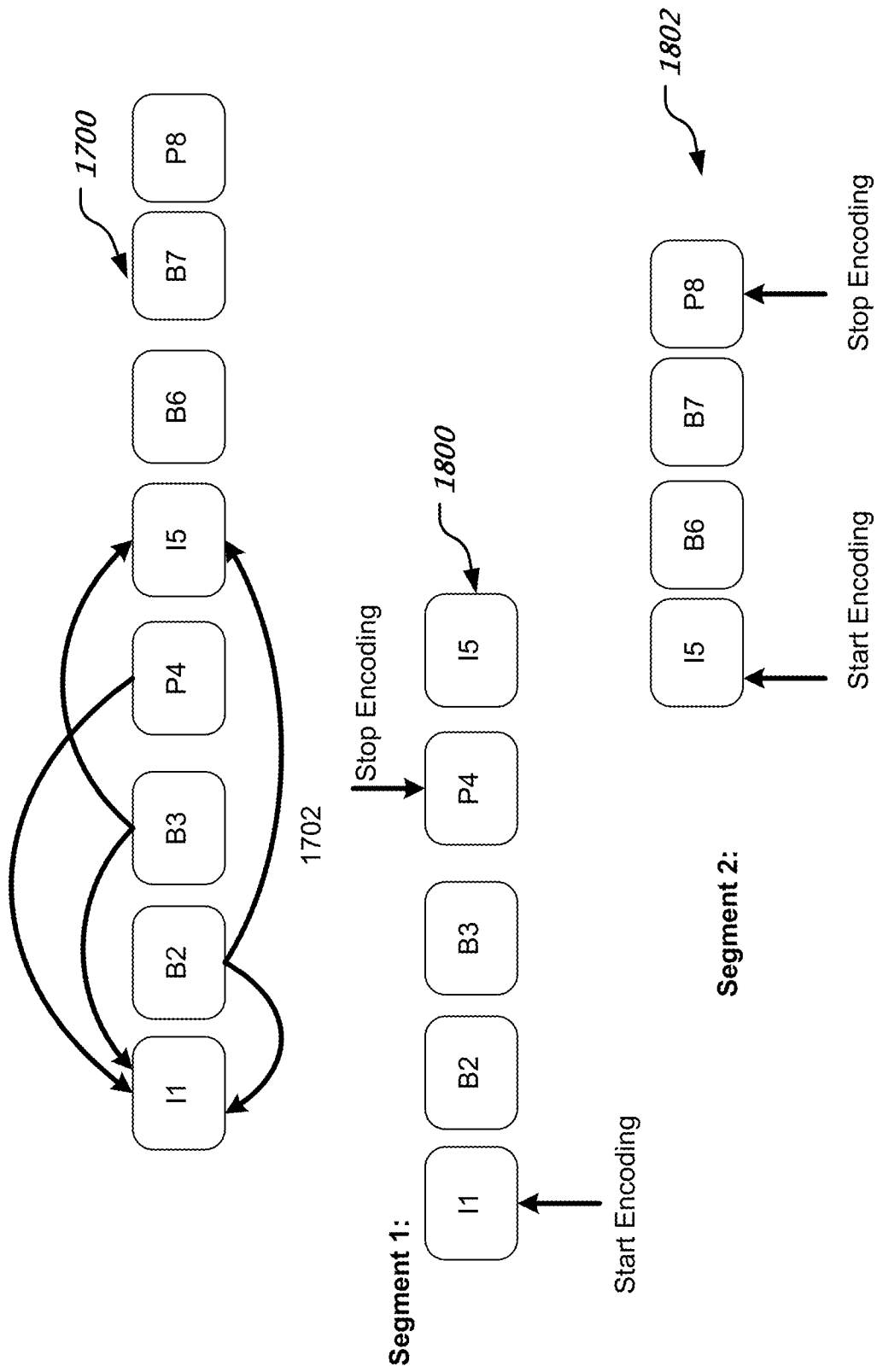
FIG. 18 illustrates an example of operation of an intelligent segmenter.

FIG. 18 illustrates how worker nodes can perform encoding. With reference again to the video 1700 which may be input to the encoding process, the operation of segmentation based encoded may be performed as follows. In some embodiments, prior to the segmentation operation, the master node may generate a dependency map. The dependency map may identify, for each frame in a segment, other frames on which decoding of that frame depends, e.g., the reference frame(s) used in encoding that frame. Based on the dependency map, the intelligent segmenter may include in each segment frames of two types—frames that are to be encoded by worker nodes, and additional frames that are included in the segment because the frames to be encoded depend on the additional frames. For example, in 1800, a first worker node may start encoding at 11 (first frame of received segment 1), and stop encoding at the rightmost P4 frame (last frame of received segment 1), as indicated by the metadata. However, because frames B2 and B3 are bi-directionally predicted from the frame 15, the intelligent segmenter includes the frame 15 in Segment 1. In other words, the intelligent segmenter may include, in some segments, additional video frames that are not to be encoded in the output video, but are used only for encoding other video frames in the segment.

Segment 2, which is the next segment temporally after Segment 1, represented in 1802, represents the case when all frames in the segment are sent to a worker node and are also to be encoded by the worker node, e.g., as may be the case for a closed GOP segment. Based on the dependency map, the intelligent segmenter may thus send some frames, e.g., frame 15 in multiple segments, e.g., both in Segment 1 (but not encoded by the worker node that receives Segment 1) and in Segment 2, where it will be encoded by the worker node that receives Segment 2.

Figure 19:
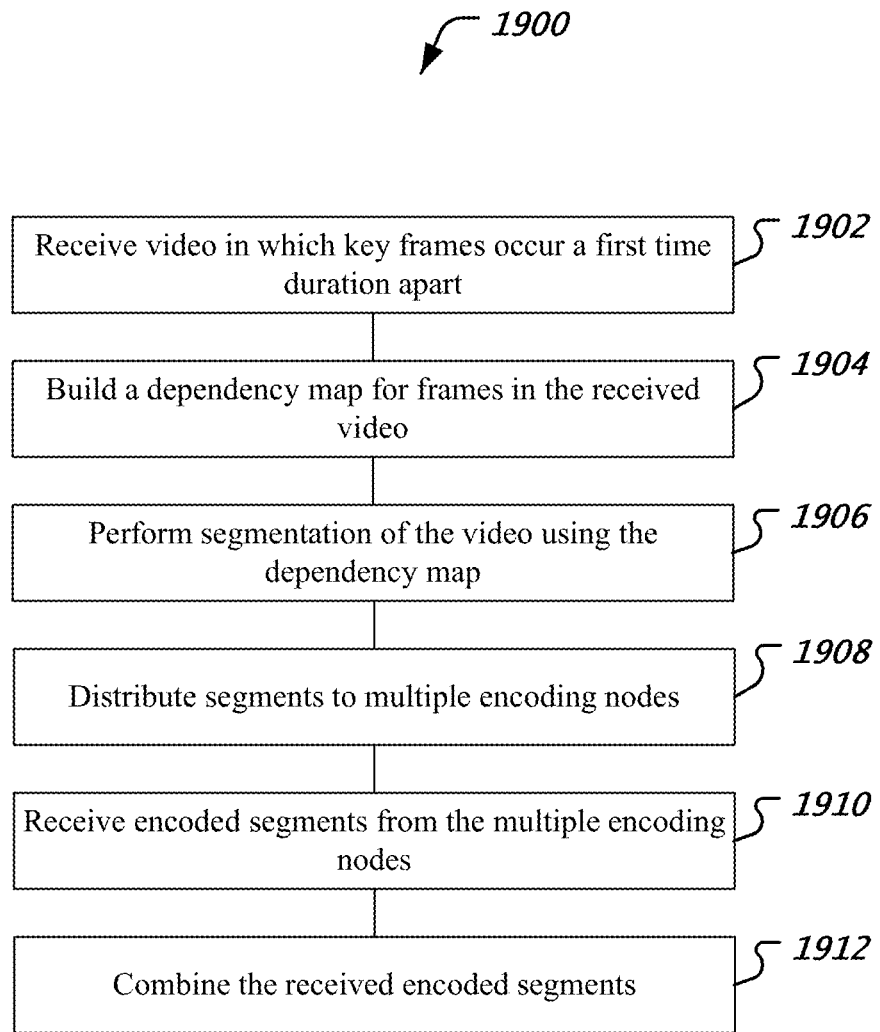
FIG. 19 illustrates a method for encoding a video by changing positions of at least some key frames in the resulting encoded bitstream.

FIG. 19 illustrates an example method 1900 of encoding a compressed video bitstream. The method 1900 may be implemented on the network-side of a social media network or a video sharing service provider's network.

The method 1900 includes, at block 1902, receiving a video. The video may be a compressed video bitstream. In the received video, key frames may occur nominally a first time duration apart, wherein a key frame is encoded without depending on another frame in the compressed video bitstream. The time duration may be specified in seconds, frame numbers, and so on. For example, in some embodiments, the time duration may be 10 seconds to 20 seconds and may correspond to an intended streaming protocol used when allowing other users to access the video bitstream.

The method 1900 includes, at block 1904, building a dependency map that identifies the reference frames used for each encoded video frame. Some examples of the dependency map are illustrated in FIG. 17 and FIG. 18. At block 1906, the received video is segmented using the dependency map. For example, as discussed with respect to FIG. 17 and FIG. 18, each segment may include frames that are encoded using only other reference frames within the same segment. The method 1900 includes, at block 1908, providing, or distributing, segments of the compressed video bitstream representing corresponding to a second nominal time duration to multiple encoding nodes, wherein each segment includes at least one key frame, and wherein at least some segments include video frames that occur temporally before and after the at least one key frame in a display order.

The method 1900 includes, at block 1910, receiving back results of encoding performed by each encoding nodes. The received encoded segment include the corresponding segment of compressed video bitstream such that key frames in resulting encoded video bitstream occur a second time duration apart. The method 1900 may include, at block 1912, combining, or concatenating, the received encoded segments into a single bitstream representing the encoded representation of the received video.

In some embodiments, the encoding includes encoding by changing temporal location of a key frame in resulting encoded video bitstream.

In some embodiments, the method 1900 includes determining, for each frame, in the display order, most distant past and future frames from which motion vectors for each frame are formed. In some embodiments, the determining is performed using motion vector information from the compressed video bitstream. In some embodiments, the determining is performed without uncompressing the compressed video bitstream.

In some embodiments, the encoding by each node is performed on fewer than all frames making up the corresponding segment. For example, as discussed herein, some frames before and/or some frames after key frames may be used for the sake of continuity of motion vectors only and may be dropped from the encoding process.

In some embodiments, the method 1900 further includes providing, to each of the multiple encoding nodes, information regarding location of a key frame in the encoding operation. In some embodiments, the method further includes encoding, by one of the multiple encoding nodes, the at least one key frame in received video segment to become a non-key frame in resulting encoded video bitstream.

Video encoders normally have many settings that adjust specific attributes of the encoding process. The effect of each of these settings can depend on the input video—some of the settings might make an encode worse for a certain input video, e.g., high motion, but will make a different input video, e.g., low motion better.

Figure 20:
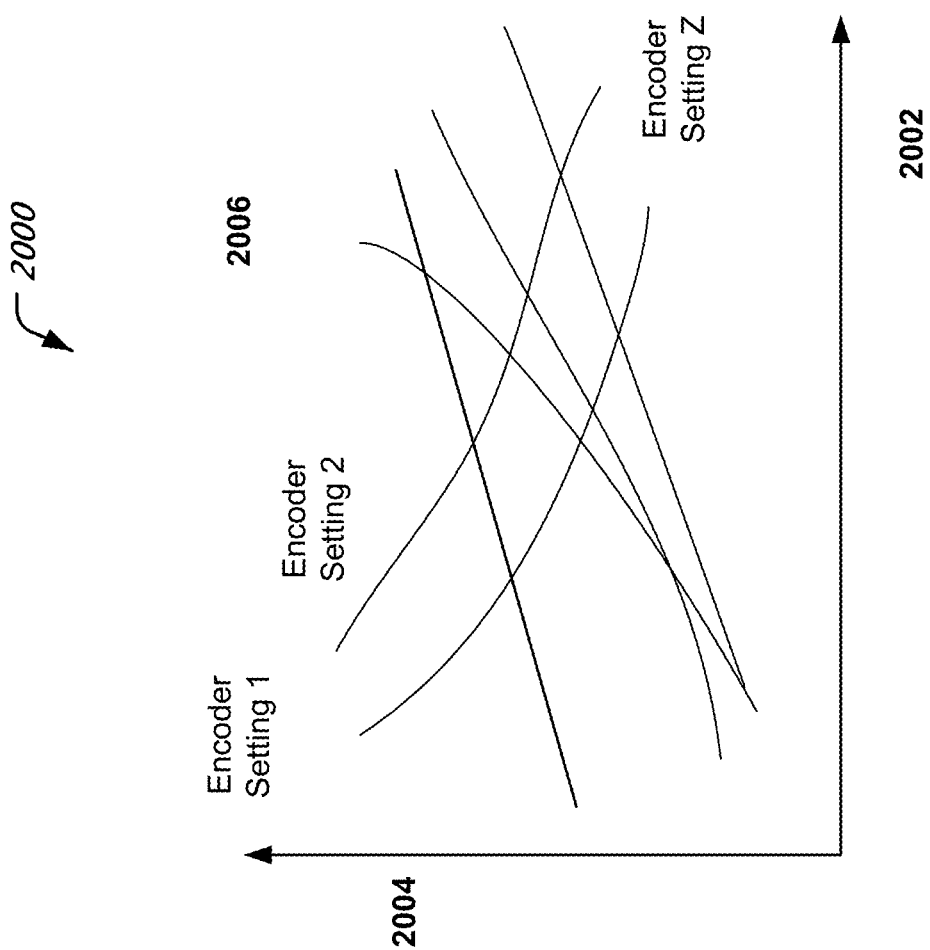
FIG. 20 illustrates an example graph of relationship between encoder parameter settings and quality of encoded video.

FIG. 20 depicts a graph 2000 to highlight this observed behavior of the video encoders at a given bitrate. The horizontal axis 2002 represents an encoding parameter setting, e.g., the amount of time spent by the encoder to encode each frame, and the vertical axis 2004 represents quality of output compressed video for multiple video encoders (multiple curves 2006, representing multiple encoder parameter settings 1, 2, ... Z, etc., where Z is an integer). The actual variations may depend from feature to feature, but generally, video encoders show varying quality outputs based on how the encoder setting.

It is often difficult to select a priori the best settings and, in practice, encoder settings are often selected based on operator-experience, or are pre-selected without attempting to customize video encoding settings to individual video content.

Some examples of video encoding settings can include: frame distance between key frames, how many predictive or bi-directional frames intervening key frames to use, threshold used for detecting scene changes by comparing two successive video frames, whether or not to perform intra-frame motion prediction, whether or not to use different quantization matrices, which of the multiple coding options to use for coding bits (e.g., variable length encoding or arithmetic encoding), whether or not to use fading detection, the motion search window to be used for each video frame, and so on. Some of these settings may have discrete (e.g., on/off or high/medium/low) values, while others may have continuous values. This is just an example list and one of skill in the art would appreciate that there are hundreds of design trade-off options that can be made in selecting a particular mode in which to run a video encoder, with each design option being a good choice for one type of video but not a good choice, in terms of compression efficiency, for another type of video.

In one example aspect, the realization that different settings are optimal for different types of video, and that a single video might have multiple different segments of video for which different settings are optimal, is used to achieve video compression ratios higher than that can be achieved by a given single video encoding setting on a multi-segment video. The present document discloses, among other techniques, a mechanism to find a relatively optimal setting (e.g. from a set of thousands of settings) for each different segment, and then assemble all of the encoded results into a single output video.

In some embodiments, a set of test video clips, or segments, may be encoded through an automated encoder engine. The encoder engine may encode each test clips with hundreds or thousands of different settings to understand the effect of each video setting on each test clip. The results of these encodings are used to train a training module that can determine optical encoding configurations for future video encodings.

In some embodiments, the training phase may be implemented using a neural network that uses a learning algorithm in which a cost criterion such as rate-distortion or visual rating score is used for training the encoding parameter learning.

Figure 21:
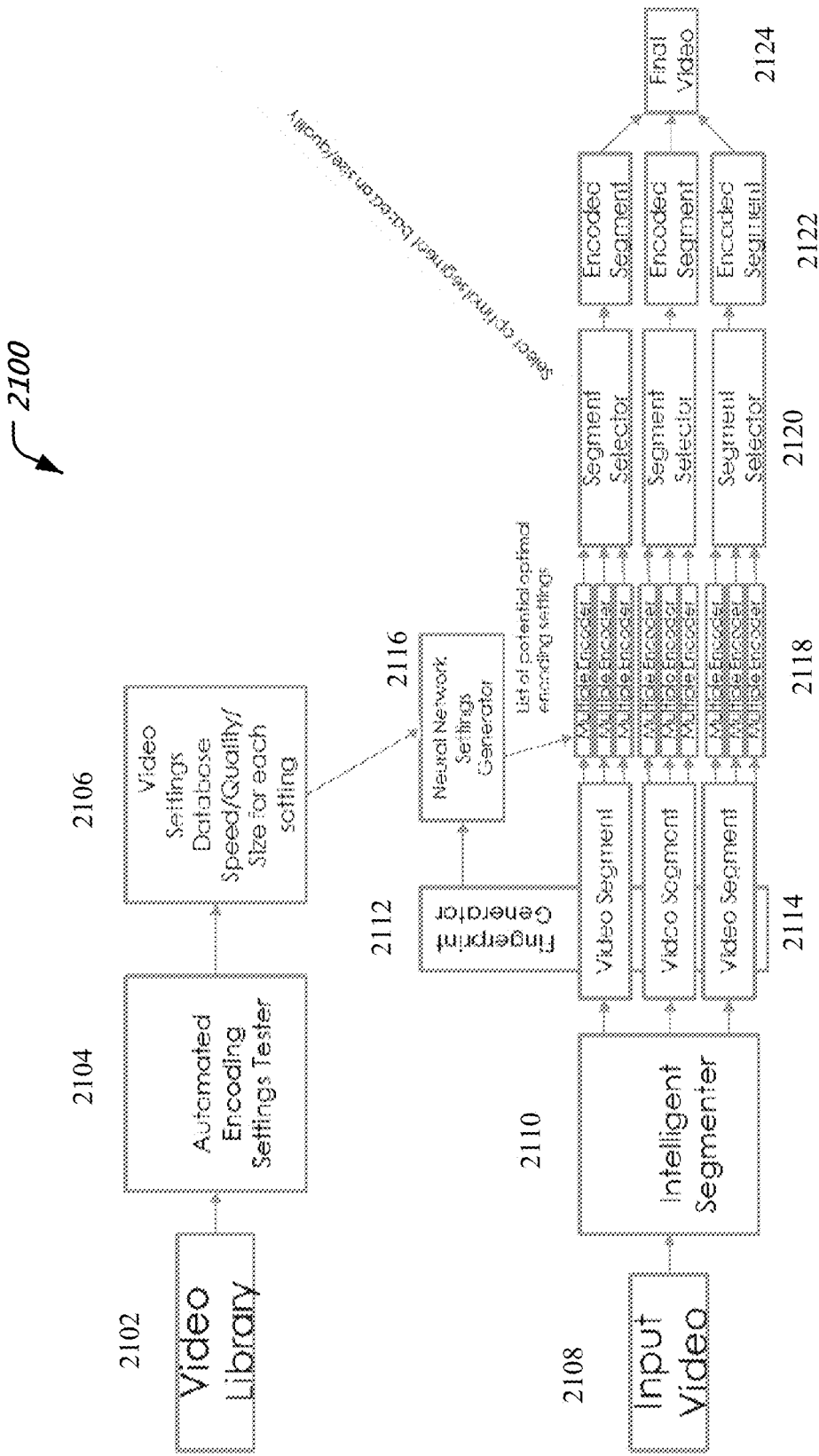
FIG. 21 illustrates an example system for performing ultra-high video encoding using multiple encoders.

FIG. 21 illustrates an example arrangement of video encoders 2100 to produce video encoding or encoding with very high compression ratios, while maintaining quality. In some embodiments, a library of test videos 2102 may be used as input to an automated tester module 2104 which cycles through all test sequences using all possible (could be in thousands) combinations of video encoding parameters to generate a database 2106 of results. This database 2108 may be used to train a machine learning algorithm such as a neural network settings generator 2116.

The arrangement 2100 may receive an input video 2108 for encoding or encoding, e.g., from a user upload.

In some embodiments, an intelligent segmenter 2110 may divide the input video into different segments 2114. This intelligent segmenter may learn an optimal place to segment the video and place output key frames to maximize quality by detecting scene change.

In some embodiments, a fingerprint generator 2112 may measure various video characteristics of each segment. The fingerprint generator 2112 may thus identify a "fingerprint" of a video, e.g., the qualities of the video that make it more or less amenable to certain configuration of encoding parameters. The fingerprint generator may feed these characteristics to a neural network settings generator 2116.

In some embodiments, the neural network settings generator 2116 may be provided with input video segment characteristics and may determine a set of video encoding settings that should include a setting for a relatively optimal encoding, e.g., the smallest output file size for a given quality level. The number of settings returned for each segment may be a configurable parameter: additional settings increases the chance of finding the optimal setting and improves compression efficiency, while fewer settings results in a faster overall encode.

In various embodiments, various machine learning techniques may be used to train the encoding process for how to pick the best video settings for each segment of a video to be encoded. For example, the complexity analyzer 504, 604, could be used to identify and report complexity of a segment as an input to the fingerprinting process.

In some embodiments in which multiple encoders 2118 are used, each video segment is encoded multiple times with the settings returned from the Neural Network Generator 2116.

After the video segments have been encoded, a segment selector 2120 analyzes each segment and picks the smallest sized segment 2112 that meets a predetermined quality requirement (e.g., a threshold quality).

The video segments are joined together into a single output video 2124.

As a result, each segment of the output video has been encoded with different settings that are relatively optimal for that segment, which means that as a whole, the output video meets the predetermined quality and has the relatively smallest file size.

Figure 22:
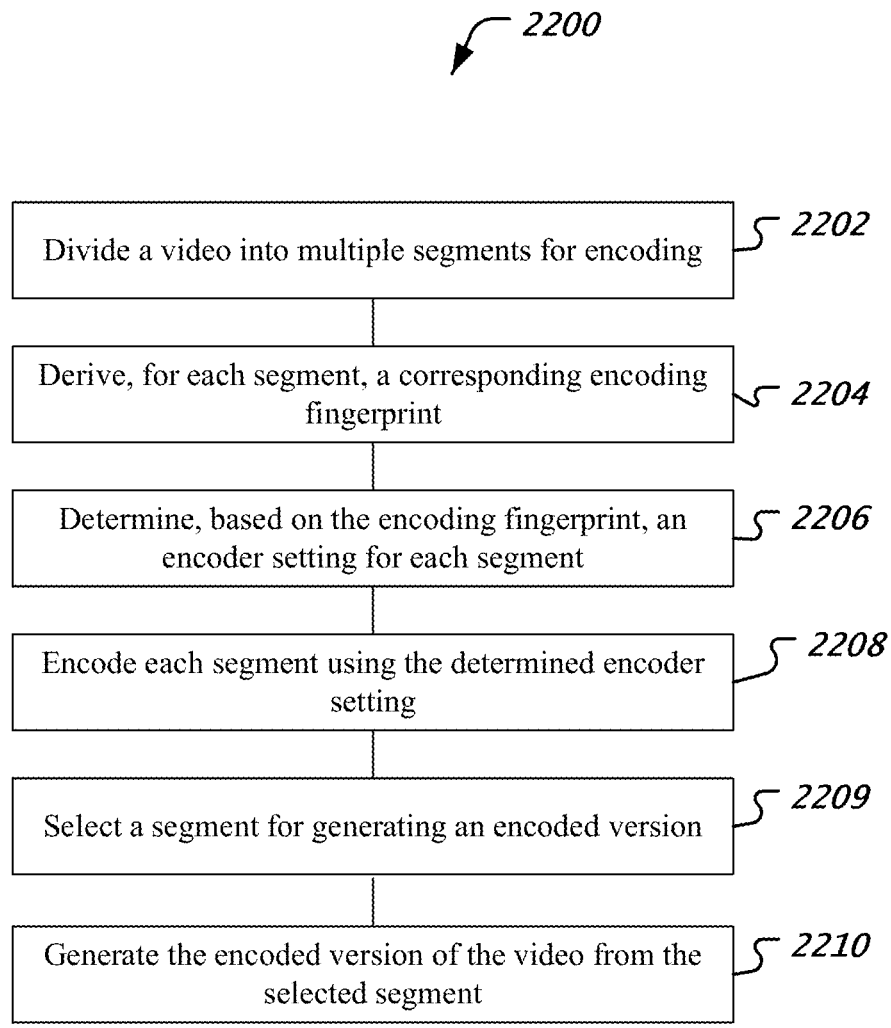
FIG. 22 illustrates an example flowchart of a method for encoding a video.

FIG. 22 illustrates an example flowchart for a method 2200 of encoding a video.

The method 2200 includes, at block 2202, dividing a video into multiple segments for encoding.

The method 2200 includes, at block 2204, deriving for each segment, a corresponding encoding fingerprint. In some embodiments, the deriving operation includes analyzing a ratio of bit utilization by different frame types in the videos, wherein the frame types include an intra-encoded frame type and an inter-encoded frame type. In some embodiments, the deriving operation includes analyzing a ratio of bits used in the videos for encoding motion based blocks and bits used in the video sequence for encoding non-motion based blocks.

The method 2200 includes, at block 2206, determining, based on the encoding fingerprint, an encoder setting for each segment. In some embodiments, the determining the encoder setting includes searching a database of encoder settings for a best match with the encoding fingerprinting of each segment. In some embodiments, the database of encoder settings is produced by encoding multiple test videos using multiple encoder settings and collecting quality measurements of resulting videos. In some embodiments, more than one encoder setting may be determined for each segment. Alternatively, or additionally, the parameter values for a given encoder setting may also be determined. For example, one encoder setting may relate to using a rectangular search window while another encoder setting may relate to the sequence in which motion vector search is performed within the search window, and within the encoder setting, a parameter may specify the size of the search window.

The method 2200 includes, at block 2208, encoding each segment using the determined encoder setting or settings. In some embodiments, the encoding of each segment is performed using distributed resources in which at least some of the encoding is performed by different encoders. The method 2200 includes, at block 2209, selecting from among the different encoded bitstreams generated by using different video encoder settings, a bitstream that meets a certain criterion. The criterion may be, e.g., a bitstream having a smallest size or a least number of key frames.

The method 2200 includes, at block 2210, generating an encoded version of the video by concatenating the selected encoded segments. The generation of an encoded version of the video may thus be accomplished such that each segment of the encoded version is selected to be a best choice according to a specified criterion, from among may other segments encoded using a variety of different ways of encoding the corresponding video portion.

In some embodiments, the method 2200 may further include encoding by assigning, to multiple worker nodes, segments of the video for encoding along with encoding settings to be used; and receiving, from the multiple worker nodes, a resulting bitstream for each segment; and collating together the received resulting bitstreams to produce the encoded version of the video.

As described in FIG. 21, e.g., in some embodiments all segments may be encoded concurrently, or at the same time, by submitting the segments to multiple encoders for encoding.

It will be appreciated that the disclosed techniques can be used to produce video that is segment-wise encoded using the best possible encoder setting for each segment, without having to incur time penalty by using distributed encoding resources. Furthermore, by using machine learning, e.g., generator 2116, the encoding parameter selection algorithm can be continuously improved.

In various embodiments, techniques for improving image stabilization using distributed processing are disclosed. In a distributed video encoding system, a video is encoded by splitting the video into video segments and encoding the segments using multiple encoders. Prior to segmenting the video for distributed video encoding, image stabilization is performed on the video. For each frame in the video, a corresponding transform operation is first computed based on an estimated camera movement. Next, the video is segmented into multiple video segments and their corresponding per-frame transform information. The video segments are then distributed to multiple processing nodes that perform the image stabilization of the corresponding video segment by applying the corresponding transform. The results from all the stabilized video segments are then stitched back together for further video encoding operation.

With the mass proliferation of cell phones with camera, there is growth in videos being taken and shared. Non-professionally captured videos and videos captured using hand-held devices such as cell phones and tablet computers, often suffer from lot of shakiness due to instability of human hand and external factors like wind, etc. The resulting video may be shaky, e.g., stationary objects may change position in successive video frames not from movement in the object but due to movement in the capture device. The resulting video is not just unpleasant to watch but also may suffer from poor video compression quality because bits may be expended in capturing object movement where, in fact, there was not movement of the object. It may be beneficial to process the video using an image stabilization stage in which instability due to camera movement is detected and suppressed or eliminated.

In some embodiments, a two-step image stabilization process may be used. In the first pass, video frames may be analyzed to detect shakiness and a corrective transform or transforms may be computed to substantially mitigate the effects of unstable camera. In the second pass, the transforms are applied to the source video frames to produce stabilized video.

The existing methods perform these passes linearly on a single machine, which is extremely slow. We disclose a method to accomplish image stabilization in a distributed encoding environment.

Figure 23:
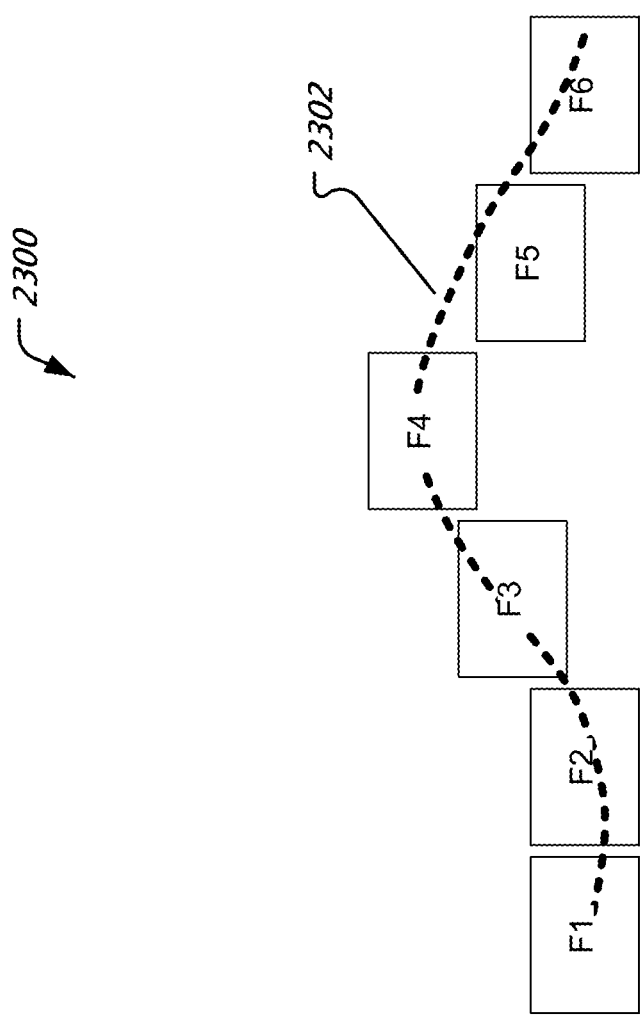
FIG. 23 illustrates an example of destabilization caused in video frames due to camera movement.
Figure 24:
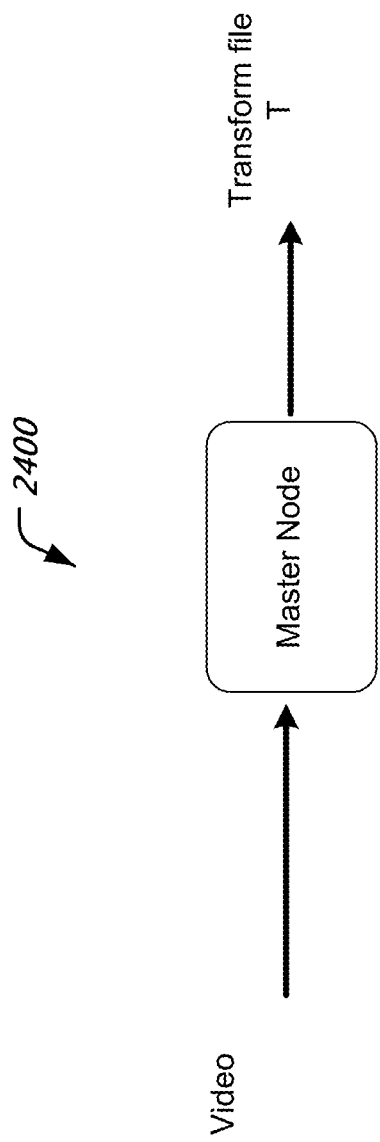
FIG. 24 illustrates an example block diagram for generating a transform file from an encoded video.
Figure 25:
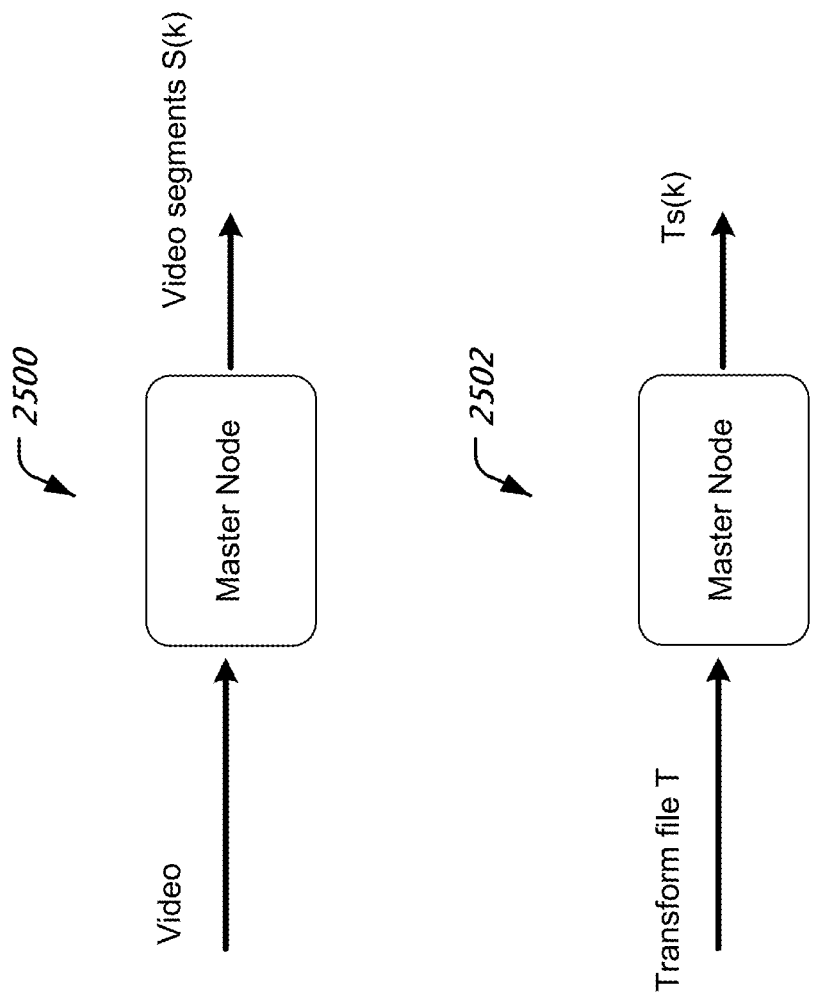
FIG. 25 illustrates an example block diagram of distributed image stabilization of a video.
Figure 26:
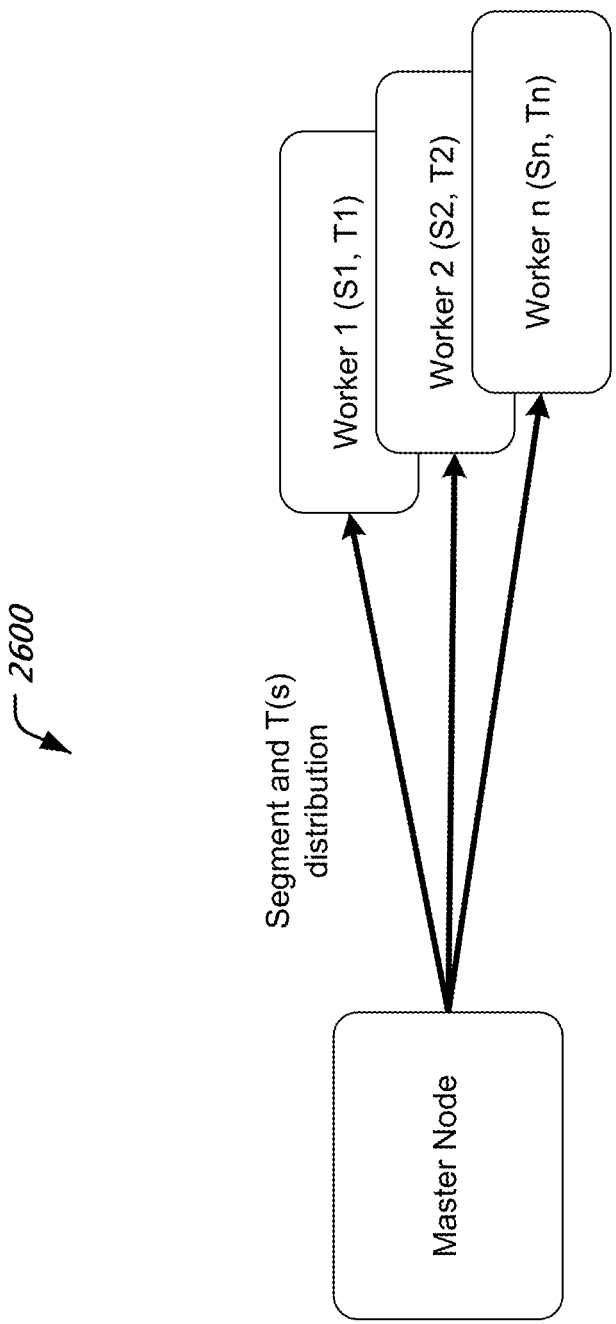
FIG. 26 illustrates an example block diagram of performing distributed image stabilization using multiple worker nodes.
Figure 27:
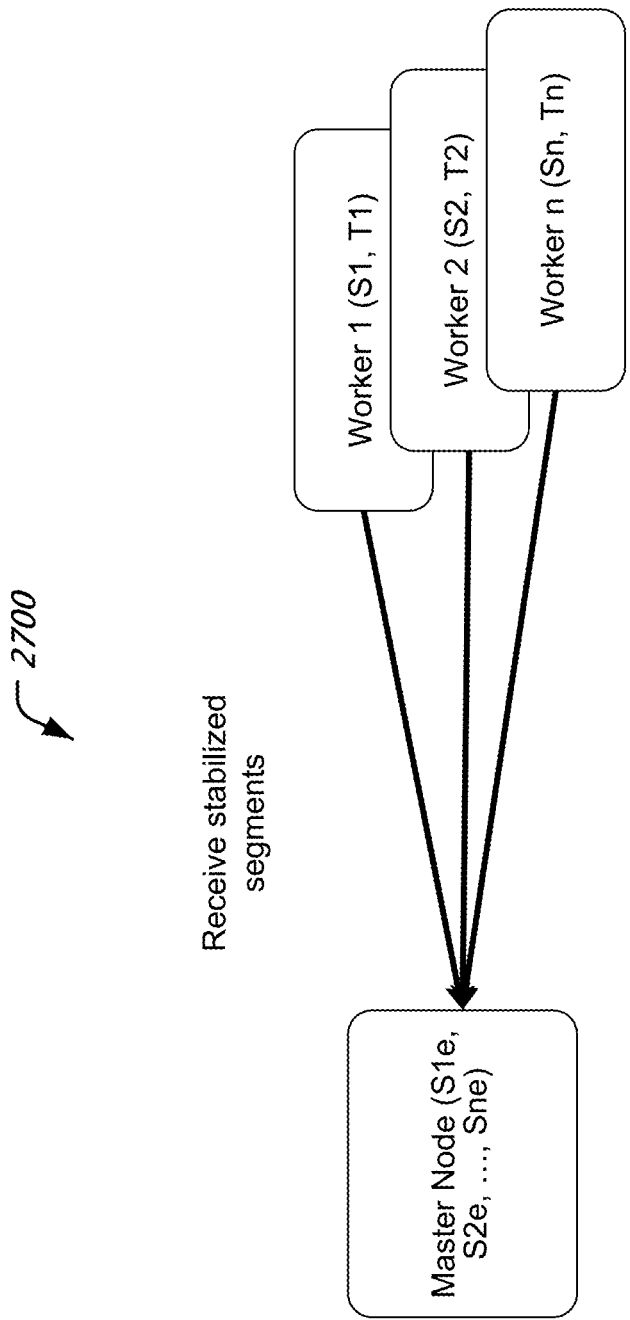
FIG. 27 illustrates an example block diagram of receiving results of image stabilization from multiple worker nodes.
Figure 28:
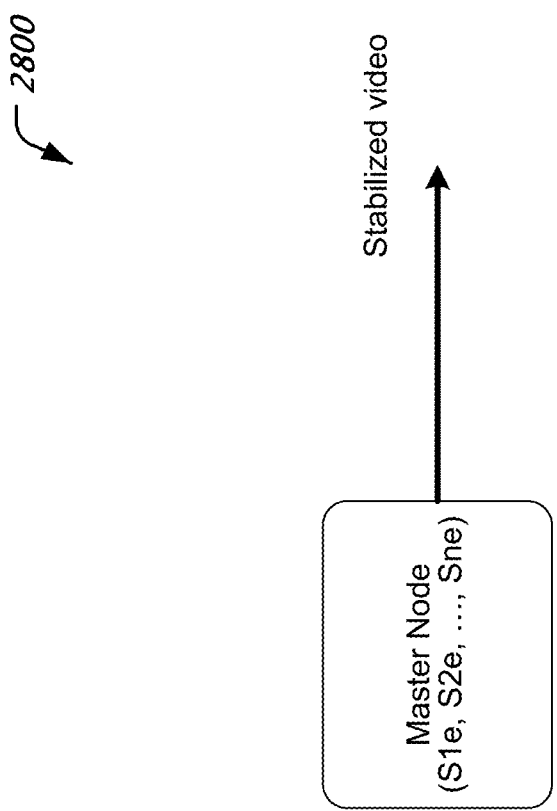
FIG. 28 illustrates an example block diagram of generating an image stabilized video at a master node.

FIG. 23 depicts an example of a video frame sequence 2300 in which camera shakiness has occurred. The sequence 2300 illustrates 6 consecutive frames of a video captured by a camera when the camera was shaking. With respect to the first captured frame F1, an upward shake is observed at frames F2, F3 and F4. Frames F4, F5 and F6 represent a downward shake of the camera. The dashed line 2302 represents the approximate path, or up-down movement, of the camera. While not depicted explicitly in the drawings, a determination can also be made about camera rotation, whether camera rotated clock-wise or anti-clockwise can also be made.

In some embodiments, image stabilization may be performed as follows:

Pass 1: In this pass, camera motion is detected by figuring out displacements in the positions of some objects that occur in two or more temporally sequential frames. An object from a frame is matched with same object in the next frame(s) to determine Frame Motion, Mf. The estimated frame motion Mf is then utilized to determine overlapping areas between adjacent frames. Each frame is then cropped and zoomed to ensure that the maximum overlapping area persists between adjacent frames. This is accomplished by creating a transform T(n) for every frame 0 to N (N+1 total frames) in the video. In some embodiments, a list with N+1 entries may be generated, with each entry in the list corresponding to one of the T(n) transforms.

Pass 2: For each video frame n, the Transform T(n) is applied to the video frame. Subsequently, the video is encoded to improve image stability.

In a conventional method, the operations of Pass 1 may be performed on an entire video and a list may be created for details of transforms T(n) performed for every step.

Next, the entire video is encoded, or compressed, by first applying the appropriate transform T(n) for each frame 0 to N to stabilize the contents for the frame against camera movement.

Since this approach is linear, it may be extremely slow, making it undesirable in real world situations.

In some embodiments, distributed computing resources are used to achieve distributed image stabilization.

In some embodiments, the process of image stabilization is distributed among multiple nodes for achieving better performance (e.g., end-to-end processing speed). For example, Pass 1 may be performed as described above on a single node/machine (master node) since it is data dependent across adjacent frames. A transforms file T is created which contains transform T(n) to be applied for each frame 0 to N in the input video.

Next the input video is split (e.g., at key frames) into multiple segments. For example, the N+1 frames may be divided into K segments, S(k), where k=0 to K−1. The number of frames in each segment S(k) may be represented as L(k). In general, depending on key frames in the input video, L(k) may have different values. The transforms file T (which contains the transforms T(n) corresponding to frames 0 to N of the input video) is also split and re-indexed per the segment frame offsets matching the input video segments. The segments and corresponding segment transforms file Ts(k) (created from the original transforms file T) is sent to each worker node for processing. Each worker node applies the transforms Ts(k) in the received transform file Ts(k) to the frames of the segment (e.g., 0 to K frames in the segment) and generates an image-stabilized segment. As an example, in some embodiments, an input video may comprise 3,000 video frames (N=2,999), which may be divided into 200 segments (K=200). The number of frames in each segment may be between 1 to 15 frames, and there may be 3 worker nodes for image stabilization. The master node may send first 65 segments to the first worker node, along with first 65 entries of the transform matrix list T, the next 65 segments and corresponding transform entries to the second worker node, and the last 70 segments and the corresponding transform entries to the third worker node.

At the end of processing the master node collects all individual segments and stitches them together, thereby creating the final image stabilized video.

FIG. 24, FIG. 25, FIG. 26, FIG. 27 and FIG. 28 depict an operations performed by the master node and worker nodes.

At 2400, one of the nodes, called a master node, analyzes the frames of the video and generates a file T of transforms T(n).

At 2500, the master node splits the input video into multiple video segments S(k). The master node computes a frame offset used for each split and keeps track of these frame offsets to produce the segment transform file Ts.

At 2502, the master node splits the transforms file, T, into multiple segment transforms Ts(k) using segment frame offsets calculated at 2500.

At 2600, the master node distributes the segments and corresponding transform files to worker nodes. For example, first worker node may receive S1 segments, and T1 segment transforms, the nth worker node (where n may be between 1 and W, where W is the number of worker nodes) may receive Sn segments and corresponding Tn segment transforms from the transform file T.

At 2700, the worker nodes apply the transforms and create stabilized segments. Upon completion of the stabilized segment, each worker node sends each segment S1e, S2e, . . . up to Sne, where n is between 1 and W, to the master node.

At 2800, the master node stitches all the stabilized video segments back together.

Figure 29:
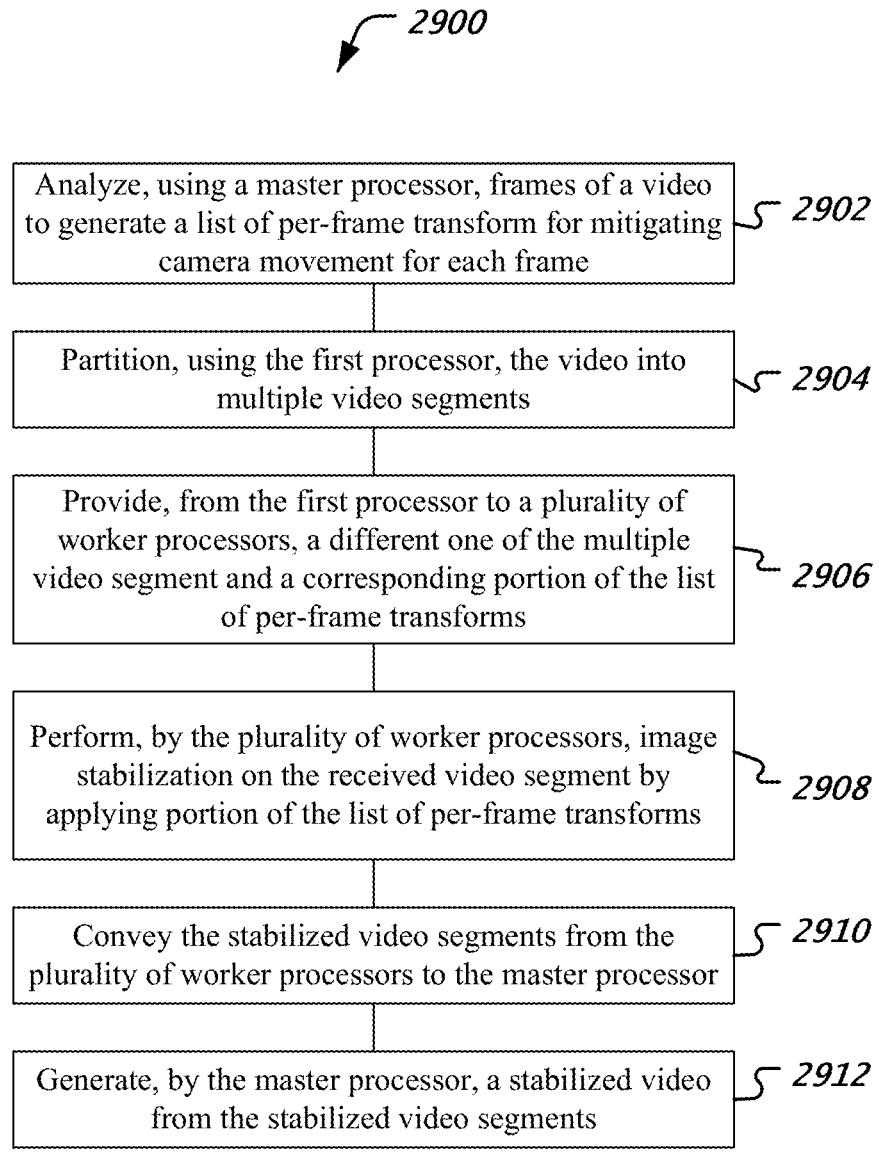
FIG. 29 illustrates an example flowchart of a method of distributed image stabilization.

FIG. 29 illustrates an example method 2900 of distributed imaged stabilization.

The method 2900 includes, at 2902, analyzing, using a master processor, frames of a video to generate a list of per-frame transform for mitigating camera movement for each frame;

The method 2900 includes, at 2904, partitioning, using the first processor, the video into multiple video segments. In some embodiments, the master processor and the first processor may be the same processor.

The method 2900 includes, at 2906, providing, from the first processor to a plurality of worker processors, one or more of the multiple video segments and a corresponding segment transform file.

The method 2900 includes, at 2908, performing, by the plurality of worker processors, image stabilization on the received video segment(s) by applying the corresponding segment transforms to the received video segments to produce stabilized video segments.

The method 2900 includes, at 2910, conveying the stabilized video segments from the plurality of worker processors to the master processor.

The method 2900 includes, at 2912, generating (e.g., by stitching or concatenating), by the master processor, a stabilized video from the stabilized video segments.

In some embodiments, analyzing frames includes analyzing motion vectors associated with the frames to identify a global component to the motion vectors. In some embodiments, the analysis is performed on a compressed representation of the frames. In some embodiments, frame analysis further includes decompressing at least some of the frames at least partially.

In some embodiments, the frame analysis includes applying a rotational transform to at least some of the frames. In some embodiments, the transform for mitigating camera movement includes compensating for at least one of a left-right movement, an up-down movement and a rotational movement.

In some embodiments, generating the stabilized video from the stabilized video segments includes smoothing camera movement across contiguous stabilized video segments.

In some embodiments, partitioning into multiple video segments includes creating each video segment by including a key frame at a given position in the video segment.

As described before, distributed video encoding involves splitting the input videos into segments and passing the segments to a cluster of worker nodes. The worker nodes independently encode the videos and ship the output segments back to the master node. The master node then stitches all the segments together to create a final output.

Figure 30:
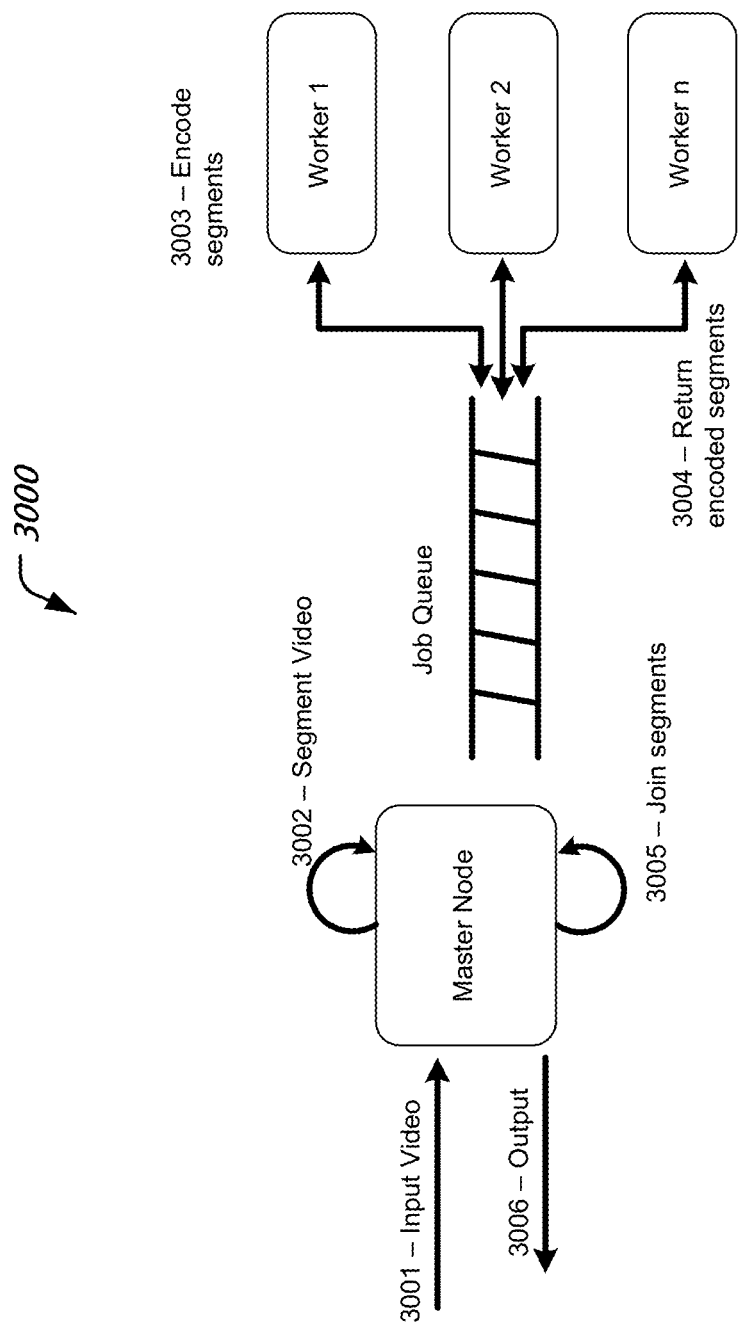
FIG. 30 illustrates an example of a distributed video encoding system.

FIG. 30 illustrates an example of a distributed video encoding system 3000. At 3001, an input video is received by a master node from a user device 1106, 1116. The input video may be a compressed video or an uncompressed video. At 3002, the master node may split the video into multiple segments. The master node may then assign segments to different worker nodes for performing video encoding. At 3003, each worker node encodes the segment received. At 3004, each worker node sends back the resulting encoded bitstream to the master node. At 3005, the master node combines the segments back to generate an encoded bitstream for the video. A similar workflow of splitting, encoding, and combining is also described with respect to FIG. 3, FIG. 5 and FIG. 6.

One aspect to streamline the workflow described in FIG. 30 is to ensure that the worker nodes are highly utilized without being over-utilized. Over-burdened worker nodes can have a direct hit on performance and underutilized nodes are a wasted resource of the distributed system.

Considering that encoding can be done on the CPU or GPU, these two may be considered independent resources in a system. The quality of encoding on a CPU is different from quality of encoding on a GPU.

Figure 31:
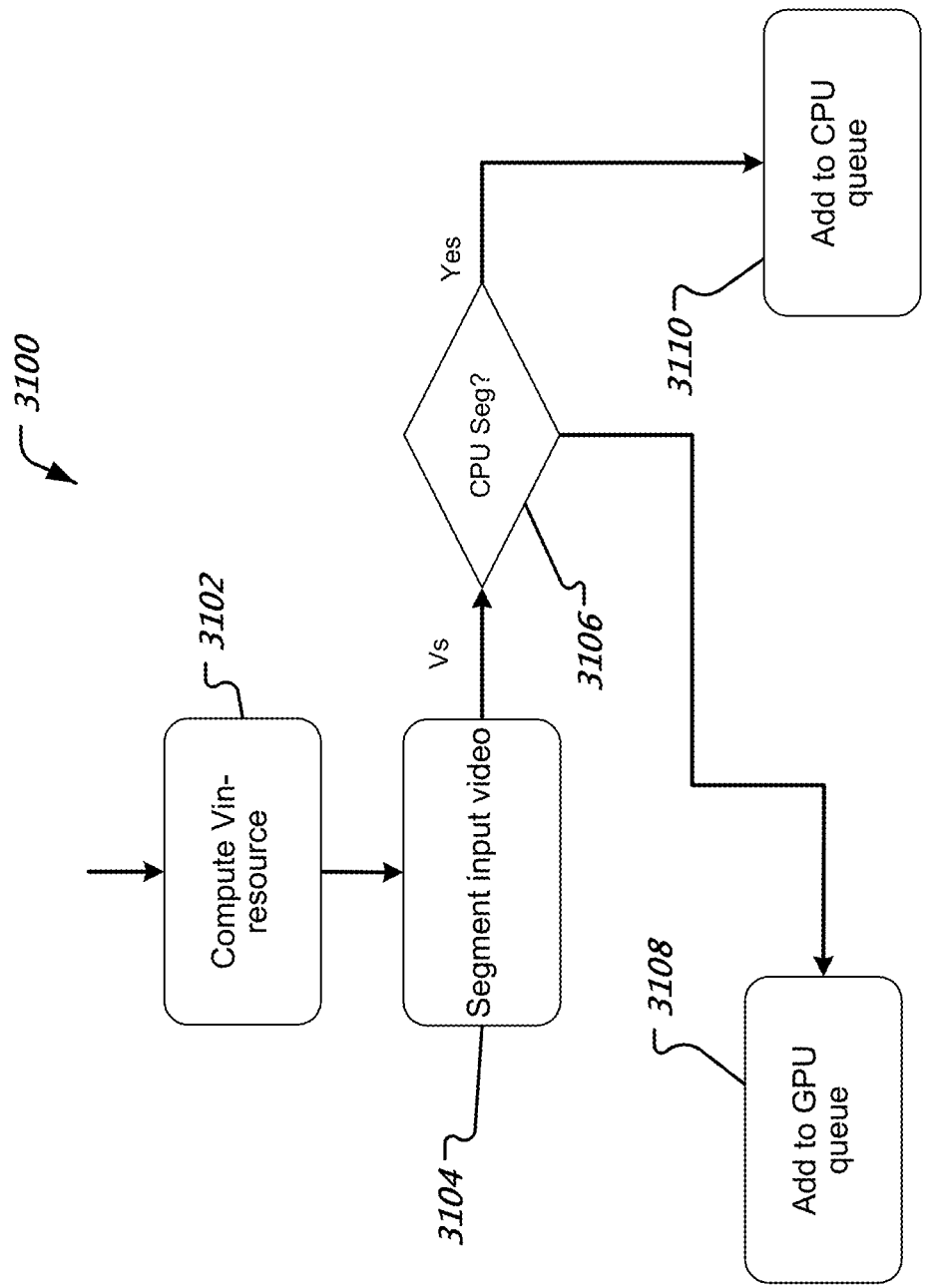
FIG. 31 illustrates an example flowchart of a decision process for node selection performed at a master node in a distributed video encoding system.

FIG. 31 depicts an example flowchart of a method 3100 implemented at the master node. Each input video, Vin, is analyzed by the master node using a classification scheme C (Vin, output) and determined if the video is to be encoded using CPU or GPU. Factors like target resolution and quality are considered in making this decision.

$$Vin\text{-}resource=C(Vin,output),$$

calculated at 3102.

At 3104, the master node segments the video, The Vin-resource attribute is attached to each segment, Vs. Alternatively, individual segments could also be analyzed to determine if they would be ideal for GPU or CPU encoding. This yields true heterogeneous behavior, even with a file. At 3106, a determination is made about whether a given segment is for encoding by a CPU or by a GPU.

Segments Vs with a "CPU" attribute are queued in a GPU-queue (3108).

Segments Vs with a "CPU" attribute are queued in a CPU-queue (3110).

Figure 32:
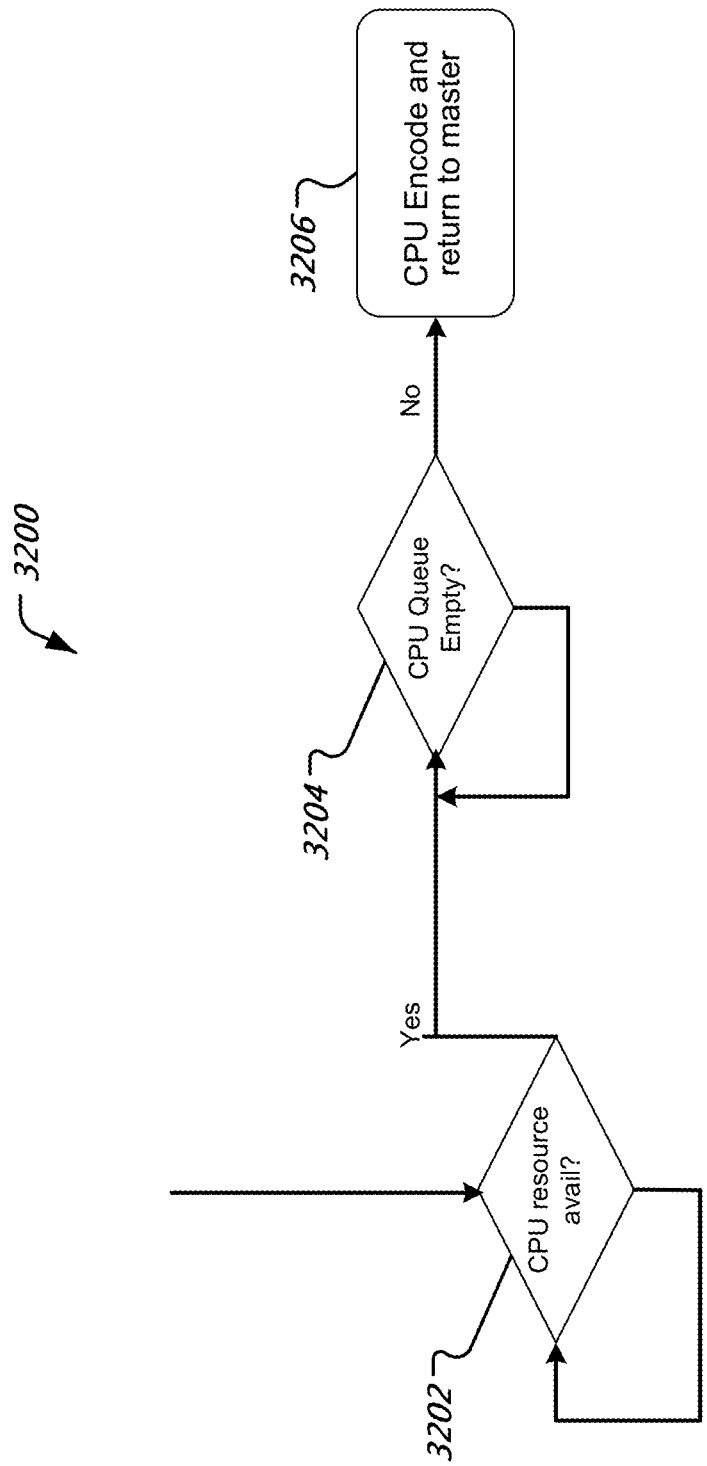
FIG. 32 illustrates an example flowchart of a decision process at a worker node in a distributed video encoding system.

As depicted in the example flowchart of FIG. 32, each worker node run a process, P, 3200 that determines its available CPU and GPU resources (3202).

If the CPU resources of a node fall below a threshold (e.g., as checked in 3204), new job (segment) is picked from a CPU queue. Then, CPU based encoding is performed and encoded segment is returned to the master (3206).

Figure 33:
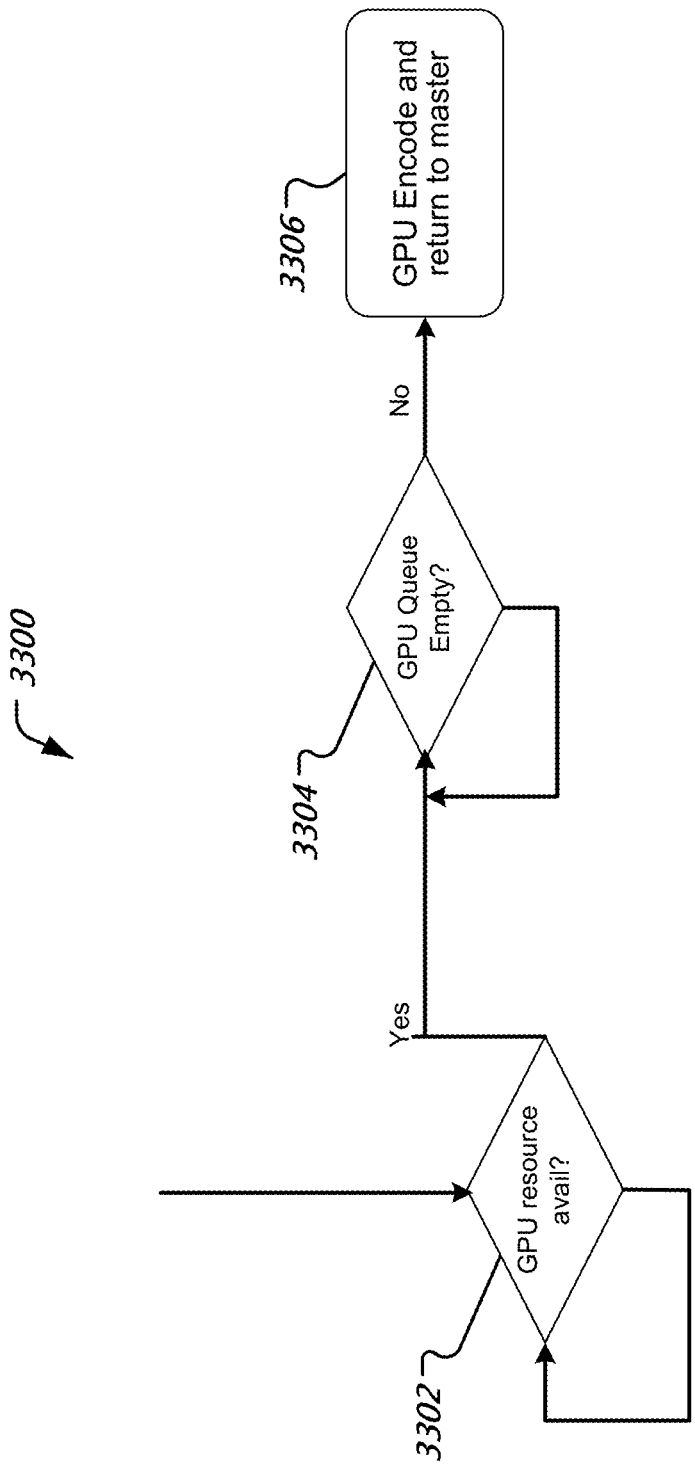
FIG. 33 illustrates another example flowchart of a decision process at a worker node in a distributed video encoding system.

As shown in FIG. 33, a similar process 3300 is performed at the worked node to determine GPU resource availability (3302). Similarly if the GPU resources of a node fall below a threshold, a new job (segment) is picked from the GPU queue for processing (3304).

At the end of processing the worker nodes submit encoded chunks back to the master node (3306).

Master node reassembles the individual segments and generates the output file.

Figure 34:
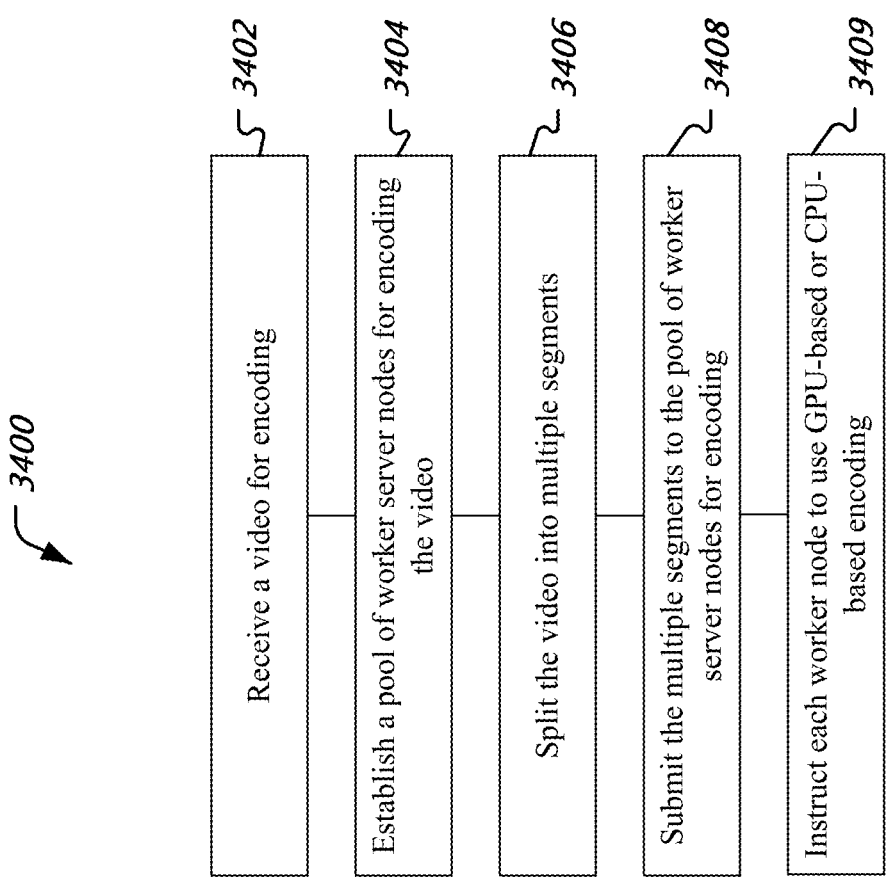
FIG. 34 illustrates an example flowchart of a method of distributed video encoding by assigning video segments to worker nodes.

FIG. 34 is a flow diagram illustrating an example method 3400 for distributed video encoding. The method 3400 may be implemented at a master server, as described herein.

The method 3400 includes, at block 3402, receiving a video for encoding. In some embodiments, e.g., the video may be received from a user device that uploads the video to the master server.

The method 3400 includes, at block 3404, establishing a pool of worker server nodes for encoding the video. In some embodiments, the establishing the pool of worker server nodes includes querying each server node, prior to the receiving the video, for information about encoding capabilities of the worker server node. In some embodiments, the encoding capabilities include at least one of protocol compliance, a software-based encoding capability, e.g., a CPU-based encoder, and a graphics processor based processing capability, e.g., a GPU encoder.

The method 3400 includes, at block 3406, splitting the video into multiple segments. In some embodiments, the splitting includes splitting the video such that each segment includes at least one key frame from the video that is independently decodable.

The method 3400 includes, at block 3408, submitting the multiple segments to the pool of worker nodes for encoding based such that each segment is submitted to a corresponding worker node based on a run-time availability of the corresponding worker node. In some embodiments, the run-time availability includes determining whether the corresponding worker node is able to meet a target time within which a segment is to be encoded. The method 3400 includes, at block 3409, instructing to each worker node in the pool whether that worker node should use CPU-based encoding or GPU-based encoding to encode the segment submitted to the worker node. In some embodiments, the master node may first decide whether a segment should be encoded using CPU-based encoding or GPU-based encoding and based on this decision, the master node may select one of the available worker nodes from the pool of worker nodes that can perform encoding using the selected encoding method (GPU-based or CPU-based).

In some embodiments, the method 3400 further includes receiving encoding parameters for the video and wherein the establishing the pool includes selecting worker server nodes whose encoding capabilities are compatible with the encoding parameters.

In some embodiments, the method 3400 further includes receiving encoded segments from the worker nodes, and reassembling the encoded segments to produce encoded sequence. In some embodiments, the method 3400 includes performing another encoding on the video sequence at a different encoding bitrate to produce another encoded copy of the video sequence. In some embodiments, the method 3400 may further including making a decision about whether to use a CPU or a GPU for encoding segments of the video, e.g., based on resource availability.

When a distributed encoding system, e.g., as depicted in FIGS. 2, 3, 5, 6, 7, 15, 30, etc. is used for encoding segments of multiple video sequence, the resulting encoding can finish at a very fast rate. For example, a 30 minute video may be split into 1 minute long segments, with the resulting 30 segments being fed to 30 worker nodes that can encode the video at 2× rate, thereby generating encoded bitstream for the 30 minute video in slightly more than 30 seconds (depending on the network traffic and splitting/combining overhead).

However, in video file upload and sharing networks, often, hundreds of users are uploading their video files for storage and sharing. Also, some users may have service level agreements with the service provider that their video file, once uploaded, should become available for worldwide viewing within a specified time period. This time period may be "real time" especially for news sources that want their news to become available for public viewing as soon as the news clip us uploaded to the server.

Such demands on the distributed video encoding system of having a large number of videos in a queue for encoding, while at the same time wanting to encode some videos at extremely quick turnaround, may pose conflicting demand on resources. For example, while the above-discussed 30 minute video may be encoded in 30 seconds if all distributed resources were available to the video, this video may be queued behind 500 videos from other users, which may be 2 minutes long each, thereby causing several minutes of delay before the encoding of the 30 minute video finished.

The techniques presented in this document can be used, in one aspect, to overcome this operational disadvantage by reprioritizing video encoding on a segment by segment basis instead of a video by video basis. This allows, for example, for encoding to be paused after a single segment and resources to be redistributed or reallocated as desired, rather than needing to wait for the end of encoding of an entire video, as required by traditional encoding systems.

Distributed video encoding can achieve must faster compression than a serial operation of a single encoder since a master node distributes the task of encoding among multiple worker nodes. If Ms is the time taken for encoding one video on a single machine, the following equation yields the time taken on a distributed environment.

$$Md=(Ms/n)+O, \text{ where}$$

Md=total time taken to process a video on a distributed encoding platform;

N=number of worker nodes; and

O=overhead for splitting, merging and job distribution. This is linear to the length of the video.

It is beneficial to some users to have an arrangement with a video sharing service provider to be able tm meet a fixed speed of encoding irrespective of number of resources available or any other users' encoding jobs undertaken by the service provider. The disclosed techniques can be used to monitor and control speed of each encode via a feedback loop from worker nodes to the master node.

Figure 35:
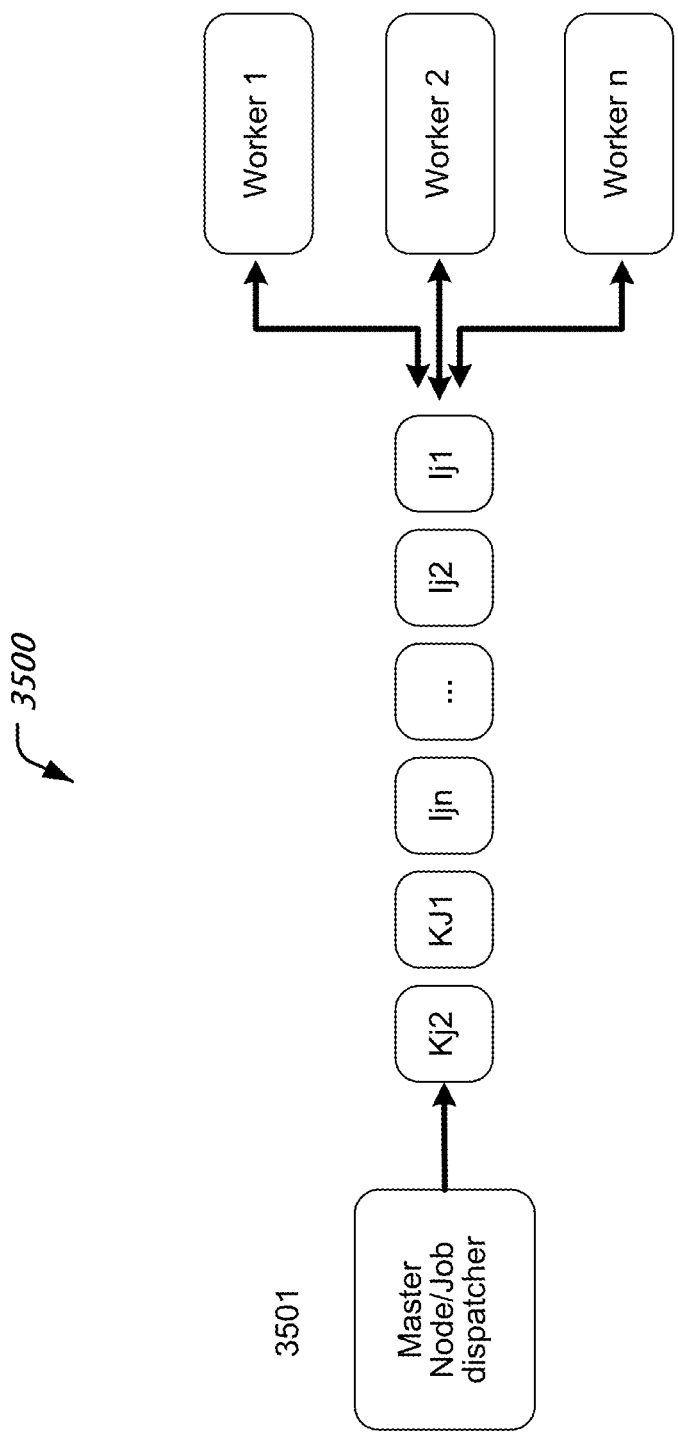
FIG. 35 illustrates an example of a video encoding pipeline in a distributed video encoding system.

FIG. 35 depicts an example distributed video encoding system 3500 in which a master node 3501 performs the task of splitting a video into multiple video segments of smaller sizes and dispatching them to multiple worker nodes as encoding jobs, as described in the present document.

A job submitter component, residing in master node, may be responsible for submitting segment level jobs to a job_queue which holds a queue of segments to be sent to worker nodes.

In a traditional case, the job_submitter may keep pushing each video segment as it arrives into the job_queue and the worker nodes pull jobs from the job queue, process them and send them back to the master node. Assuming, an input video I is split into "n" segments thereby creating n jobs. Ij1, Ij2, . . . , Ijn. Similarly a second input video K would have Kj1, Kj2, . . . Kjm jobs. In the traditional case, because of the queuing, job Kj1 starts only after Ijn is done. Also, Until Ijn is done, all the worker nodes are only processing jobs related to input I that were added to the job queue ahead of the segments of video K.

In some embodiments, the master node may associate, with every video received, a target speed of processing. For example, a processing speed of 5× implies that the job is to be done 5 times faster than real time. Next the jobs are segmented at key frames while maintaining the speed requirements.

The Job Dispatcher may start by submitting a small number of segments, S, from every input into the job queue. The number S may be one or a higher number based on the granularity of service layer agreement that is to be met.

The worker nodes receive their respective encoding segments, and at the end of encoding a chunk, return the results of encoding back to the master node.

The job dispatcher may keep a progress check for each job. The job dispatcher may also monitor the processing time taken by each worker node for encoding the previously sent segments.

Based on the progress of each input, the desired speed of encoding for that job and the available worker nodes, the job dispatcher dynamically decides the number of new segments to be submitted to the job queue.

NumNewSegmentsToSubmit($I,S$)=Status(Progress of input $I$,Number of worker nodes)

Using this relation, for example, when the master node notices that a given video is falling behind on the target speed of encoding, the master node may submit more segments from that video to the job queue. Similarly, for another video, whose encoding is running faster than its target rate, fewer number of segments may be submitted to the queue.

Figure 36:
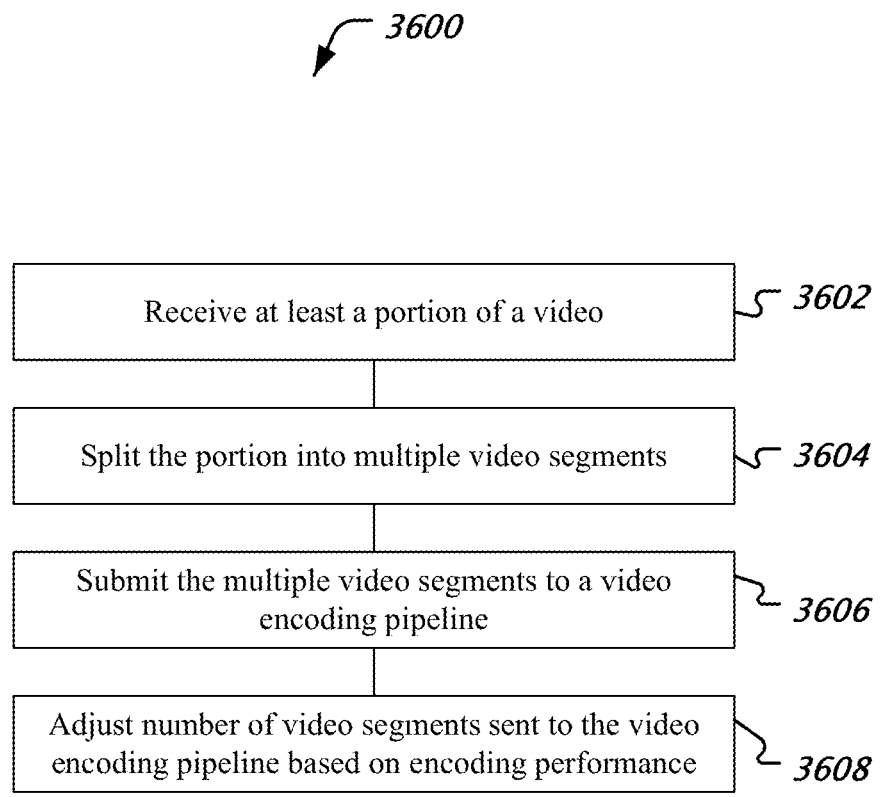
FIG. 36 illustrates an example flowchart of a method of distributed encoding of multiple videos.

FIG. 36 illustrates an example flowchart for a method 3600 of encoding multiple videos in a distributed computer network.

The method 3600 includes, at 3602, receiving at least a portion of a video. For example, the submission of segments described above may begin without having to wait until the entire video is received, e.g., simply after first S number of video segments are available for encoding.

The method 3600 includes, at 3604, splitting the portion into multiple video segments. In some embodiments, the received portion may be split into same sized video segments (e.g., 6 seconds long). In some embodiments, the techniques descried herein, e.g., for including key frames in an open GOP scenario, may be used.

The method 3600 includes, at 3606, submitting the multiple video segments to a video encoding pipeline that includes segments from at least one other video, wherein the video encoding pipeline operates to issue video segments to encoding nodes for video encoding in a priority order. The priority order may depend on the monitoring of the completion speed of encoding of the video.

The method 3600 includes, at 3608, adjusting a number of video segments sent to the video encoding pipeline based on encoding performance.

In some embodiments, the adjustment is performed in response to a target encoding time budget for the video and an encoding latency in the distributed network of servers. For example, when a video is falling behind on a scheduled time budget, a greater number of segments of that video may be submitted to the encoding pipeline.

In some embodiments, the encoding of the video is started after encoding of the at least one other video and the encoding of the video is finished before the encoding of the at least one other video.

In some embodiments, the splitting operation includes splitting the portion into multiple video segments so that each video segment includes at least one key frame.

In some embodiments, at least some video segments include at least one frame occurring temporally prior to the at least one key frame. In other words, the first frame in some segments may not be an independently decodable frame such as an I frame but may be a P or B type frame.

In some embodiments, the sending to the encoding node occurs prior to receiving the entirety of the video at the server.

In some embodiments, the multiple video segments of the input video and segments from the at least one other video may be of same size, and may thus include the number of video frames.

In some embodiments, the method 3600 further includes selecting, based on a video encoding load, the one of the encoding nodes to which the at least one of the multiple video segments is sent out of order.

It will be appreciated that techniques are disclosed for prioritizing submissions of video encoding segments to a pipeline of video encoding such that encoding jobs from one video being encoded do not block encoding of another video segment. By using the target completion rate or time budget as criteria, the queue filling technique ensures that priority of encoding is increased when a video encoding may fall behind its schedule.

Computer System

Figure 37:
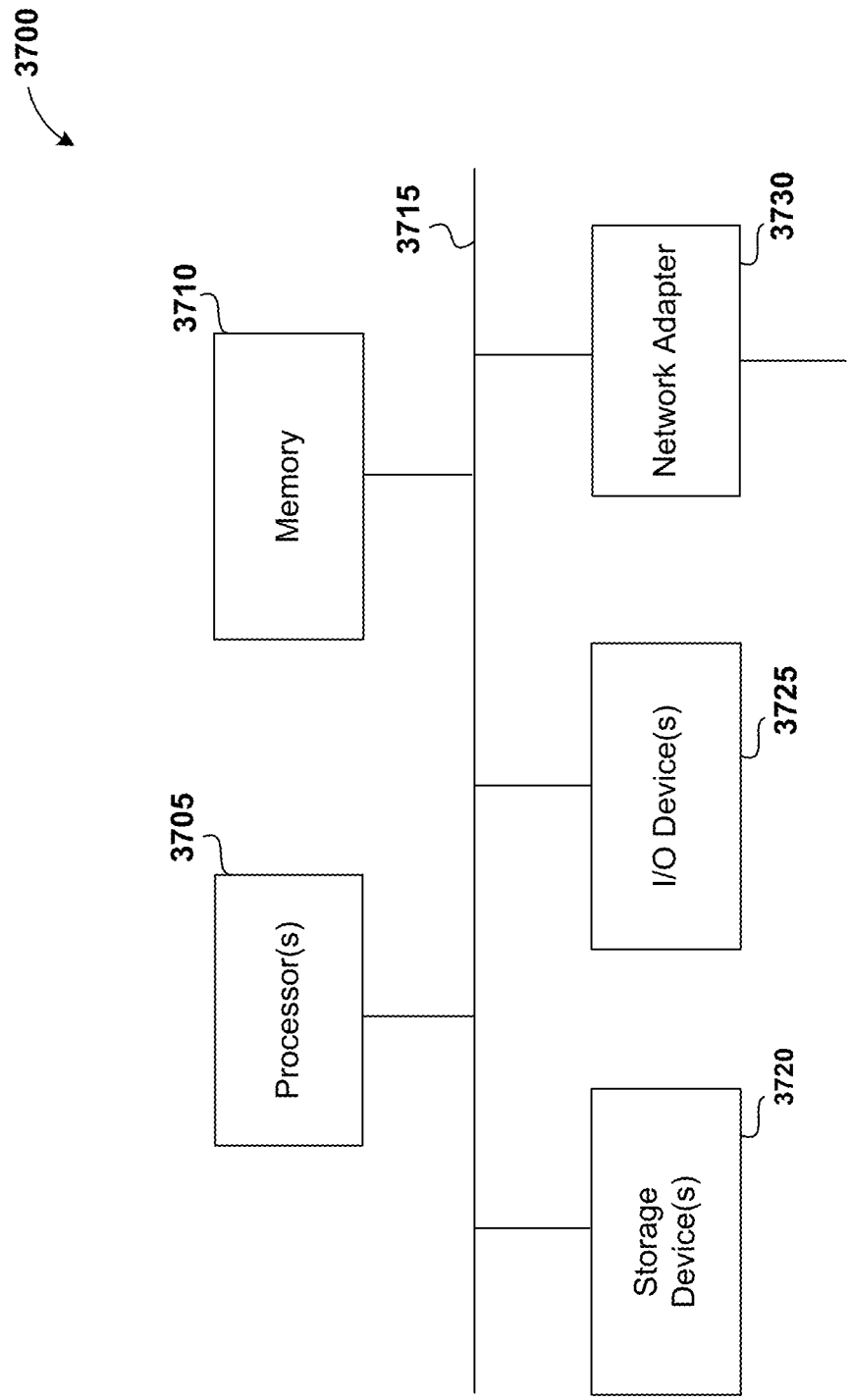
FIG. 37 illustrates an example server apparatus.

FIG. 37 is a block diagram of a computer system as may be used to implement features of some of the embodiments, e.g., master nodes or worker nodes, as described herein. The computing system 3700 may include one or more central processing units ("processors") 3705, memory 3710, input/output devices 3725 (e.g., keyboard and pointing devices, display devices), storage devices 3720 (e.g., disk drives), and network adapters 3730 (e.g., network interfaces) that are connected to an interconnect 3715. The interconnect 3715 is illustrated as an abstraction that represents any one or more separate physical buses, point to point connections, or both connected by appropriate bridges, adapters, or controllers. The interconnect 3715, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 3710 and storage devices 3720 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media (e.g., "non transitory" media) and computer-readable transmission media.

The instructions stored in memory 3710 can be implemented as software and/or firmware to program the processor(s) 3705 to carry out actions described above. In some embodiments, such software or firmware may be initially provided to the processing system 3700 by downloading it from a remote system through the computing system 3700 (e.g., via network adapter 3730).

It will be appreciated by one of ordinary skill in the art that the distributed video encoding techniques described in the present document can be used to accelerate video encoding by breaking an input video up into multiple segments and then assigning segments to different computers to perform the encoding task. In one advantageous aspect, the system can not only perform effective variable bits-per-frame encoding within a single segment, but cannot achieve good encoding across multiple segments as each computer is only working on a single segment. One advantageous aspect is explained with reference to FIG. 38.

Figure 38:
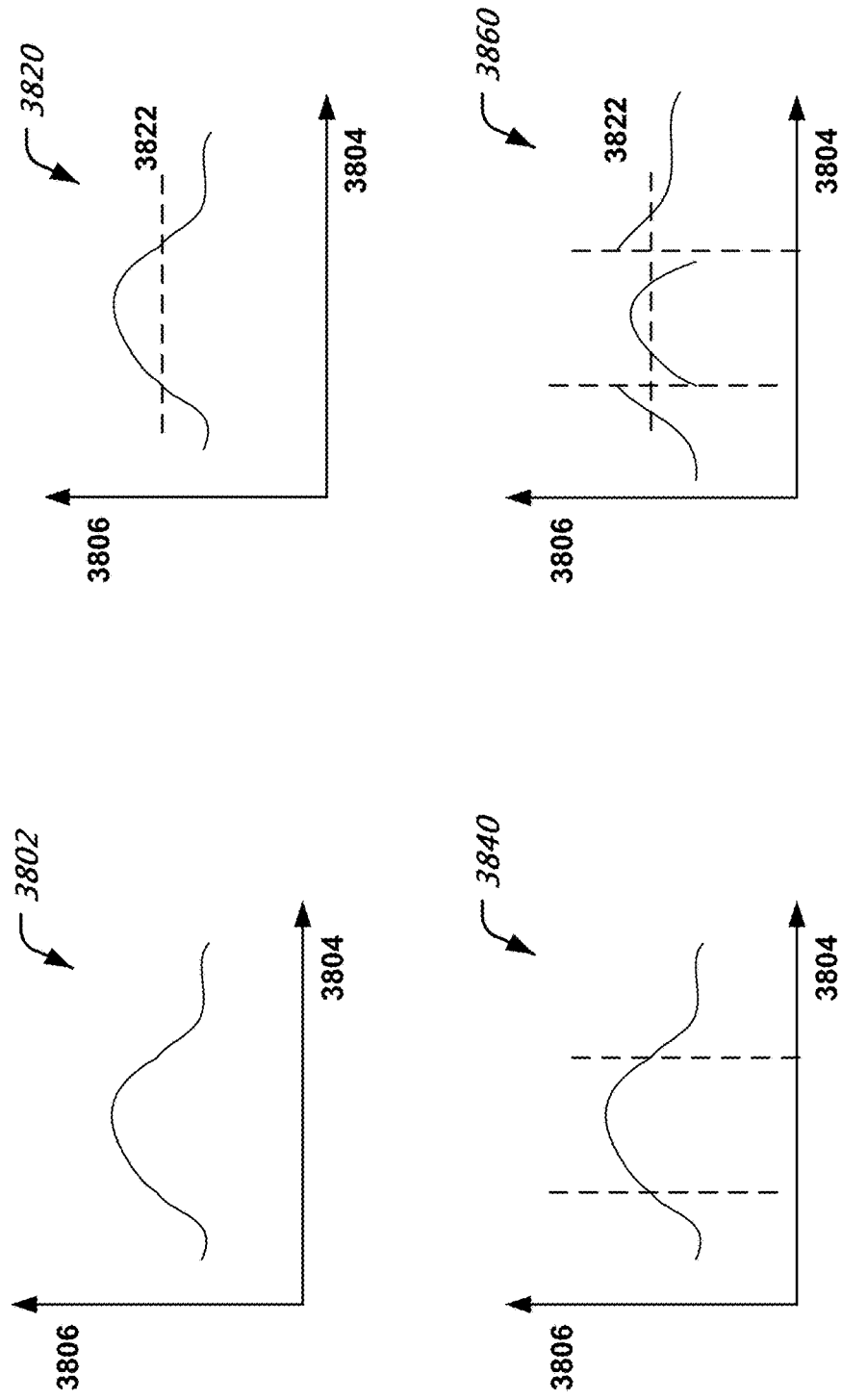
FIG. 38 illustrates an example of video complexity as a function of time.

In FIG. 38, graph 3802 shows the complexity of a typical input video with a high complexity region in the middle of the video as a function of time along the horizontal axis (3804) and encoding complexity of the video along the vertical axis 3806.

Graph 3820 shows the video bitrate allocation that will occur in a good VBR system. The high complexity region of the video is allocated additional bits in order to deliver good video quality during this time, with the average bitrate allocation across all frames of the video depicted by dashed line 3822.

Graph 3840 shows the same video complexity as in 3806, in a distributed video encoding system and shows where the video will be segmented along time axis 3804, in this case, into 3 segments, represented by vertical dashed lines.

Graph 3860 shows the video bitrate allocation that will occur in a prior art distributed video encoding system. Each segment encoder will achieve the average bitrate for the segment, and will allocate bits to the high and low complexity sections of the video. As can be seen, this bitrate allocation is not globally optimized compared to the graph 3820. The above-discussed techniques enable a distributed video encoding system to achieve a performance similar to 3820, by performing complexity analysis of segments, and by using the results of segment-wise complexity analysis during encoding of each segment.

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A computer-implemented method comprising:
   dividing, by a computing system, a video into multiple segments for encoding;
   deriving, by the computing system, for each segment, a corresponding encoding fingerprint, wherein the deriving comprises analyzing a ratio of bits used in the video for encoding motion based blocks and bits used in the video for encoding non-motion based blocks;
   training, by the computing system, a machine learning model to determine a plurality of encoder settings for each segment based on the corresponding encoding fingerprint, wherein the number of encoder settings for each segment is a configurable parameter;
   encoding, by the computing system, at least some segments of the video concurrently,
   wherein each segment is encoded multiple times using the plurality of encoder settings for each segment to obtain a plurality of encoded segments for each segment;
   selecting, by the computing system, among the plurality of encoded segments for each segment, a smallest sized encoded segment for each segment that meets a predetermined quality requirement; and
   concatenating, by the computing system, the smallest sized encoded segments for all segments into a single bitstream representing an encoded representation of the video.

2. The computer-implemented method of claim 1, wherein the encoding is performed using distributed resources in which at least some of the encoding is performed by different encoders.

3. The computer-implemented method of claim 1, wherein the deriving comprises analyzing a ratio of bit utilization by different frame types in the video, wherein the frame types include an intra-encoded frame type and an inter-encoded frame type.

4. The computer-implemented method of claim 1, wherein the training comprises searching a training database of encoder settings for a best match with the encoding fingerprint of each segment.

5. The computer-implemented method of claim 4, wherein the training database of encoder settings is produced by encoding multiple training videos using multiple encoder settings and collecting quality measurements of resulting videos.

6. The computer-implemented method of claim 1, wherein the concatenating comprises:
   assigning, by the computing system, to multiple worker nodes, all segments of the video for encoding along with encoding settings to be used;

receiving, by the computing system, from the multiple worker nodes, a resulting bitstream for each segment; and combining together, by the computing system, the received resulting bitstreams to produce the encoded version of the video.

7. The computer-implemented method of claim 1, wherein all segments of the video are concurrently encoded by different video encoders.

8. A non-transitory computer-readable storage medium including instructions that, when executed by at least one processor of a computing system, cause the computing system to perform a method comprising:

dividing a video into multiple segments for encoding;

deriving for each segment, a corresponding encoding fingerprint, wherein the deriving comprises analyzing a ratio of bits used in the video for encoding motion based blocks and bits used in the video for encoding non-motion based blocks;

training a machine learning model to determine a plurality of encoder settings for each segment based on the corresponding encoding fingerprint, wherein the number of encoder settings for each segment is a configurable parameter;

encoding at least some segments of the video concurrently,
wherein each segment is encoded multiple times using the plurality of encoder settings for each segment to obtain a plurality of encoded segments for each segment;

selecting among the plurality of encoded segments for each segment, a smallest sized encoded segment for each segment that meets a pre-determined quality requirement; and concatenating the smallest sized encoded segments for all segments into a single bitstream representing an encoded representation of the video.

9. The non-transitory computer-readable storage medium of claim 8, wherein the encoding is performed using distributed resources in which at least some of the encoding is performed by different encoders.

10. The non-transitory computer-readable storage medium of claim 8, wherein the deriving comprises analyzing a ratio of bit utilization by different frame types in the video, wherein the frame types include an intra-encoded frame type and an inter-encoded frame type.

11. The non-transitory computer-readable storage medium of claim 8, wherein the training comprises searching a training database of encoder settings for a best match with the encoding fingerprint of each segment.

12. The non-transitory computer-readable storage medium of claim 8, wherein the concatenating comprises:

assigning, to multiple worker nodes, all segments of the video for encoding along with encoding settings to be used;

receiving, from the multiple worker nodes, a resulting bitstream for each segment; and combining together the received resulting bitstreams to produce the encoded version of the video.

13. A system, comprising:

at least one processor; and at least one memory storing instructions that, when executed by the at least one processor, cause the system to perform:

dividing a video into multiple segments for encoding;

deriving for each segment, a corresponding encoding fingerprint, wherein the deriving comprises analyzing a ratio of bits used in the video for encoding motion based blocks and bits used in the video for encoding non-motion based blocks;

training a machine learning model to determine a plurality of encoder settings for each segment based on the corresponding encoding fingerprint, wherein the number of encoder settings for each segment is a configurable parameter;

encoding at least some segments of the video concurrently,
wherein each segment is encoded multiple times using the plurality of encoder settings for each segment to obtain a plurality of encoded segments for each segment;

selecting among the plurality of encoded segments for each segment, a smallest sized encoded segment for each segment that meets a pre-determined quality requirement; and concatenating the smallest sized encoded segments for all segments into a single bitstream representing an encoded representation of the video.

14. The system of claim 13, wherein the encoding is performed using distributed resources in which at least some of the encoding is performed by different encoders.

15. The system of claim 13, wherein the deriving comprises analyzing a ratio of bit utilization by different frame types in the video, wherein the frame types include an intra-encoded frame type and an inter-encoded frame type.

16. The system of claim 13, wherein the training comprises searching a training database of encoder settings for a best match with the encoding fingerprint of each segment.

17. The system of claim 13, wherein the concatenating comprises:

assigning, to multiple worker nodes, all segments of the video for encoding along with encoding settings to be used;

receiving, from the multiple worker nodes, a resulting bitstream for each segment; and combining together the received resulting bitstreams to produce the encoded version of the video.

18. The non-transitory computer-readable storage medium of claim 11, wherein the training database of encoder settings is produced by encoding multiple training videos using multiple encoder settings and collecting quality measurements of resulting videos.

19. The non-transitory computer-readable storage medium of claim 8, wherein all segments of the video are concurrently encoded by different video encoders.

20. The system of claim 16, wherein the training database of encoder settings is produced by encoding multiple training videos using multiple encoder settings and collecting quality measurements of resulting videos.

* * * * *